(12) United States Patent
Harai

(10) Patent No.: US 7,693,421 B2
(45) Date of Patent: Apr. 6, 2010

(54) OPTICAL PACKET BUFFERING DEVICE AND METHOD

(75) Inventor: Hiroaki Harai, Koganei (JP)

(73) Assignee: National Institute of Information and Communications Technology Incorporated Administrative Agency, Koganei-shi (JP)

( * ) Notice: Subject to any disclaimer, the term of this patent is extended or adjusted under 35 U.S.C. 154(b) by 941 days.

(21) Appl. No.: 10/886,645

(22) Filed: Jul. 9, 2004

(65) Prior Publication Data

US 2005/0041970 A1 Feb. 24, 2005

(30) Foreign Application Priority Data

Jul. 9, 2003 (JP) .............................. 2003-272621

(51) Int. Cl.
*H04J 14/00* (2006.01)

(52) U.S. Cl. .......................................... 398/54; 398/51

(58) Field of Classification Search .................. 398/51, 398/54
See application file for complete search history.

(56) References Cited

U.S. PATENT DOCUMENTS 7,106,967 B2 * 9/2006 Handelman .................. 398/47

OTHER PUBLICATIONS

Performance analysis of the simple prioritized buffering algorithm in optical packet switch for DiffServ assured forwarding; Klinkowski et al.; Transparent Optical Networks, 2003. Proceedings of 2003 5th International Conference on; vol. 2, Jun. 29-Jul. 3, 2003.*

(Continued)

*Primary Examiner*—Nathan M Curs
(74) *Attorney, Agent, or Firm*—Oblon, Spivak, McClelland, Maier & Neustadt, L.L.P.

(57) ABSTRACT

A device that accepts input of asynchronously-arriving variable-length optical packets transmitted over a plurality of lightpaths, and outputs same to a single optical path, comprising: in order to prevent the optical packets from overlapping in the output lightpath, a controller that uses the delay times of the delay elements and the optical packet length and arrival gap time thus read to determine by computation the delay element used for temporary storage, where a plurality of stages of processors is provided. Thus, the processing required to determine the delay time is performed by parallel processing with the results of processing the prefix-sum operation used in parallel pipelined processing along with the queue length, optical packet length and arrival gap time of the buffering device.

22 Claims, 30 Drawing Sheets

OTHER PUBLICATIONS

K. Habara, et al., The Institute of Electronics, Information and Communication Engineers, Technical Report of IEICE. SSE99-148, OCS99-110, pp. 13-18, "Wavelength-Routing-Type Large-Scale Photonic Packet Switching System", Feb. 2000 (with English Abstract).

D. K. Hunter, et al., Journal of Lightwave Technology, vol. 16, No. 12, pp. 2081-2094, "Buffering in Optical Packet Switches", Dec. 1998.

F. Callegati, IEEE Communication Letters, vol. 4, No. 9, pp. 292-294, "Optical Buffers for Variable Length Packets", Sep. 2000.

N. Wada, et al., ECOC 2000, 26$^{th}$ European Conference on Optical Communication, vol. 4, pp. 71-72, "Photonic Packet Routing Based on Multi-Wavelength Label Switch Using Fiber Bragg Gratings", Sep. 3-7, 2000.

A. Parkash, et al., IEEE Infocom, pp. 1623-1629, "An O(Log$^2$ N) Parallel Algorithm for Output Queuing", 2002.

H. Harai, et al., IEEE, pp. 2843-2847, "Contention Resolution Using Multi-Stage Fiber Delay Line Buffer in a Photonic Packet Switch", 2002.

* cited by examiner

F I G. 4
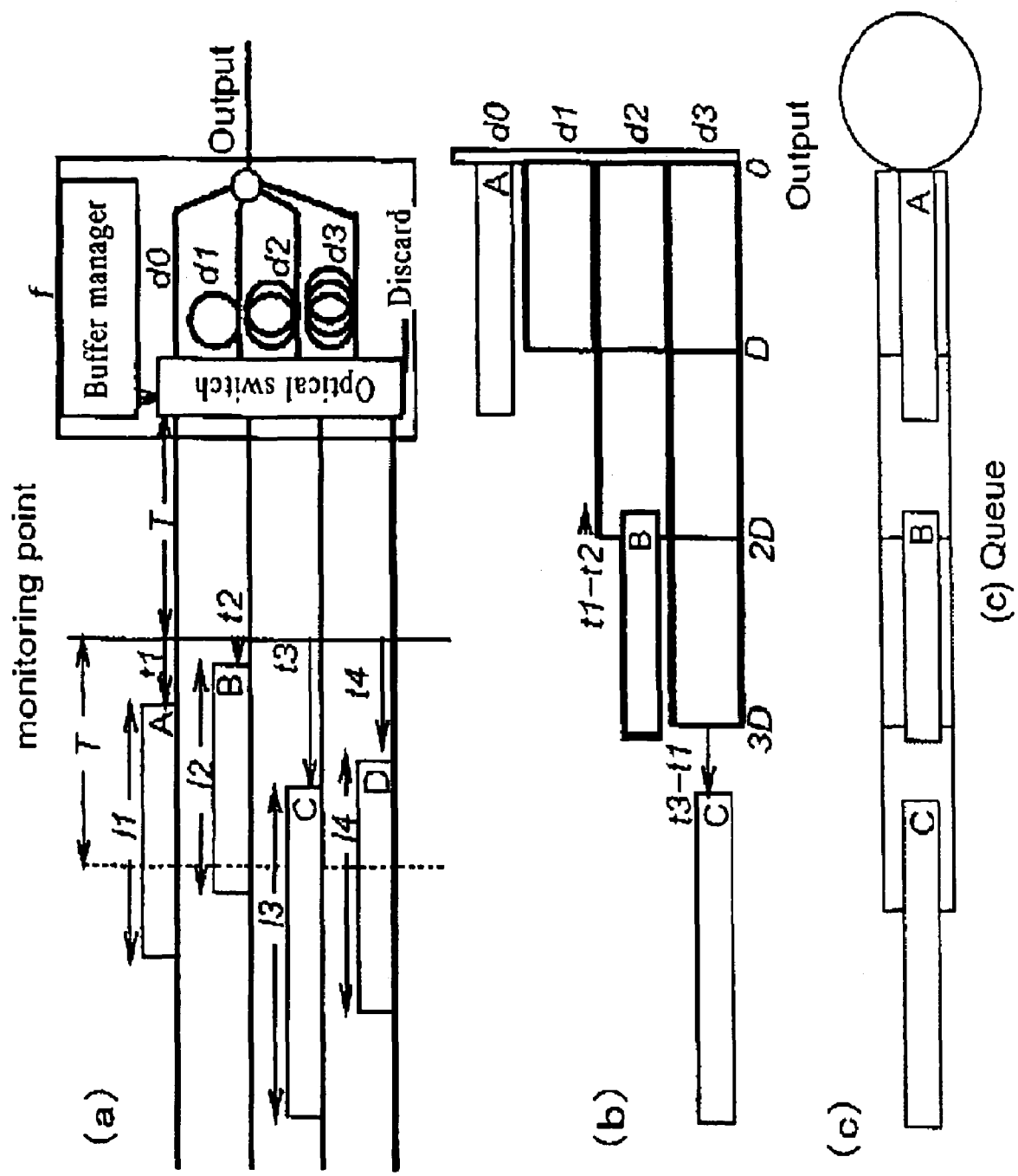

F I G. 10
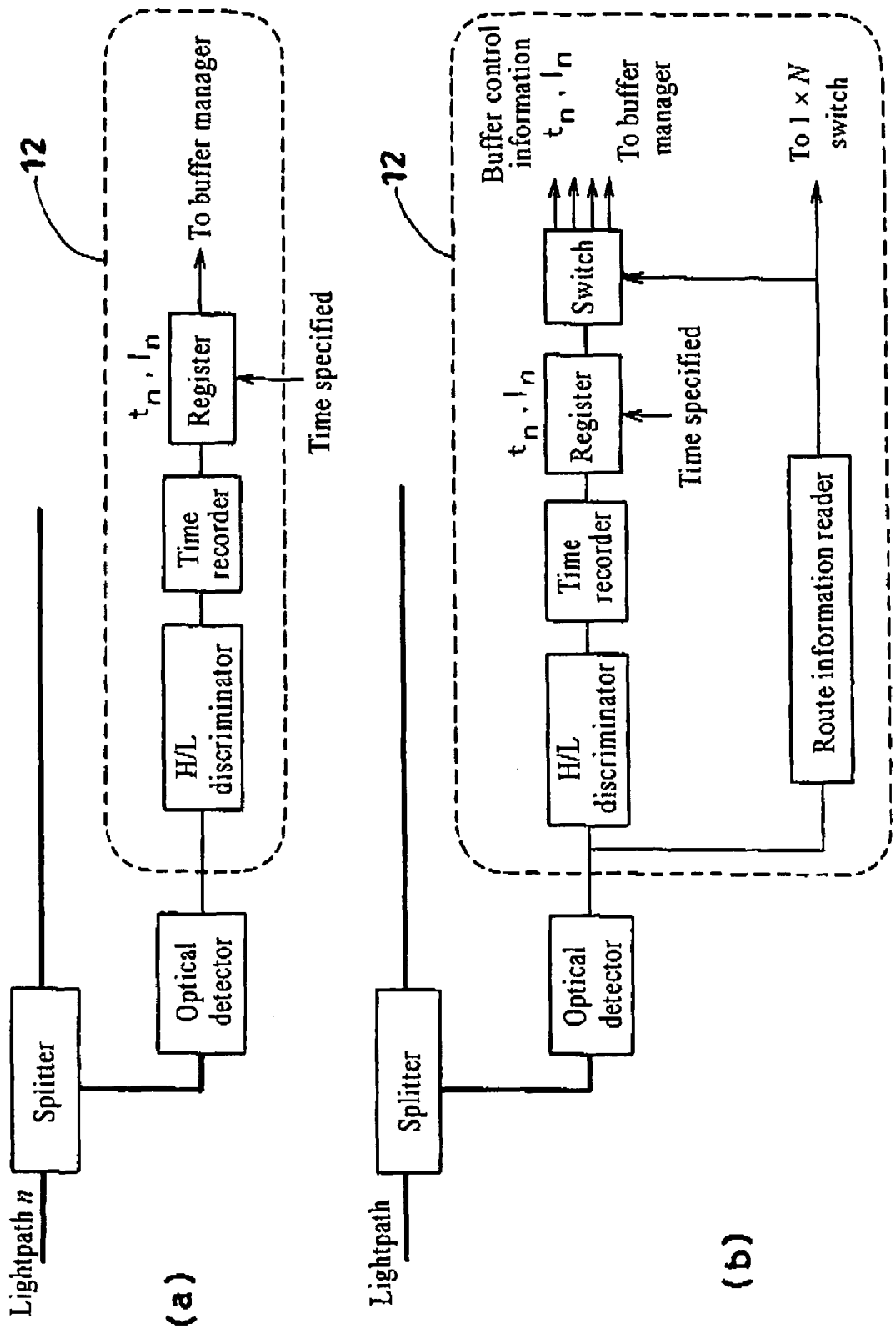

F I G. 14
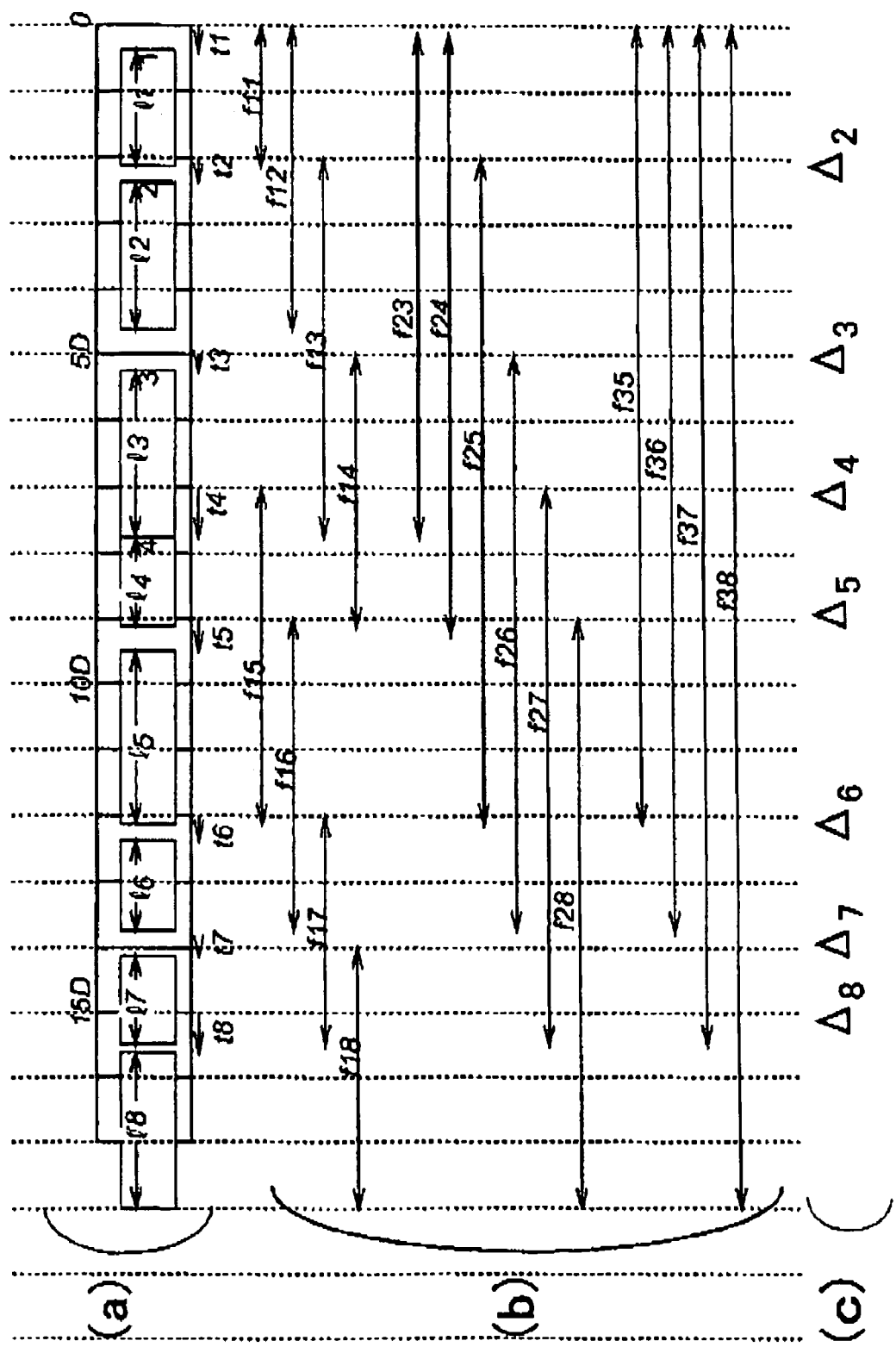

Update queue length

F I G. 30
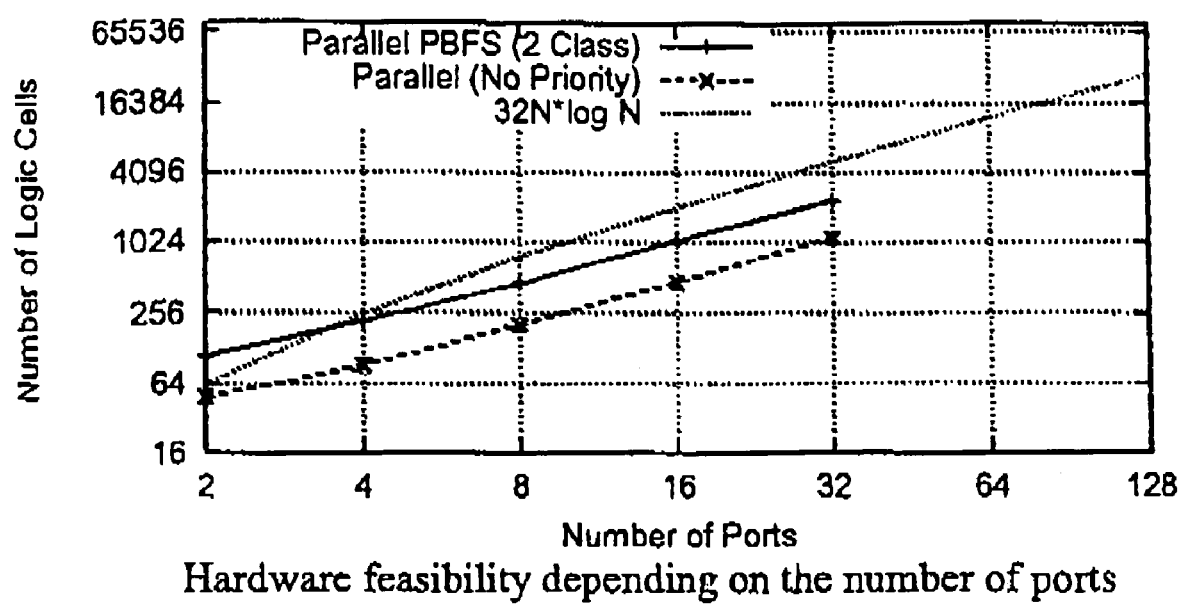
Hardware feasibility depending on the number of ports under 1-input×N-output buffer-less optical switches and N N-input×1-output buffers. The respective 1-input×N-output switches and N-input×1-output buffers are connected in a substantially lattice-type manner. In order to configure the above 1-input× N-output optical packet switches as N-input×N-output optical packet switches that exhibit adequate performance, it is also necessary to process a plurality of optical packets that arrive simultaneously in a sufficiently short period of time, and thus it is important to adopt a buffer management scheme requiring a small amount of computation.

OPTICAL PACKET BUFFERING DEVICE AND METHOD

BACKGROUND OF THE INVENTION

1. Field of the Invention

The present invention relates to an optical packet buffering device that uses optical circuits that have limited buffer capacity or data holding time, in order to guide a plurality of optical packets such that they are not overlapped toward one lightpath, and to the buffering method thereof.

2. Description of the Prior Art

With advances in optical communications technology able to transfer large amounts of information, in order to achieve even higher levels of throughput, optical technology is being introduced into not only the transmission paths but also into optical packet switching. Typically in optical packet switching, an optical packet transfer process is performed and an optical packet switch is used therein. The functions of such an optical packet switch can be divided into the five categories of: (1) label lookup, (2) switching, (3) buffer management, (4) buffering and (5) routing. Typically, an optical packet switch that implements functions (2) and (4) above optically is called an optical packet switch. This consists of optical switches and optical buffers, having broadband characteristics because the data is transferred while remaining as an optical signal.

In addition, by improving (3) buffer management above, it is possible to make further improvements to the throughput of an optical packet switch. Logic circuits based on electronic circuits had conventionally been used for this (3) buffer management. This is because practical optical logic circuits had not been available.

One of the objects of buffer management is to prevent the collision of optical packets. In an optical packet switching network, if a plurality of optical packets should arrive simultaneously at an optical packet switch, then the optical packets are stored in different positions of buffers to avoid collision. FIG. 1 shows a queue that represents the state of a buffer. For example, in the current Internet technology, packet transmission is done without performing priority control as shown in FIG. 1. The packets that arrive at the packet switch are stored in the buffer if space is available regardless of priority.

In addition, an optical packet switch does not use a semiconductor memory, which is often used in the buffer described above. Since an optical packet switch does not use semiconductor memory for buffering, a method of implementing optical buffer must be used as reported in the literature such as Document 1: K. Habara et al., "Development of a large-capacity photonic packet switch using wavelength routing techniques," Technical Report of IEICE, SSE99-149, February 2000, and Document 2: David K. Hunter and Meow C. Chia and Ivan Andonovic, "Buffering in Optical Packet Switches," IEEE/OSA Journal of Lightwave Technology, Vol. 16, No. 12, pp. 2081-2094, December 1998.

Previously known optical buffers have used a plurality of optical fibers of different lengths. These are optical delay elements with different delay times, so the optical packets are stored for the length of this delay time. A method of controlling the optical packets that are allocated to these optical delay lines to be able to avoid collision is known. At this time, it is not possible to extract an optical packet at an arbitrary time, so it is necessary to prevent the collision of optical packets at the time of output, and for this reason, some sort of buffer management technique must be used at the time of input to the optical buffer, thereby controlling the delay times.

In addition, as examples of the conventional optical packet switch architecture, we shall present N-input×N-output optical packet switches with configurations consisting of N 1-input×N-output buffer-less optical switches and N N-input×1-output buffers. The respective 1-input×N-output switches and N-input×1-output buffers are connected in a substantially lattice-type manner. In order to configure the above 1-input× N-output optical packet switches as N-input×N-output optical packet switches that exhibit adequate performance, it is also necessary to process a plurality of optical packets that arrive simultaneously in a sufficiently short period of time, and thus it is important to adopt a buffer management scheme requiring a small amount of computation.

The above optical packet switches are constituted using optical switches. Known optical switches that can be used in this application include: mechanical optical switches that use drive coils as shown in the schematic diagram in FIG. 3(*a*), optical switches that use optical semiconductor devices as shown in the block diagram in FIG. 3(*b*) and Mach-Zehnder type optical switches (not shown).

With the above 1-input×N-output buffer-less optical switches, it is possible to perform high-speed label lookup by means of an optical label lookup function as recited in Document 4: N. Wada, H. Harai, W. Chujo, and F. Kubota, "Photonic packet routing based on ultiwavelength label switching using fiber Bragg gratings," ECOC 2000 Technical Digest (26$^{th}$ European Conference on Optical Communication), vol. 4 (No. 10.4.6), pp. 71-72, September 2000. As a result, N-input×N-output optical packet switches exhibit high node throughput. However, in order to avoid collision of optical packets and decrease the percentage discarded, a buffer is required, so an N-input×1-output buffer is connected to each output port of the N-input×N-output optical packet switches.

Here follows a more specific description of the buffer management method for processing variable-length packets. This method is already well known. For example, in Document 3: F. Callegati, "Optical buffers for variable length packets," IEEE Communications Letters, vol. 4, pp. 292-294, September 2000, control is done by the following method with the addition of round-robin scheduling.

With the output buffer type N-input×N-output optical packet switch shown in FIG. 2, N N-input×1-output buffer and N 1-input×N-output switches are used. When the amount of data transmitted increases, t is possible for up to N optical packets to arrive simultaneously at the N-input×1-output buffer.

In order to prevent the collision (or overlap) of these optical packets, delay line buffers are used. In this case, in order to store all of the optical packets, the process of finding the delay of N optical packets must be performed within the period of time $1_{min}$ equivalent to the minimum optical packet length. Specifically, the time permitted for processing one optical packet is $1_{min}/N$. If this time is made to be equivalent to the processing time for one optical packet when buffering is performed according to a simple round-robin scheme, then this indicates that the buffer management can be performed by means of round-robin scheduling.

FIG. 4(*a*) shows the structure of a 4-input×1-output optical buffer. In this case, N=4. An optical buffer made up of optical delay elements consists of B(=4) optical delay elements using fiber delay lines, N×(B+1) optical switches and a buffer management device (or buffer manager). The B fiber delay lines $\{d_0, d_1, d_2, d_3\}$ have lengths of integral multiples of the unit length D of delay line, giving lengths of $\{0, D, 2D, 3D\}$. In addition, round-robin scheduling based on a clock signal in the buffer manager is repeated every period of time T. For this reason, the buffer manager receives the optical packet information at a point in time separated from the N×(B+1) optical switch by more than the period of time T, and must use this information to find the delay time required for each of the N optical packets during this predefined period of time T. Since it is necessary to process the sequentially arriving optical packets during the period of time T, the relation $T \leq 1_{min}$ must be satisfied. For example, as shown in FIG. 4(a), four optical packets arrive and the buffer manager stores the optical packets A, B and C in the delay lines $d_0$, $d_2$ and $d_3$ and discards optical packet D. This type of control is achieved by the use of the buffer manager driving the optical switch. FIG. 4(b) shows the positions of the optical packets, when viewed from the output port, immediately after optical packet A is switched to delay line $d_0$. As shown in FIG. 4(c), optical packets A, B and C are provided as output without collision. In this example, optical packet B had arrived in the buffer prior to optical packet A, but the arriving optical packets are processed sequentially in a round-robin fashion, so they are output in the order shown in FIG. 4(c).

Here follows a detailed description of the behavior of the buffer manager according to the flowchart in FIG. 5. Table 1 presents the main parts of the program.

[Table 1]

TABLE 1

```
ln                      : packet length
tn (n=1, . . . , N)     : arrival gap time
f                       : temporary variable for queue length
T                       : period
D                       : unit length of the delay element
B                       : number of the delay elements
   for n = 1 to N do
   begin
      if (f! = 0)
      begin
         Δ_n = ⌈(f - t_n)/D⌉;
         if Δ_n < B
         begin
            f = t_n + l_n + Δ_n D;
            Packet n is given delay Δ_n;
         end
         else Packet n is discarded;
      end
   end
   f = max(f - T, 0);
```

The buffer manager performs processing in order to avoid optical packet collisions both internally or upon output. Here, f is defined to be the amount of time from a predetermined start time to within the round-robin repeat time T until the time $t_f$ when all of the optical packets within the optical fibers have left the buffer. Hereinafter this f is called the buffer occupancy. Each period T, the buffer manager finds the delay time of the optical packets that have arrived at all ports. The delay times given to the optical packets arriving within the same period are found in the order port k=1, 2, . . . , N. Let us assume that an optical packet with an optical packet length $l_k$ arrives at port k at the time $t_k$ taking the time $t_0$ to be the origin. The, delay time t to be given to the optical packet in order to avoid a collision is $t=f-t_k$. Here, upon considering that the delay line buffer has a discrete time characteristic, one can see that the optical packets should be given the following time delay (F1 of FIG. 5).

$$\Delta_k D = D \times \text{Ceil}\left(\frac{f - t_k}{D}\right) = D \times \left\lceil\frac{f - t_k}{D}\right\rceil$$ [Equation 1]

Here, the function Ceil(x) represents a function that gives the smallest integer that is no less than x. If $\Delta_k < B$, then that packet is stored in the $\Delta_k^{th}$ delay line (F2). Conversely, if $\Delta_k \geq B$, then that optical packet is discarded. In this manner, a portion of the optical packets is discarded and the remainder is stored, so it is necessary to update the buffer occupancy f accordingly. Thus, when an optical packet is stored ($F_4$), f is updated as follows.

$$f = t_k + l_k + \Delta_k D$$ [Equation 2]

Once the delay of the optical packets at all ports is found, excluding the discarded ports, the buffer occupancy f is updated to the new value of max((f−T),0), thus getting ready for the optical packet processing in the next round-robin period after a time of T.

When such an optical delay line buffer is used, the interval between the optical packet arriving at port k and the optical packet stored immediately previously, or namely the optical packet output at the time indicated by the f used at the time of finding the delay in the optical packet arriving at port k, is as follows.

$$\Theta_k = \Delta_k D + t_k - f$$ [Equation 3]

Document 6 (H. Harai, N. Wada, F. Kubota, and W. Chujo, "Contention resolution using multi-stage fiber delay line buffer in a photonic packet switch," Proceedings of IEEE ICC 2002) recites a method wherein delay line buffer units are disposed in a tree structure, and buffer managers are placed in each. Taking N to be the number of ports, this increases the processing speed by $N^{1/2}$ times in comparison to the round robin processing described above, but a group of delay lines must be placed at each buffer unit so the increased size of the optical element is a problem. In addition, Document 5 (A. Prakash, S. Sharif, and A. Aziz, "An $O(\log^2 N)$ parallel algorithm for output queuing," Proceedings of IEEE Infocom 2002.) recites a method of performing the process of storing packets, not in optical buffers but rather in semiconductor memory buffers, as parallel processing. This makes the scale of the managing device N times that when using the round-robin process, and the processing speed is $\log_2 N$ times as fast.

The round-robin scheme described above proceeds sequentially, with data processing regarding buffering being performed in a predetermined port order, so in order to perform high-speed buffering, it is necessary to perform the data processing at high speed but thus the buffering speed is limited. In addition, when the same number of processor units as the number of lightpaths are provided in parallel as recited in Document 5 above, or when delay line buffer units are provided in a tree structure as recited in Document 6 above, even in a method wherein parallel processing is used, the maximum processing time per processor units increases rapidly as the number of input lightpaths increases.

The present invention has as its object to improve the speed of buffering performed during the parallel processing of data, and provide an optical packet buffering device that is able to avoid a rapid increase in the maximum processing time per arithmetic operator even if the number of inputs increases.

SUMMARY OF THE INVENTION

In order to achieve the aforementioned object, the present invention relates to a buffering device for asynchronously-arriving variable-length optical packets that uses a large number of processor units to improve the throughput of processings, and is characterized in being:

a device that accepts input of asynchronously-arriving variable-length optical packets transmitted over a plurality of lightpaths, and outputs same to a single optical path, comprising:

reading means that reads the optical packet length of variable-length optical packets on the respective lightpaths, reading means that reads a time difference-between start time of a period provided by a clock and arrival time of the subsequent most recent variable-length optical packet (hereafter the time difference is called "arrival gap time"), a queue consisting of a plurality of delay elements that temporarily store the plurality of optical packets and give each optical packet one of B different delay times, an optical switch that directs the optical packet to one of the plurality of delay elements, an optical multiplexer connected by lightpaths to the plurality of delay elements, and an output lightpath connected by a lightpath to the multiplexer, and a controller that uses the delay times of the delay elements and the optical packet length and the arrival gap time thus read to select the delay element used for temporary storage in order to prevent the optical packets from overlapping in the output lightpath, and the device being a buffering device for asynchronously-arriving optical packets wherein:

this controller is such that, when the plurality of lightpaths are given sequential numbers n from 1 to N, and the value is set to zero for those in which there is no corresponding lightpath, for the optical packet length and the arrival gap time in the respective lightpaths, as the arrangement of the first stage of processors and registers, processors $P(1,n)$ that perform the calculation of the optical packet length and the arrival gap time on the $(n-1)^{th}$ lightpath and the optical packet length and the arrival gap time on the $n^{th}$ light path, and registers $R(1,n)$ that store the results of calculation are disposed, as the arrangement of the $m^{th}$ ($2 \leq m \leq \log_2 N$) stage, processors $P(m,n)$ that perform the calculation of the registers $R(m-1,n-2^{m-1})$ or copies thereof and the registers $R(m-1,n)$ or copies thereof, and registers $R(m,n)$ that store the results of calculation are disposed, on the $(M+1)^{th}$ stage where $2^M=N$ a processor and a register Q that stores the information at the tail end of the queue length are disposed, moreover, processors $P(M+1,1)$ that determine the delay applied to the first variable-length optical packet from the optical packet length and the arrival gap time for the first lightpath or a copy thereof and the value of the register Q, and for values of n greater than 1, processors $P(M+1,n)$ that determine the delay applied to the $n^{th}$ variable-length optical packet, by calculation on the optical packet presence information for the $n^{th}$ lightpath or a copy thereof and the values of the register $R(M,n-1)$ and the register Q, are disposed, and thus the delay time applied to the variable-length optical packets of the respective lightpaths is coordinated based on the output of the processors $P(M+1,1)$ and the processors $P(M+1,n)$.

In addition, this invention pertains to a buffering method for optical packets used in the above buffering device for optical packets comprising steps wherein:

taking N to be the number of the lightpaths and n to be the sequential number, the reading means takes readings at a period T, and regarding the optical packets in the $n^{th}$ light path passing through this reading means at a specified time, the length of the optical packet is $l_n$, and the arrival gap time is $t_n$, and for $n=0$, $l_n=t_n=0$, when a constitution is used such that the delay of the plurality of the delay elements can be arranged as delays that increase by the delay time D, each of the processors is provided on one of the respective N lightpaths on the input side, and performs the following processing on the integers n from 1 to N:

1) when $l_{n-1}=0$ is true, output $t_n$ as $t_{n,1}$, or
   when $l_{n-1}=0$ is not true, output $t_{n-1}$ as $t_{n,1}$, 2) in addition, taking $g_{n,1}=l_{n-1}+t_{n-1}$, 3) when $l_n=0$ is true, output $g_{n-1}$ as $f_{n,1}$, or
   when $l_n=0$ is not true, taking $\Delta_n$ to be the smallest integer no less than $(g_{n-1}-t_n)/D$ set $(t_n+l_n+\Delta_n D)$ to the output $f_{n,1}$.

In addition, this invention includes, when the plurality of processors are called first stage processors, each of the respective first-stage processors $P(1,n)$ is provided with a register $R(1,n)$ that temporarily stores its respective output of $(f_{n,1}, t_{n,1})$, and for the integers n from 3 to N, calculates the content of the $n^{th}$ register and the content of the $(n-2)^{th}$ register and gives the output of $(f_{n,2}, t_{n,2})$, where:

1) when $f_{n-2,1}=0$ is true, output $t_{n,1}$ as $t_{n,2}$, or
   when $f_{n-2,1}=0$ is not true, output $t_{-2,1}$ as $t_{n,2}$, 2) in addition, when $f_{n,1}=0$ is true, output $f_{n-2,1}$ as $f_{n,2}$, or
   when $f_{n,1}=0$ is not true, 2-1) taking $\Delta_n$ to be the smallest integer no less than $(f_{n-2,1}-t_{n,1})/D$ set $(f_{n,1}+\Delta_n D)$ to the output $f_{n,2}$.

In addition, this invention includes, when the plurality of processors are called first-stage processors, each of the respective first-stage processors $P(1,n)$ is provided with a register $R(1,n)$ that temporarily stores its respective output of $(f_{n,1}, t_{n,1})$, and when the $(m-1)^{th}$ stage processors are defined for the integers m from 2 to $\log_2 N$, for the $m^{th}$-stage processors, and for the integers n from $\beta+1$ to N where $\beta=2^{m-1}$, the $m^{th}$-stage $(n-\beta)^{th}$ processor $P(m,n)$ calculates the content of the $n^{th}$ register $R(m-1,n)$ connected to the previous-stage processor $P(m-1,n)$ and the content of the $(n-\beta)^{th}$ register $R(m-1,n-\beta)$ and gives the output of $(f_{n,m}, t_{n,m})$, where:

1) when $f_{n-\beta,m-1}=0$ is true, output $t_{n,m-1}$ as $t_{n,m}$, or
   when $f_{n-\beta,m-1}=0$ is not true, output $t_{n-\beta,m-1}$ as $t_{n,m}$, 2) in addition, when $f_{n,m-1}=0$ is true, output $f_{n-\beta,m-1}$ as $f_{n,m}$, or
   when $f_{n,m-1}=0$ is not true, 2-1) taking $\Delta_n$ to be the smallest integer no less than $(f_{n-\beta,m-1}-t_{n,m-1})/D$ set $(f_{n,m-1}+\Delta_n D)$ to the output $f_{n,m}$.

In addition, the method of determining the value $\Delta_n$ for controlling the delay time according to this invention includes:

for the integers n from 1 to N when the length of the queue is q, and $M=\log_2 N$, 1) when $l_n \neq 0$ is not true, end processing, and
   when $l_n \neq 0$ is true, for $f_{n-1,M}$ in the register $R(M,n-1)$, 2) when $f_{n-1,M}=0$ is true, provide a temporary value (temp), and set (temp)=q,
   when $f_{n-1,M}=0$ is not true, set the sum of $f_{n-1,M}$ and the smallest integer no less than $(q-t_{n-1,M})/D$ to (temp), 3) taking $\Delta_n$ to be the smallest integer no less than $((temp)-t_n)/D$,
   when $\Delta_n$ is less than B, output $\Delta_n$ as information that specifies a delay element,
   but if not less, discard the corresponding optical packet.

In addition, the updating of the queue length according to this invention includes:

1) when $f_{N,M}=0$ is true for the $f_{N,M}$ stored in register $R(M,N)$, the larger of $(q-T)$ or 0 is stored as the new queue length $(q_{new})$ in the register Q, when $f_{N,M}=0$ is not true, $\Delta$ is set as the smallest integer no less than $(q-t_{N,M})/D$ and at this time, 2) when this $\Delta$ is smaller than the B, store the value of the larger of 0 and $(f_{N,M}+\Delta D-T)$ in the register Q,
when this $\Delta$ is not smaller than B, take $(q-T)$ as the new queue length and store it in the register Q.

In addition, the updating of the queue length according to this invention includes:

if the MTU (maximum transfer unit) is set, 1) when $f_{N,M}=0$ is true for the $f_{N,M}$ stored in register R(M,N), the larger of $(q-T)$ or 0 is stored as the new queue length $(q_{new})$ in the register Q,
when $f_{N,M}=0$ is not true, $\Delta$ is set as the smallest integer no less than $(q-t_{N,M})/D$ and at this time, 2) when this $\Delta$ is smaller than the B, store the value of the larger of 0 and the value found by subtracting T from the lesser of $(f_{N,M}+\Delta D)$ and $(BD+MTU)$ in the register Q as the new queue length,
when this $\Delta$ is not smaller than B, take $(q-T)$ as the new queue length and store it in the register Q.

In addition, this invention pertains to a buffering method for optical packets in the buffering apparatus for optical packets wherein:

taking N to be the number of the lightpaths, n to be the lightpath number from 1 through N, and the period T to be set as a power of 2 times an appropriately set time unit ($\tau$), or namely $T=2^a\tau$ (where a is a nonnegative integer), while T is to be no greater than the minimum packet length represented as the length of an integral multiple of the time unit ($\tau$), the reading means performs reading at each period T, and for the optical packets of the $n^{th}$ lightpath that pass through this reading means at a specified time, the length of the optical packet is $l_n$ represented as a length which is an integral multiple of the time unit, the arrival gap time is expressed as $t_n$ which is an integral multiple of the length of the time unit, and the optical packet length is expressed as an integral multiple of the unit time that is no less than its length, the arrival gap time is expressed as an integral multiple of the unit time that is no greater than the lead time, and for $n=0$, $l_n=t_n=0$, for the delay of the plurality of delay elements, in a constitution where the delays can be arranged such that they increase by the delay time D, D is given as $2^k$ (where k is a nonnegative integer), and, as the method of representation, the integer corresponding to the least significant k bits of the binary representation of the integer x is given as $x^{(2)}$, and the binary number consisting of the remaining most significant bits after removing the aforementioned least significant k bits is given as $x^{(1)}$, each of the processors is provided on one of respective N lightpaths on the input side, and performs the following processing on the integers n from 1 to N.

1) when $l_{n-1}=0$ is true, output $t_n$ as $t_{n,1}$, or
when $l_{n-1}=0$ is not true, output $t_{n-1}$ as $t_{n,1}$, 2) in addition, taking $g_{n,1}=l_{n-1}t_{n-1}$, 3) when $l_n=0$ is true, output $g_{n-1}$ as $f_{n,1}$, or
when $l_n=0$ is not true, when $g_{n-1}$ is less than $t_n$, set $g_{n-1}^{(1)}$ to $\Delta_n$,
and when $g_{n-1}$ is not less than $t_n$, set $(g_{n-1}^{(1)}+1)$ to $\Delta_n$, and 4) set $(t_n^{(2)}+l_n+\Delta_n D)$ to the output $f_{n,1}$.

In addition, the buffering method for optical packets according to this invention includes: each of the respective first-stage processors P(1,n) is provided with a register R(1,n) that temporarily stores its respective output of $(f_{n,1}, t_{n,1})$, and when the $(m-1)^{th}$ stage processors are defined for the integers m from 2 to $\log_2 N$, for the $m^{th}$-stage processors, and for the integers n from $\beta+1$ to N where $\beta=2^{m-1}$, the $m^{th}$ stage $(n-\beta)^{th}$ processor P(m, n) calculates the content of the $n^{th}$ register R(m−1,n) connected to the previous-stage processor P(m−1,n) and the content of the $(n-\beta)^{th}$ register R(m−1,n−β) and gives the output of $(f_{n,m}, t_{n,m})$, where:

1) when $f_{n-\beta,m-1}=0$ is true, output $t_{n,m-1}$ as $t_{n,m}$, or
when $f_{n-\beta,m-1}=0$ is not true, output $t_{n-\beta,m-1}$ as $t_{n,m}$, 2) in addition, when $f_{n,m-1}=0$ is true, output $f_{n-\beta,m-1}$ as $f_{n,m}$, or
when $f_{n,m-1}=0$ is not true, 2-1) when $f_{n-\beta,m-1}^{(2)}$ is less than or equal to $t_{n,m-1}^{(2)}$, set $f_{n-\beta,m-1}^{(1)}$ to $\Delta_n$, 2-2) when $f_{n-\beta,m-1}^{(2)}$ is not less than or equal to $t_{n,m-1}^{(2)}$, set $(f_{n-\beta,m-1}^{(1)}+1)$ to $\Delta_n$, 3) set $(f_{n,m-1}+2^k\Delta_n)$ to the output $f_{n,m}$.

In addition, the buffering method for optical packets according to this invention includes: for the integers n from 1 to N when the length of the queue is q, assuming that $M=\log_2 N$, 1) when $l_n\neq0$ is not true, end processing, 2) when $l_n\neq0$ is true, 2-1) when $f_{n-1,M}=0$ is true and,
when $q^{(2)}$ is less than or equal to $t_n^{(2)}$, set $q^{(1)}$ to $\Delta_n$,
when $q^{(2)}$ is not less than or equal to $t_n^{(2)}$, set $(q^{(1)}+1)$ to $\Delta_n$, 2-2) when $f_{n-1,M}=0$ is not true and,
when $q^{(2)}$ is less than or equal to $t_{n-1,M}^{(2)}$, set $q^{(1)}$ to $\Delta_1$,
when $q^{(2)}$ is not less than or equal to $t_{n-1,M}^{(2)}$, set $(q^{(1)}+1)$ to $\Delta_1$, and moreover, 2-3-1) when $f_{n-1,M}^{(2)}$ is less than or equal to $t_n^{(2)}$, set $(\Delta_1+f_{n-1,M}^{(1)})$ to $\Delta_n$, 2-3-2) when $f_{n-1,M}^{(2)}$ is not less than or equal to $t_n^{(2)}$, set $(\Delta_1+1+f_{n-1,M}^{(1)})$ to $\Delta_n$, 3) when $\Delta_n$ is less than B, output $\Delta_n$ as information that specifies a delay element,
but if not less, discard the corresponding optical packet.

In addition, the buffering method for optical packets according to this invention includes: assuming that $M=\log_2 N$, 1) when $f_{N,M}=0$ is true, 1-1) when q is greater than T, $(q-T)$ is set as the new queue length $(q_{new})$, 1-2) when q is not greater than T, $q_{new}=0$ is set, 2) when $f_{N,M}=0$ is not true, 2-1) when $q^{(2)}$ is less than or equal to $t_{N,M}^{(2)}$, $q^{(1)}$ is set as $\Delta$,
when $q^{(2)}$ is not less than or equal to $t_{N,M}^{(2)}$, $(q^{(1)}+1)$ is set as $\Delta$, 3-1) when this $\Delta$ is smaller than B and, 3-1-1) when $f_{N,M}+2^k\Delta$ is greater than T, $(f_{N,M}+2^k\Delta-T)$ is set as $q_{now}$, 3-1-2) when $f_{N,M}+2^k\Delta$ is not greater than T, $q_{new}=0$ is set, 3-2) when this $\Delta$ is not smaller than B, $(q-T)$ is set as $q_{now}$.

In addition, the buffering method for optical packets according to this invention includes: assuming that $M=\log_2 N$, 1) when $f_{N,M}=0$ is true, 1-1) when q is greater than T. $(q-T)$ is set as the new queue length $(q_{new})$, 1-2) when q is not greater than T, $q_{new}=0$ is set, 2) when $f_{N,M}=0$ is not true, 2-1) when $q^{(2)}$ is less than or equal to $t_{N,M}^{(2)}$, $q^{(1)}$ is set as $\Delta$,
when $q^{(2)}$ is not less than or equal to $t_{N,M}^{(2)}$, $(q^{(1)}+1)$ is set as $\Delta$, 3-1) when this $\Delta$ is smaller than B and, 3-1-1) when $(f_{N,M}+2^k\Delta)$ is greater than $(2^kB+MTU)$, $(2^kB+MTU-T)$ is set as $q_{now}$, 3-1-2) when $(f_{N,M}+2^k\Delta)$ is not greater than $(2^kB+MTU-T)$ and, 3-1-2-1) when $f_{N,M}+2^k\Delta$ is greater than T, $(f_{N,M}+2^k\Delta-T)$ is set as $q_{new}$,
3-1-2-2) when $f_{N,M}+2^k\Delta$ is not greater than T, $q_{new}=0$ is set,
3-2) when this $\Delta$ is not smaller than B, (q−T) is set as $q_{new}$.

As described above, when the period T is $2^p$ (where p is an integer) times or $2^{nk}$ times the delay time D, this invention simplifies the implementation in hardware by eliminating division, and can further increase the speed of data processing.

In addition, this invention includes a device that accepts input of synchronous fixed-length optical packets from a plurality of lightpaths, gives each of the optical packets one of B different delay times and outputs same to a single optical path, comprising:

reading means that reads the presence of optical packets on the respective lightpaths, a queue consisting of a plurality of delay elements that temporarily store the plurality of optical packets and give each optical packet one of B different delay times, an optical switch that directs the optical packet to one of the plurality of delay elements, an optical multiplexer connected by lightpaths to the plurality of delay elements, and an output lightpath connected by a lightpath to the multiplexer, and a controller that uses the delay times of the delay elements and the presence information for optical packets thus read to select by computation the delay element used for temporary storage in order to prevent the optical packets from overlapping in the output lightpath, the controller being such that:

when the plurality of lightpaths are given sequential numbers n from 1 to N, and cases in which there is none corresponding to n can be neglected, for the number of optical packets in the respective lightpaths, as the arrangement of the first stage of processors and registers, processors P(1,n) that perform the calculation using the optical packet presence information on the $(n-1)^{th}$ lightpath and the optical packet presence information on the $n^{th}$ light path, and registers R(1,n) that store the results of calculation are disposed, as the arrangement of the $m^{th}$ ($2 \leq m \leq \log_2 N$) stage, processors P(m,n) that perform the calculation of the registers R(m−1,n−$2^{m-1}$) or copies thereof and the registers R(m−1,n) or copies thereof, and registers R(m,n) that store the results of calculation are provided, for the integers M where $2^M=N$, on the $(M+1)^{th}$ stage a processor and a register Q that stores the information at the tail end of the queue length are provided, moreover, processors P(M+1,1) is used to that determine the delay applied to the first synchronous fixed-length optical packet from the optical packet presence information for the first lightpath or a copy thereof and the value of the register Q, and for values of n greater than 1, processors P(M+1,n) are used to determine the delay applied to the $n^{th}$ synchronous fixed-length optical packet, by calculation on the optical packet presence information for the $n^{th}$ lightpath or a copy thereof and the values of the register R(M,n−1) and the register Q, thereby coordinating the delay times given to the synchronous fixed-length optical packets of the respective lightpaths.

In addition, the buffering device for optical packets according to this invention, further comprising reading means that takes readings of the presence of optical packets in the respective light paths, wherein the respective first-stage processors receive input variables $l_{n-1}$ and $l_n$ that indicate the presence of optical packets arriving at port (n−1) and port n, namely, the variable is 1 when a packet has arrived and 0 when no packet has arrived, and perform the following processing:

$l_0:=0$ for each processor n, in parallel (n:=1 to N)

$f_{n,1}:=l_{n-1}+l_n$;

and provide output of $f_{n,1}$, the number of packets arriving at the two ports.

In addition, this invention includes a device that accepts input of synchronized fixed-length optical packets, gives different delay times to the respective optical packets and outputs same on a single light path, wherein:

each of the respective first-stage processors P(1,n) is provided with a register R(1,n) that temporarily stores its respective output of ($f_{n,i}$), and when the $(m-1)^{th}$ stage processors are defined for the integers m from 2 to $\log_2 N$, for the $m^{th}$-stage processors, and for the integers n from $\beta+1$ to N where $\beta=2^{m-1}$, for the value of the $n^{th}$ register R(m−1,n) connected to the previous-stage processor P(m−1,n) and the value of the $(n-\beta)^{th}$ register R(m−1,n−$\beta$), processor P(m,n) performs the processing:

$f_{n,m}:=f_{n-m-1}+f_{n-\beta,m-1}$ and provides output of $f_{n,m}$.

In addition, this invention includes a device that accepts input of synchronized fixed-length optical packets, gives different delay times to the respective optical packets and outputs same on a single light path, wherein, the $(M+1)^{th}$ processors $P_{M+1,n}$ (where $1 \leq n \leq N$) use $f_{n-1,M}$ as the number of optical packets arriving from ports 1 to n−1, $l_n$ which indicates the presence of an optical packet arriving at port n, and the queue length q, for the integers n from 1 to N, and perform the processing:

if $l_n=0$ exit;

else $\Delta_n:=q+f_{n-1,M}$;

but if $\Delta_n<B$ Packet n is given delay $\Delta_n$;

and if not $\Delta_n<B$ Packet n is discarded;

in this order, and outputs the value of the delay $\Delta_n$ as information that specifies the delay element.

In addition, this invention includes a device that accepts input of synchronized fixed-length optical packets, gives different delay times to the respective optical packets and outputs the same on a single light path, wherein:

for the $f_{N,M}$ stored in register R(M,N), the value of the larger of $(\min(q+f_{n,M},\beta)-1)$ and 0 is stored as the new queue length $(q_{new})$ in register Q.

As described above, since arrival gap time is always zero and packet length is unity in the case of synchronously-arriving fixed-length packets, this invention simplifies the calculation and the implementation in hardware, and can further increase the speed of data processing.

In addition, this invention includes a device that accepts input of synchronous fixed-length optical packets from a plurality of lightpaths, gives each of the optical packets one of B different delay times and outputs same to a single optical path, comprising:

reading means that reads the presence of optical packets and priority-class information of the optical packets on the respective lightpaths, a queue consisting of a plurality of delay elements that temporarily store the plurality of optical packets and give each optical packet one of B different delay times, an optical switch that directs the optical packet to one of the plurality of delay elements, an optical multiplexer connected by lightpaths to the plurality of delay elements, and an output lightpath connected by a lightpath to the multiplexer, and a controller that selects the delay element to be used for temporary storage for the optical packets in order to prevent the optical packets from overlapping in the output lightpath by using the delay times of the delay elements and the presence information of the optical packets and the priority-class information of the optical packets, and this controller is such that:

when the plurality of lightpaths are given sequential numbers n from 1 to N, and in the following, cases in which there is none corresponding to n can be neglected, for the presence information of the optical packets and the priority-class information of the optical packets in the respective lightpaths, as the arrangement of the first stage of processors and registers, processors P(1,n) that perform the calculation using the optical packet presence information and priority-class information on the $(n-1)^{th}$ lightpath and the optical packet presence information and priority-class information on the $n^{th}$ light path, and registers R(1,n) that store the results of calculation are disposed, as the arrangement of the $m^{th}$ ($2 \leq m \leq \log_2 N$) stage, processors P(m,n) that perform the calculation of the registers $R(m-1,n-2^{m-1})$ or copies thereof and the registers R(m-1,n) or copies thereof, and registers R(m,n) that store the results of calculation are provided, for the integers M where $2^M = N$, on the $(M+1)^{th}$ stage a processor and a register Q that stores the information at the queue length are provided, moreover, processor P(M+1,1) is used to determine the delay applied to the first synchronous fixed-length optical packet from the optical packet presence information and the optical packet priority-class information for the first lightpath or a copy thereof and the value of the register Q, and for values of n greater than 1, processors P(M+1,n) are used to determine the delay applied to the $n^{th}$ synchronous fixed-length optical packet, by calculation on the optical packet presence information and optical packet priority-class information for the nth lightpath or a copy thereof and the values of the register R(M,n−1) and the register Q, thereby coordinating the delay times given to the synchronous fixed-length optical packets of the respective lightpaths.

In addition, this invention includes a device that further comprises reading means that takes readings of the presence of optical packets and the priority-class information of optical packets in the respective light paths, wherein the respective first-stage processors receive input variables $l_{n-1}$ and $l_n$ that indicate the presence of optical packets arriving at port (n−1) and port n of 1 when a packet has arrived and 0 when no packet has arrived, receive input variables $c_{n-1}$ and $c_n$ that indicate the priority-class of optical packets arriving at port (n−1) and port n of 1 when a packet belongs to high-priority class and 0 when a packet belongs low-priority-class, and perform the following processing:

$l_0 := 0, c_0 := 0$;

for each processor n, in parallel (n:=1 to N)

begin $f_{n,1} := l_{n-1} + l_n$;

$g_{n,1} := c_{n-1} l_{n-1} c_n l_n$;

end, and provide output of $f_{n,1}$, the number of packets arriving at the two ports and output of $g_{n,1}$, the number of high-priority-class packets arriving at the two ports.

In addition, this invention includes a device that each of the respective first-stage processors P(1,n) is provided with a register R(1,n) that temporarily stores its respective outputs of $(f_{n,1}, g_{n,1})$, and when the $(m-1)^{th}$ stage processors are defined for the integers m from 2 to $\log_2 N$, for the $m^{th}$-stage processors, and for the integers n from $\beta+1$ to N where $\beta = 2^{m-1}$, for the value of the $n^{th}$ register R(m−1,n) connected to the previous-stage processor P(m−1,n) and the value of the $(n-\beta)^{th}$ register R(m−1,n−β), processor P(m,n) performs the processing:

$f_{n,m} := f_{n-m-1} + f_{n-\beta, m-1}$ $g_{n,m} := g_{n-m-1} + g_{n-\beta, m-1}$ and provides outputs of $f_{n,m}$ and $g_{n,m}$.

In addition, this invention includes a device that the $(M+1)^{th}$ processors $P_{M+1,n}$ (where $1 \leq n \leq N$) use $f_{n-1,M}$ as the number of optical packets arriving from ports 1 to n−1, $g_{n-1,M}$ as the number of high-priority-class optical packets arriving from ports 1 to n−1, $l_n$ which indicates the presence of an optical packet arriving at port n, $c_n$ which indicates the priority-class information of an optical packet arriving at port n, and the queue length q, for the integers n from 1 to N, and when $l_n = 1$, perform the following processing:

1) when q is less than the predetermined threshold TH, set $\Delta_n := q + f_{n-1,M}$;

when q is not less than TH, set $\Delta_n := q + g_{n-1,M}$;

2) when $\Delta_n$ is less than B and when $c_n$ shows high-priority, or, when q is less than TH and when $\Delta_n$ is less than B and when $c_n$ shows low-priority class, Packet n is given delay $\Delta_n$;

and when $\Delta_n$ is not less than B or when $c_n$ shows low-priority and when $\Delta_n$ is not less than TH, Packet n is discarded;

in this order, and outputs the value of the delay $\Delta_n$ as information that specifies the delay element.

In addition, this invention includes a device for the $f_{N,M}$ and $g_{N,M}$ stored in register R(M,N) and for q stored in register Q, when q is less than the threshold TH, the larger value between $(\min(q+f_{n,M}, B)-1)$ and 0 is stored as the new queue length $(q_{new})$ in register Q, and when q is not less than the threshold TH, the larger value between $(\min(q+g_{n,M}, B)-1)$ and 0 is stored as the new queue length $(q_{new})$ in register Q.

BRIEF EXPLANATION OF THE DRAWINGS

FIG. 3(a) shows a mechanical type of optical switch, and FIG. 3(b) shows an optical switch that uses semiconductor devices.

FIG. 4 is a diagram illustrating the construction of a 4-input×1-output optical buffer, where FIG. 4(a) shows the state when four optical packets arrive, FIG. 4(b) shows the position of optical packet A when switched to delay line $d_0$, and FIG. 4(c) shows the state when the three optical packets A, B and C are output.

FIG. 10(a) is a block diagram illustrating an example of the management information processor of the device of FIG. 8, and FIG. 10(b) is a block diagram illustrating another example of a management information processor.

FIG. 12(a) shows the state when four optical packets arrive, FIG. 12(b) shows the position of optical packet A when switched to delay line $d_0$, and FIG. 12(c) shows the state when the three optical packets A, B and C are output.

FIG. 14 is a time chart for describing a buffering device for asynchronous variable-length optical packets.

FIG. 30 is an example of a plot illustrating the relationship of the number of logic elements (y-axis) required to achieve an image circuit that has a specified number of input ports (x-axis).

DESCRIPTION OF THE PREFERRED EMBODIMENT

Here follows a detailed description of a preferred embodiment of the preferred embodiment made with reference to the drawings. In the examples below, devices or the like that have the same or similar functions are given the same numbers.

Figure 1:
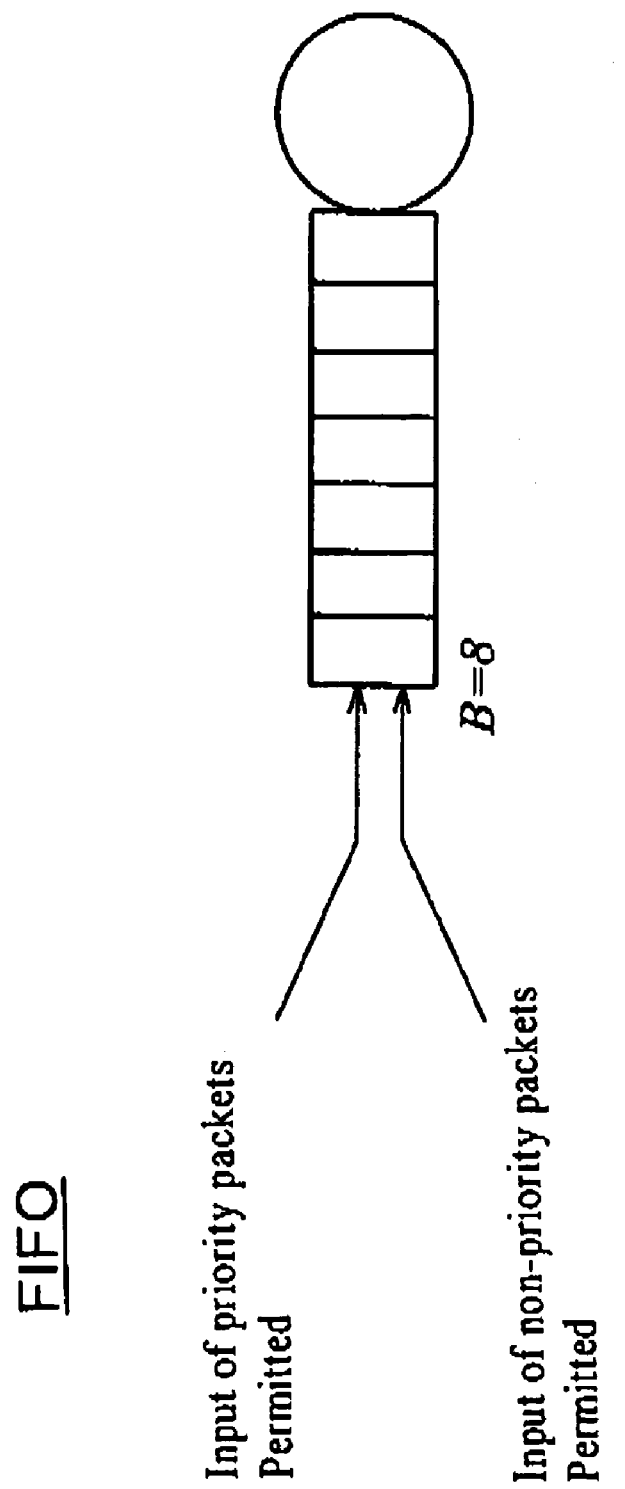
FIG. 1 is a diagram illustrating a queue that represents the state of a buffer that is typically used.
Figure 2:
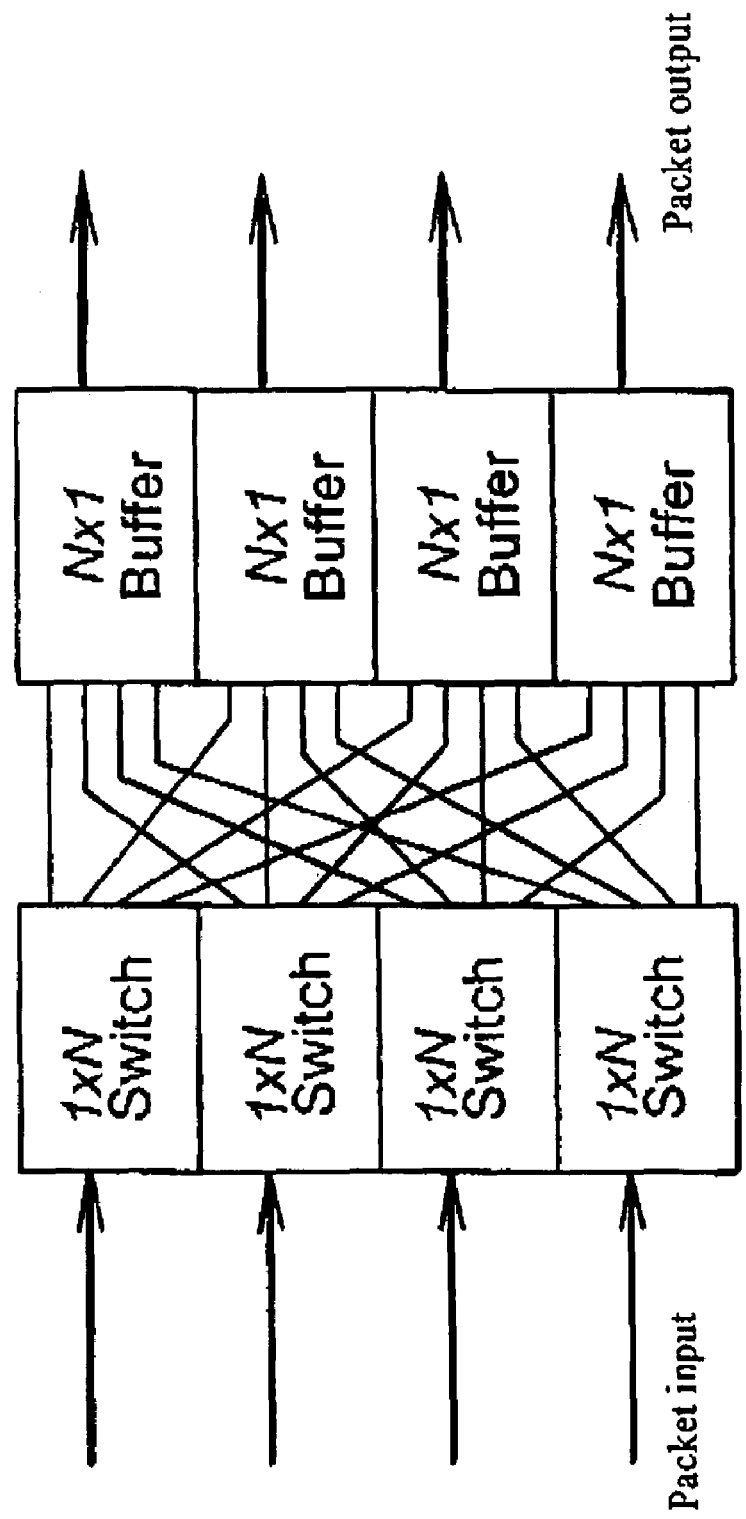
FIG. 2 is a diagram illustrating an example of conventional optical packet switch architecture.
Figure 3:
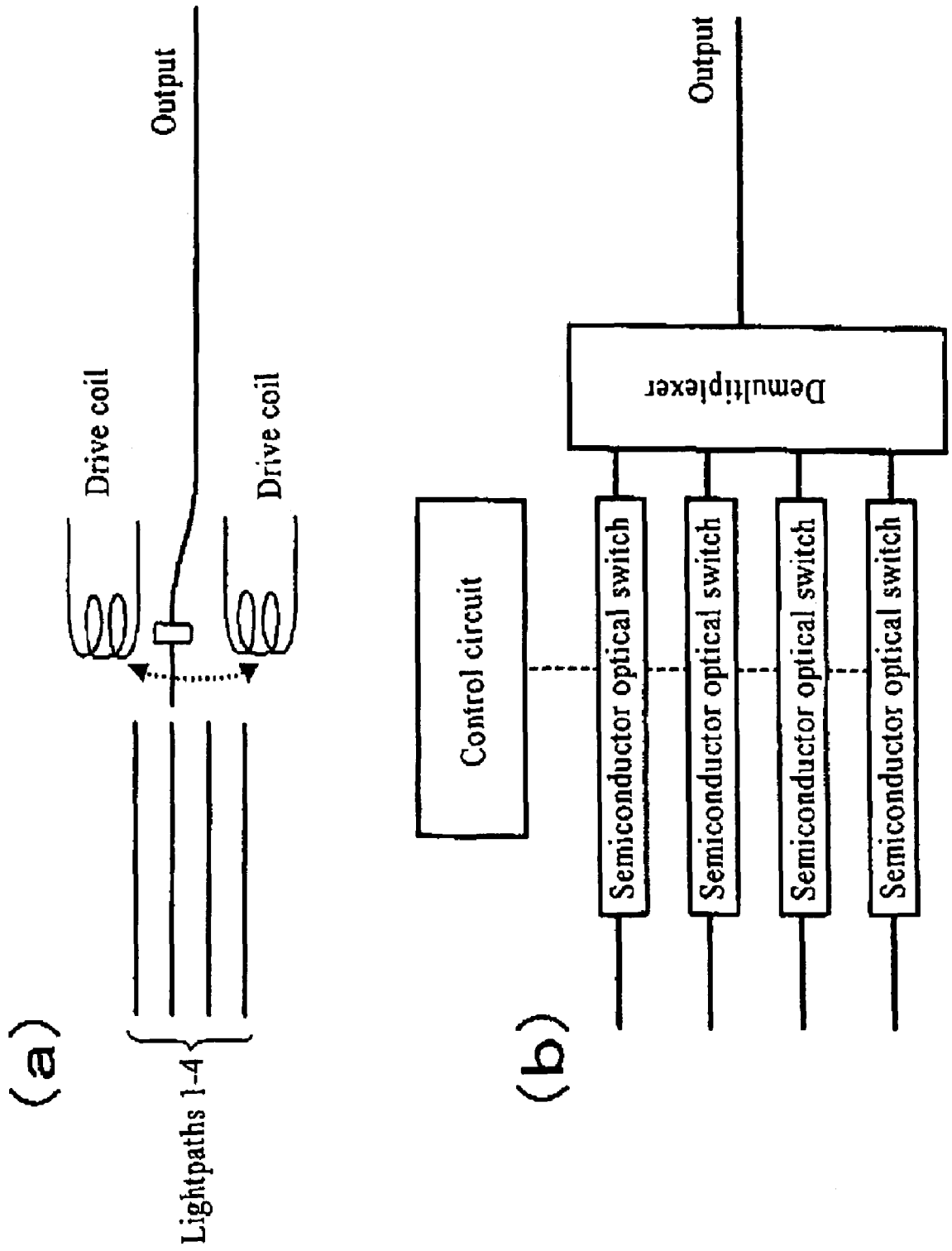
FIG. 3 illustrates an optical switch that can be used in an optical packet switch, where
Figure 5:
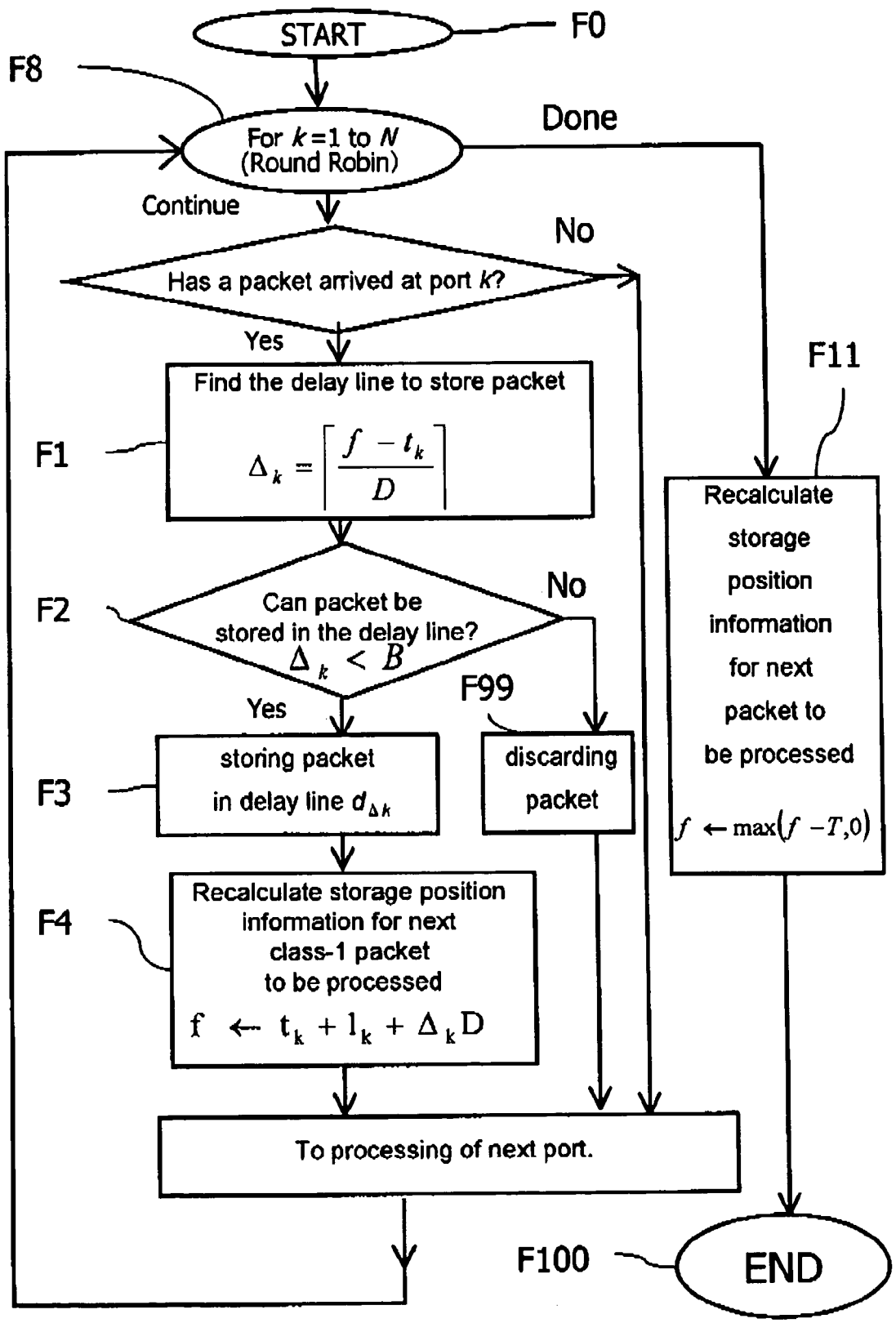
FIG. 5 is a flowchart of the processing of the round-robin scheduling.
Figure 6:
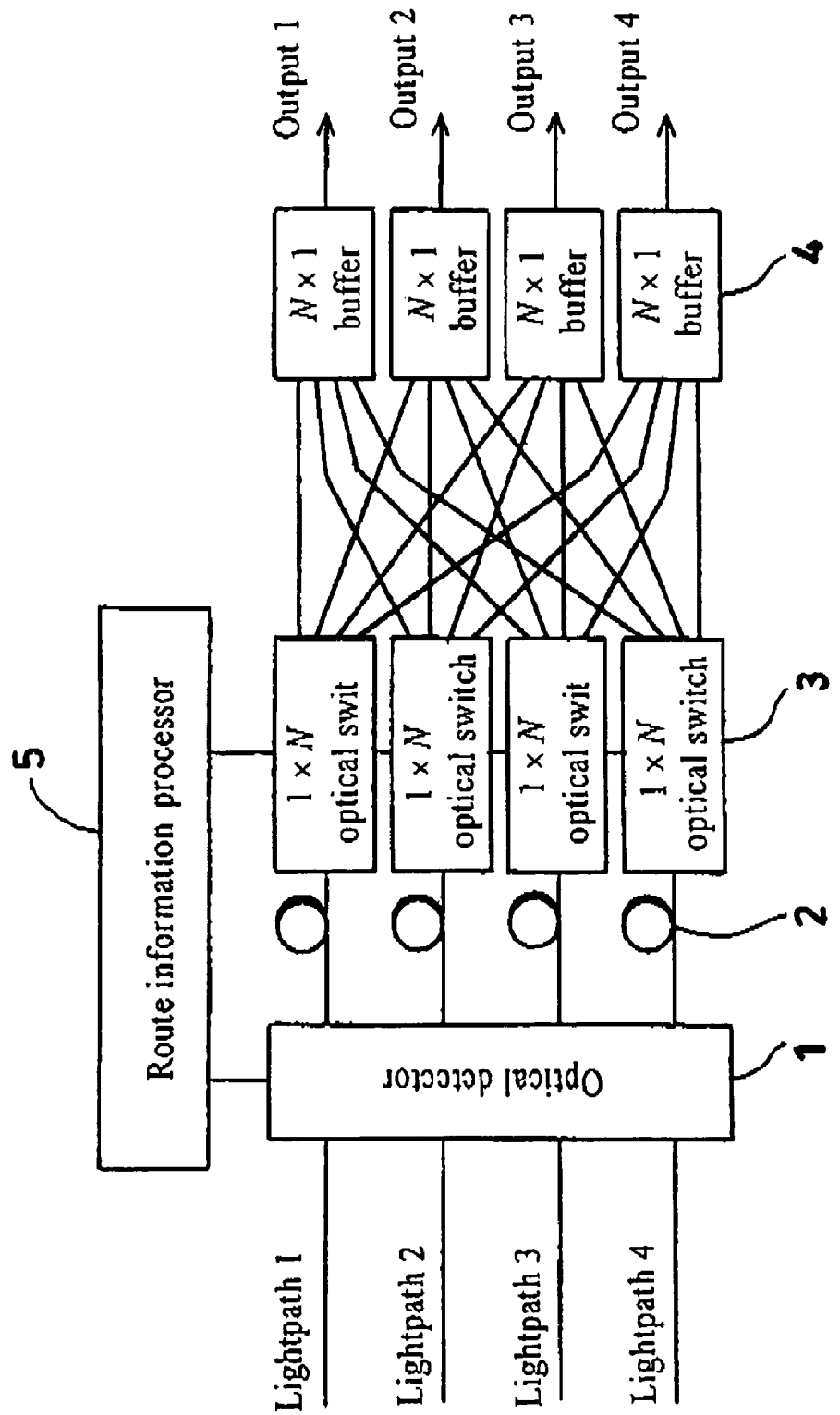
FIG. 6 is a diagram illustrating the optical packet switch including buffering device according to the present invention.

FIG. 6 illustrates an overview of a buffering device for asynchronously arriving variable-length optical packets. FIG. 6 is a device that accepts input of asynchronously-arriving variable-length optical packets transmitted on a plurality of lightpaths and outputs the variable-length optical packets to an optical path depending on address information in the packet, so optical packet signals transmitted over lightpaths 1 through 4 are directed into outputs 1 through 4. The signals input from each of the respective lightpaths are converted with an optical detector 1 to an electrical signal, and their header information is read and processed by a route information processor 5 as route information. This route information is sent to a (1×N) optical switch 3 where M=4 and thus the output direction is determined. The delay lines 2 between the optical detector 1 and (1×N) optical switches 3 are used to synchronize the optical packet signals and electrical signals.

Figure 7:
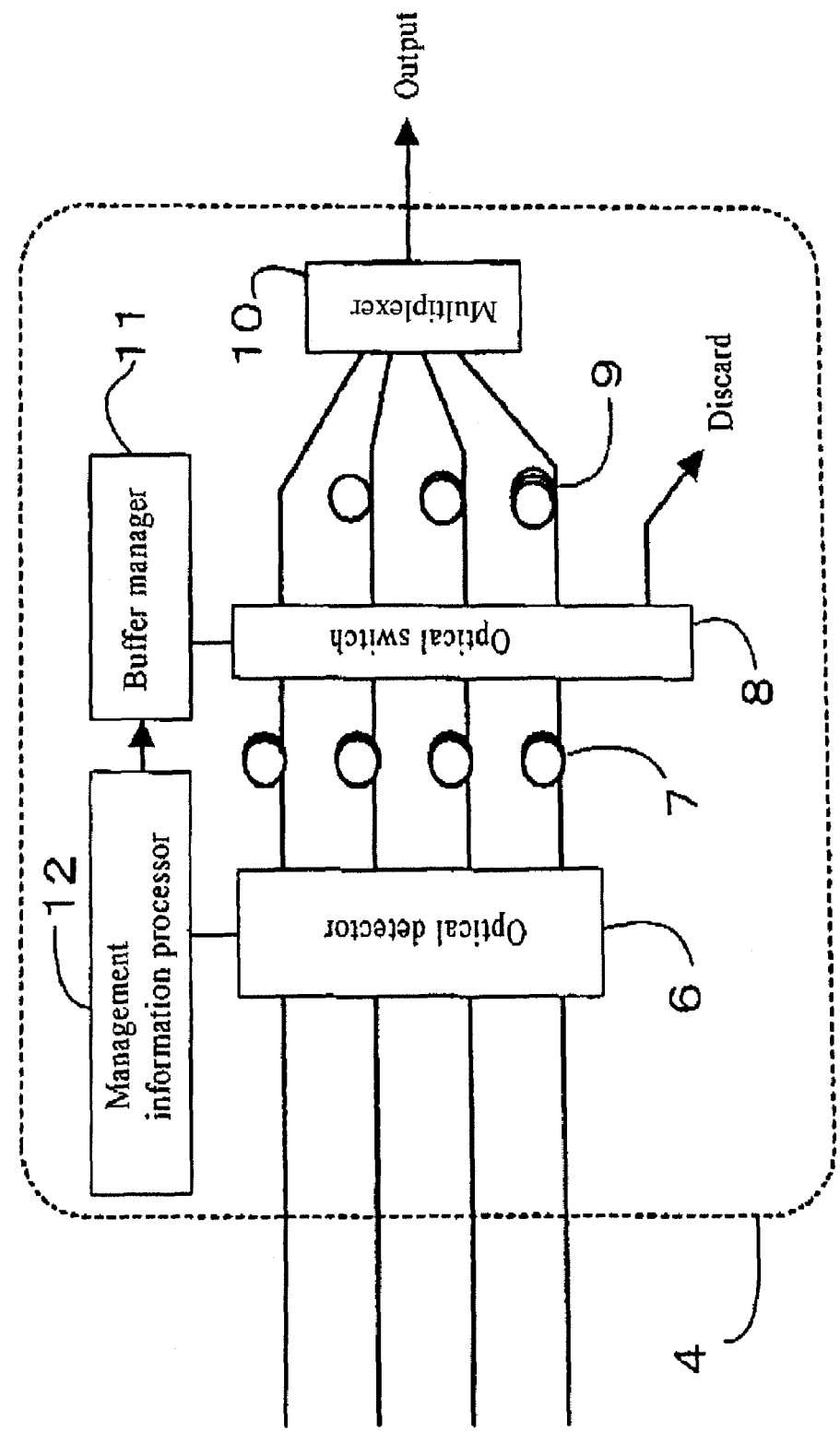
FIG. 7 is a block diagram illustrating the constitution of an N×1 buffer.

Here, the (N×1) buffers 4 are buffers characteristic of the present invention, having the constitution described in FIG. 7. Each buffer comprises: reading means that reads the optical packet length of the variable-length optical packets on the respective lightpaths, reading means that reads a time difference (the lead time of the optical packet) between a clock prepared in advance and the subsequent most recent variable-length optical packet, a queue consisting of delay elements that temporarily store the optical packet and give the optical packet one of B different delay times, an optical switch that directs the optical packet to one of the plurality of delay elements, an optical multiplexer connected by lightpaths to the plurality of delay elements, and an output lightpath connected by a lightpath to the multiplexer.

FIG. 7 illustrates the constitution of the (N×1) buffer 4. An optical detector 6 converts the optical signal to an electrical signal so that the buffer manager 11 can thus read the length l of the optical packet signal and the interval (the lead time of the packet) t from the optical packet to a clock signal generated internally or supplied from outside. In this buffer manager 11, these values of l and t are used to perform data processing so that the optical packet signals transmitted from the lightpaths through the respective delay lines 7 do not overlap. This output is used to control an optical switch 8 and determine which of the delay lines 9 is to be selected. The optical packet signals that pass through each of the delay lines 9 are multiplexed by the multiplexer 10 and output.

Figure 8:
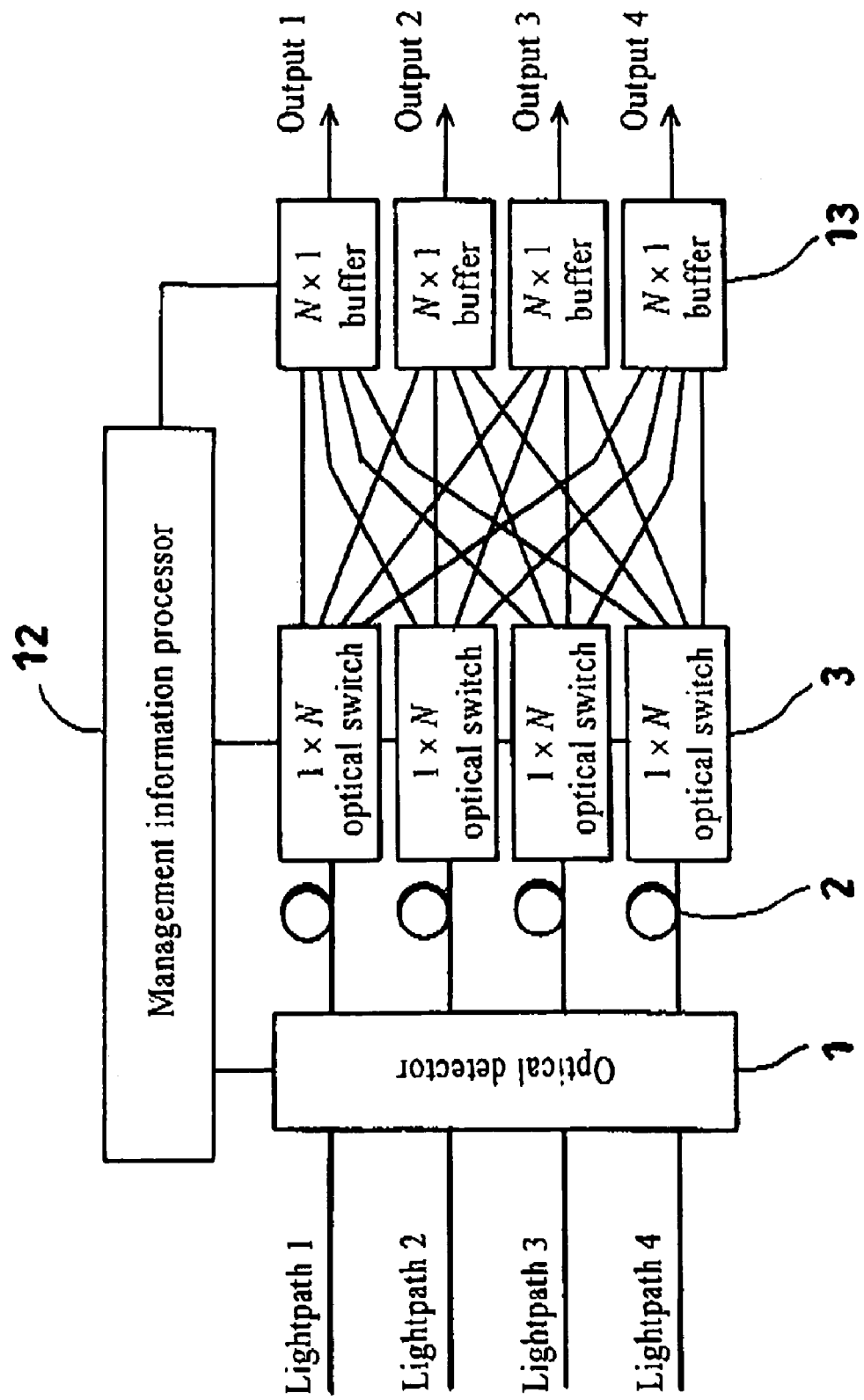
FIG. 8 is a block diagram illustrating the optical packet switch including optical buffering device according to the present device.
Figure 9:
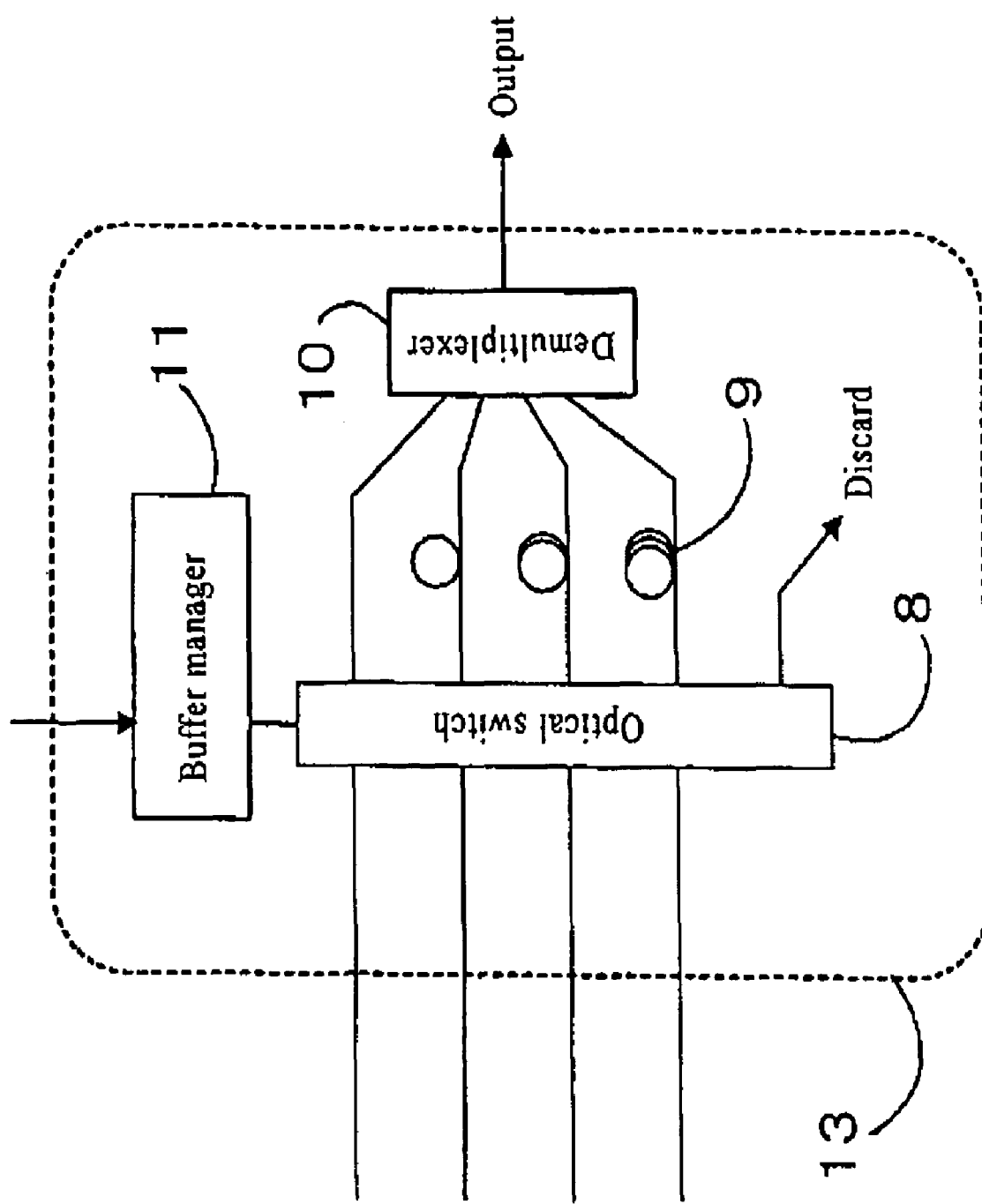
FIG. 9 is a block diagram illustrating the constitution of an N×1 buffer.

In the constitution illustrated in FIG. 6, each of the optical packet signals is converted to an electrical signal twice, but as in the constitution of a buffering device for asynchronously-arriving variable-length optical packets shown in FIG. 8, it may be converted to an electrical signal in the optical detector 1 and this electrical signal can be used by the management information processor 12 as is, or after being subjected to data processing, to control the (1×N) optical switch 3 and (N×1) buffers 13. In contrast to the constitution of the (N×1) buffers 4, the constitution of the (N×1) buffers 13 in this case is such that, as illustrated in FIG. 9, it is possible to reduce the number of times the optical-to-electrical conversion is performed and thus reduce the number of optical detectors.

Figure 11:
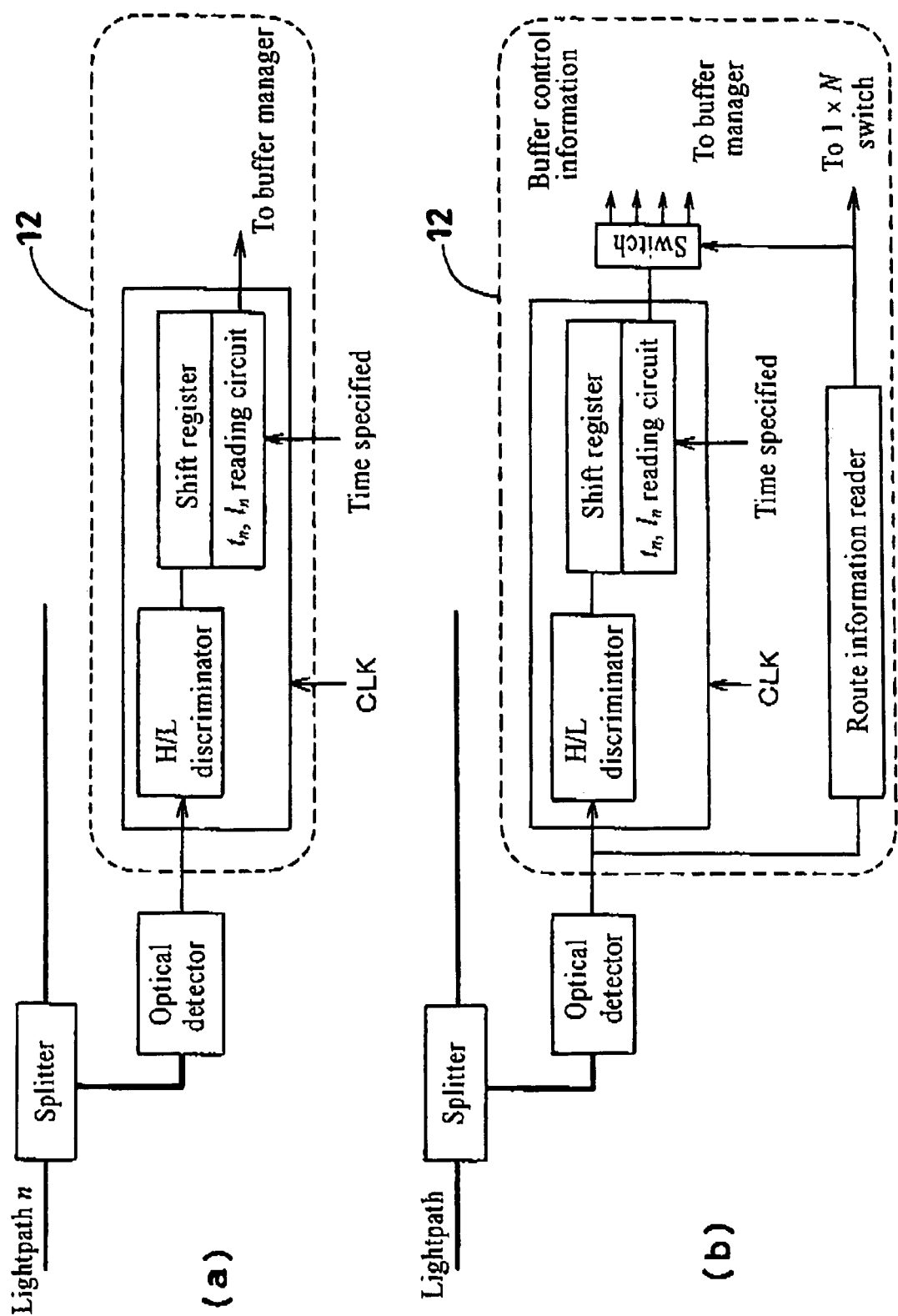
FIG. 11(a) is a block diagram illustrating the constitution of the management information processor of the device of FIG. 8.
FIG. 11(b) is a block diagram illustrating another example of a management information processor.

As the management information processor 12, it is possible to use one of the constitution illustrated in FIG. 10(*a*) or FIG. 11(*a*).

In the one of FIG. 10(*a*), the high/low (H/L) voltage of the signal converted to an electrical signal is determined and then this is recorded in a time recorder as the time to perform high/low switching; this time data is recorded in a register and this data is periodically supplied to the buffer manager.

In addition, in the one of FIG. 11(*a*), the high/low voltage of the signal converted to an electrical signal is determined and then this is regularly written to a shift register. The time to perform high/low switching is read as the address of the shift register and compared against the clock signal to obtain the length l of the optical packet signal and the interval t between the optical packets.

A unit of the constitution shown in FIG. 10(*b*) can be used as the management information processor 12. This unit branches the output of the optical detector, directing one branch to a circuit that generates a signal supplied to the buffer manager and directing the other branch to a circuit that extracts route information. In order to generate a signal to be supplied from one branch to the buffer manager, the high/low voltage of the signal converted to an electrical signal is determined and the time to perform high/low switching is recorded in a time recorder and this time data is recorded in a register. This register outputs information for a certain optical packet signal at a specified time. A switch is used to direct this output to the respective buffer managers according to the output from the route information reader.

A unit of the constitution shown in FIG. 11(*b*) can be used as the management information processor 12. This unit determines the high/low voltage of the signal converted from an optical packet signal to an electrical signal then this is regularly written to a shift register. The time to perform high/low switching is read as the address of the shift register to obtain the length l of the optical packet signal and the interval t between the optical packets.

Here follows a description of the length l of the optical packet signal at a specified buffering time and the interval t between the optical packet and clock signal. First, the buffering is assumed to be performed every T seconds and this time T is to be smaller than the minimum value of l. Specifically, T is determined so that in the interval from time $T_0$ to time $T_1$ which is T seconds later, no more than one packet arrives at the same port. At this time, if no optical packet signal should arrive in the interval from time $t_0$ to time $T_1$, then l is zero and t is also zero. However, if an optical packet signal arrives in the interval from time $T_0$ to time $T_1$, then the length of this optical packet signal is set as l and the interval between the clock signal and the end of the optical packet signal closest to time $T_1$ is set as t. Specifically, in the event that an optical packet signal is so long as to extend across a plurality of periods, then that optical packet signal is deemed to belong to the first period time that it extends across.

Figure 12:
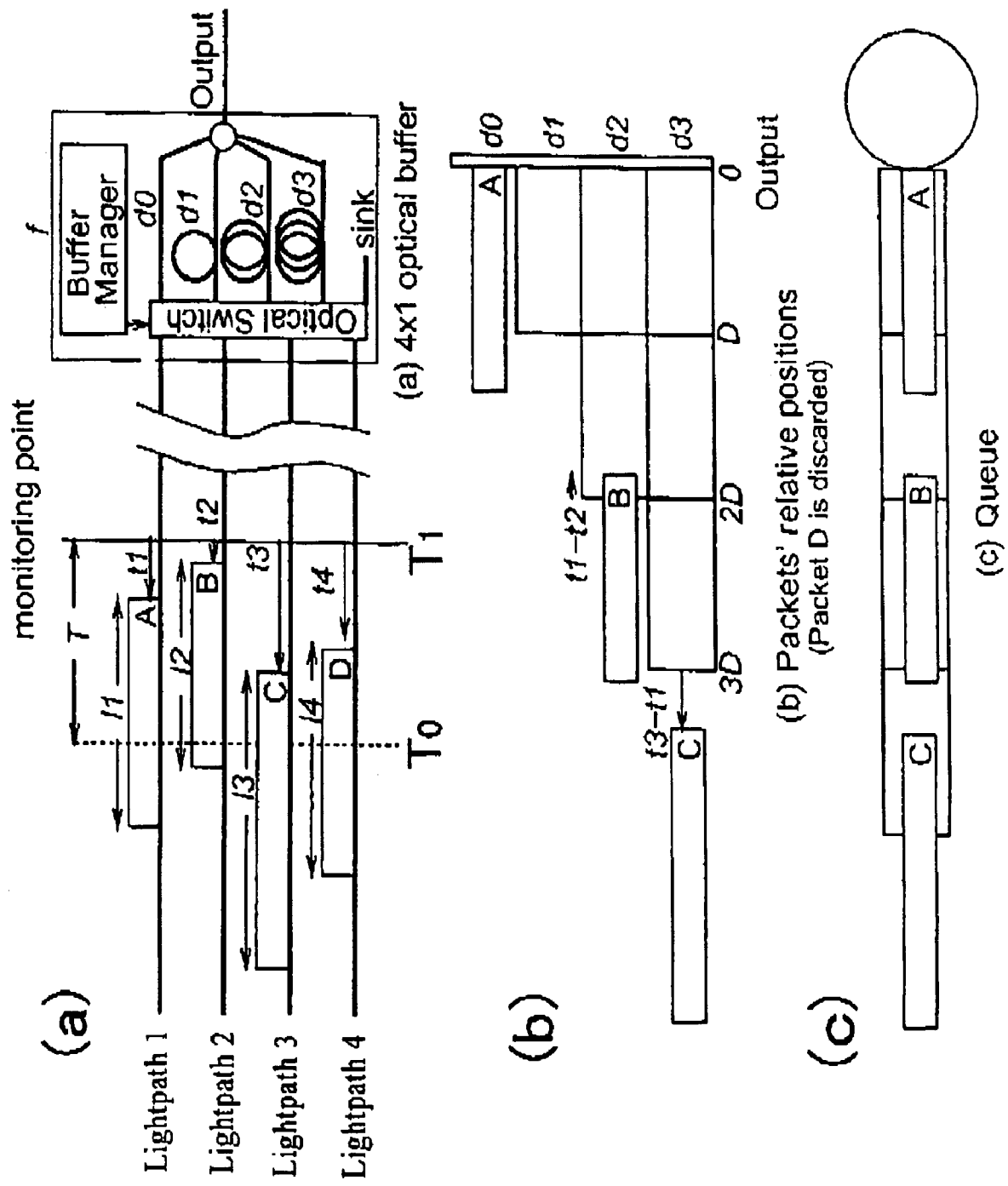
FIG. 12 is a time chart for describing a buffering device for asynchronous variable-length optical packets, where

The following description pertains to a buffering device as shown in FIG. 12 that coordinates variable-length packets transmitted asynchronously over a plurality of lightpaths so that they do not overlap and are sent together over a single lightpath. In order to prevent overlapping, the length of the arriving optical packet signals and the interval between the optical packet signal and the clock signal are used to determine the delay element to which each of the optical packet signals is to be assigned, thereby giving the optimal delay. In the device of the constitution illustrated in FIG. 12, the constitution is such that the optical packet signals of lightpath 1 are given priority such that their delay is minimized, but it is also possible to give priority to the other light paths, so if there is a lightpath that is to be given priority, then it can be used to replace lightpath 1 of FIG. 12. Here, regarding the constitution of the delay elements, in FIG. 12 these are given equal differences of 0, D, 2D and 3D but even in the case that equal differences are not used, the method and constitution described below can be applied with only minor variations.

FIG. 12(*b*) is one example of the delays given to lightpaths 1 through 4. The optical packet signal of lightpath 4 (signal D) is discarded, so it does not appear in FIG. 12(*b*). The optical packet signals that are given delay times and coordinated so that they do not overlap in this manner are lined up as shown in FIG. 12(*c*). Here, if it is possible to select even longer delay times, then one can easily imagine how the optical packet signal of lightpath 4 (signal D) can be transmitted and not discarded.

Example 1

Figure 13:
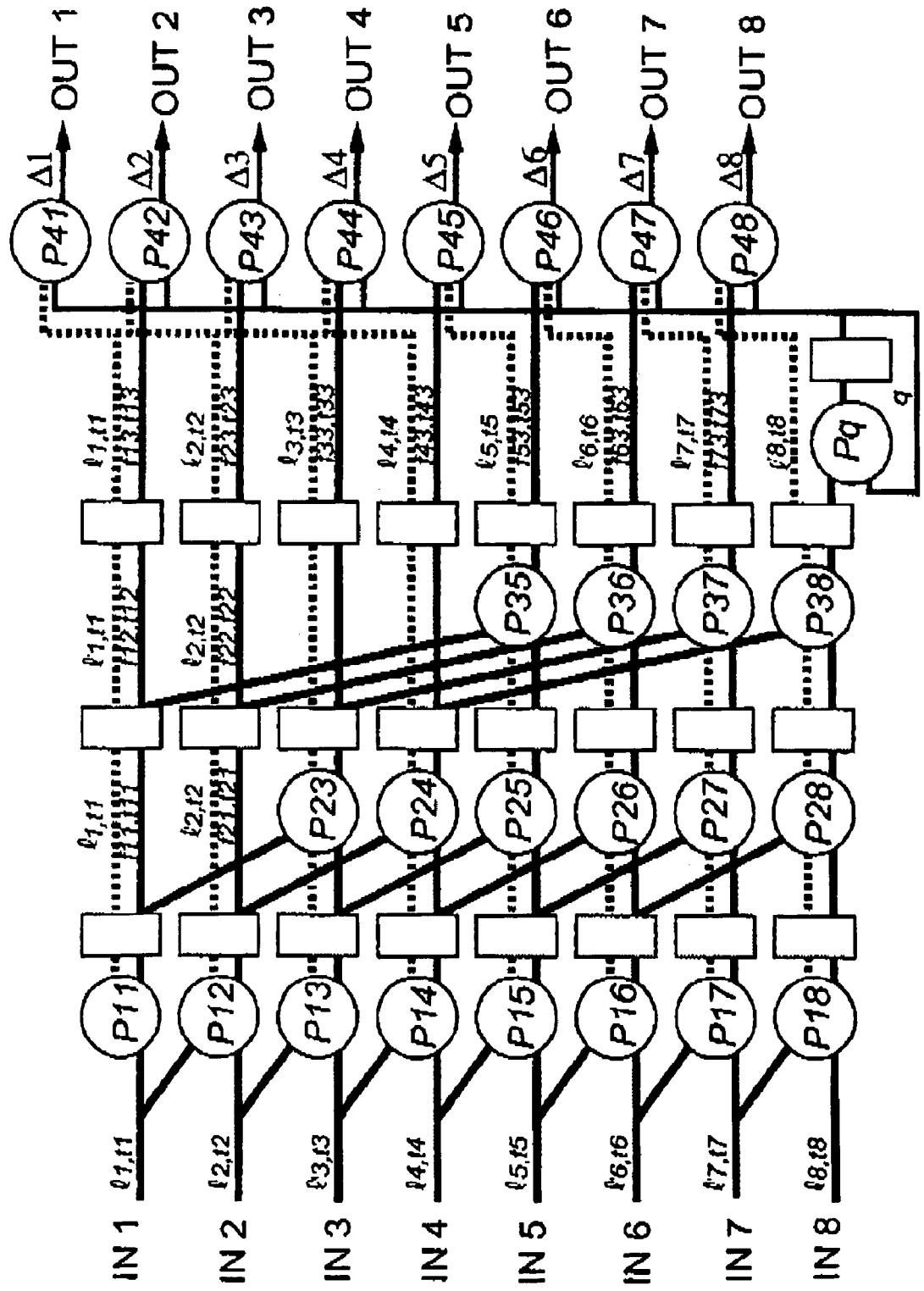
FIG. 13 is a block diagram of a parallel processing circuit used in the case of asynchronous variable-length optical packets.

The main point of the present invention is to determine the delay times for as many packets as possible per time unit. To this end, a large number of processors $P_{ij}$ are disposed as shown in FIG. 13 to perform the processing required to determine the delay times in parallel. Here, $P_{ij}$ refers to the processor provided on the $i^{th}$ stage of the $j^{th}$ lightpath. In order to be particularly clear, $P_{ij}$ may be represented as P(i,j).

In FIG. 13, the length l (L) of the optical packet signals of the eight lightpaths from $IN_1$ to $IN_8$ and the interval (packet pre-period) t from the optical packet signal to the clock signal are used to perform coordination so that the percentage of optical packets discarded is minimized. In this case also, delay elements that are arranged with equal differences between their delay times are shown, and the $\Delta_n$ serving as the output is shown as a coefficient of the base delay time of D. In FIG. 13, the circles indicate processors and the squares are registers R. Here, the registers include registers R(1,1) that store the results of processing by the immediately previous processor and the registers R'(1,1) that store the optical packet length of the optical packet on the first light path and the lead time of the optical packet. The respective registers $R_{ij}$ also have their positions indicated by the subscripts (ij) and are also indicated R(i,j), When there is a processor, the same subscripts are used. This register R'(1,1) is used to coordinate the timing of the arithmetic processing, so it is not absolutely necessary to be provided in this portion, but rather processing may be performed with the constitution illustrated in FIG. 26, so it may be sufficient to perform the coordination of this timing using a well-known delay circuit (although not shown in the figure) until the process of updating the position in the queue is performed. However, the circuit design can be simplified by using parallel registers R(1,1) as shown above.

In the constitution shown in FIG. 13, in order to prevent the input optical packets from overlapping in the lightpath used for output, the delay times of the delay elements and the read optical packet lengths and optical packet pre-periods are used to determine the delay element where it is to be temporarily stored. For convenience, we shall distinguish the plurality of lightpaths with a sequence number n from 1 to N. In the following, if there is no processor or register corresponding to the number of a lightpath, then its function is to perform an identity operation or the value it holds is zero, In this case, the optical packet length and the lead time of the optical packet of each respective lightpath is calculated using a buffering device for optical packets of the following constitution. This is a buffering device for asynchronously arriving optical packets characterized in that it:

1) comprises reading means that reads the optical packet length of the variable-length optical packets on the respective lightpaths, reading means that reads a time difference (the lead time of optical packet) between a clock prepared in advance and the subsequent most recent variable-length optical packet, a queue consisting of delay elements that temporarily store the optical packet and give the optical packet one of B different delay times, an optical switch that directs the optical packet to one of the plurality of delay elements, an optical demultiplexer connected by lightpaths to the plurality of delay elements, and an output lightpath connected by a lightpath to the demultiplexer, 2) comprises a controller that, in order to prevent the input optical packets from overlapping in the lightpath used for output, uses the delay times of the delay elements and the read optical packet lengths and optical packet pre-periods to calculate and determine the delay element where it is to be temporarily stored, 3) this controller is such that, when the plurality of lightpaths are given sequential numbers n from 1 to N, and in the following, the value is set to zero for those in which there is no corresponding lightpath, for the optical packet length and the optical packet pre-period in the respective lightpaths, as the arrangement of the first stage of processors and registers, processors P(1,n) that perform the calculation of the optical packet length and the optical packet pre-period on the $(n-1)^{th}$ lightpath and the optical packet length and the optical packet pre-period on the $n^{th}$ light path, and registers R(1,n) that store the results of calculation are disposed, 4) as the arrangement of the $m^{th}$ ($2 \leq M \leq \log_2 A$ stage, processors P(m,n) that perform the calculation of the registers $R(m-1,n-2^{m-1})$ or copies thereof and the registers R(m-1,n) or copies thereof, and registers R(1,n) that store the results of calculation are provided, 5) on the $(M+1)^{th}$ stage where $2^M = N$ are provided a processor and a register Q that stores the information at the tail end of the queue length, 6) moreover, processors P(M+1,1) that determine the delay applied to the first variable-length optical packet from the optical packet length and the lead time of the optical packet for the first lightpath or a copy thereof and the value of the register Q, and 7) for values of n greater than 1, processors P(M+1,n) that determine the delay applied to the $n^{th}$ synchronous fixed-length optical packet, by calculation on the optical packet presence information for the $n^{th}$ lightpath or a copy thereof and the values of the register R(M,n-1) and the register Q, thereby coordinating the delay times given to the synchronous fixed length optical packets of the respective lightpaths are provided, 8) and thus the delay time applied to the variable-length optical packets of the respective lightpaths is coordinated based on the output of the processors P(M+1,1) or the processors P(M+1,n).

The functions of the processors $P_{ij}$ will be described later. In the case that there are N elements $a_1, a_2, \ldots, a_N$, the prefix-sum operation is known as the way of finding the respective prefix sums $a_1, a_1+a_2, \ldots, a_1+a_2+, \ldots, a_N$, and the parallel prefix operation is known as a method of finding the solution by parallel processing using N processors. However, when this method is used to find the delay of packets, it is necessary to perform the calculation $\log_2 N+1$ times per processor and the delay of the next packet cannot be found during that period. In addition, the pipeline is known as a constitution that improves throughput by sending the results of each operation sequentially to the next stage, but even if previously known processing methods are applied, they cannot be used in the present invention. Processors of a unique constitution are required for application to the present invention, and processing suited to the buffering device and buffering method is required.

FIG. 14 presents the correspondence among the variables used below on a time chart. FIG. 14(*a*) is an example of the order of optical packet signals envisioned as the output of the buffering device according to the present invention. The input in this case is given in eight lightpaths. In addition, FIG. 14(*b*) presents the meaning of the variables used in the following description. In addition, FIG. 14(*c*) presents the coefficient of the base delay time, and this becomes the output.

Figure 15:
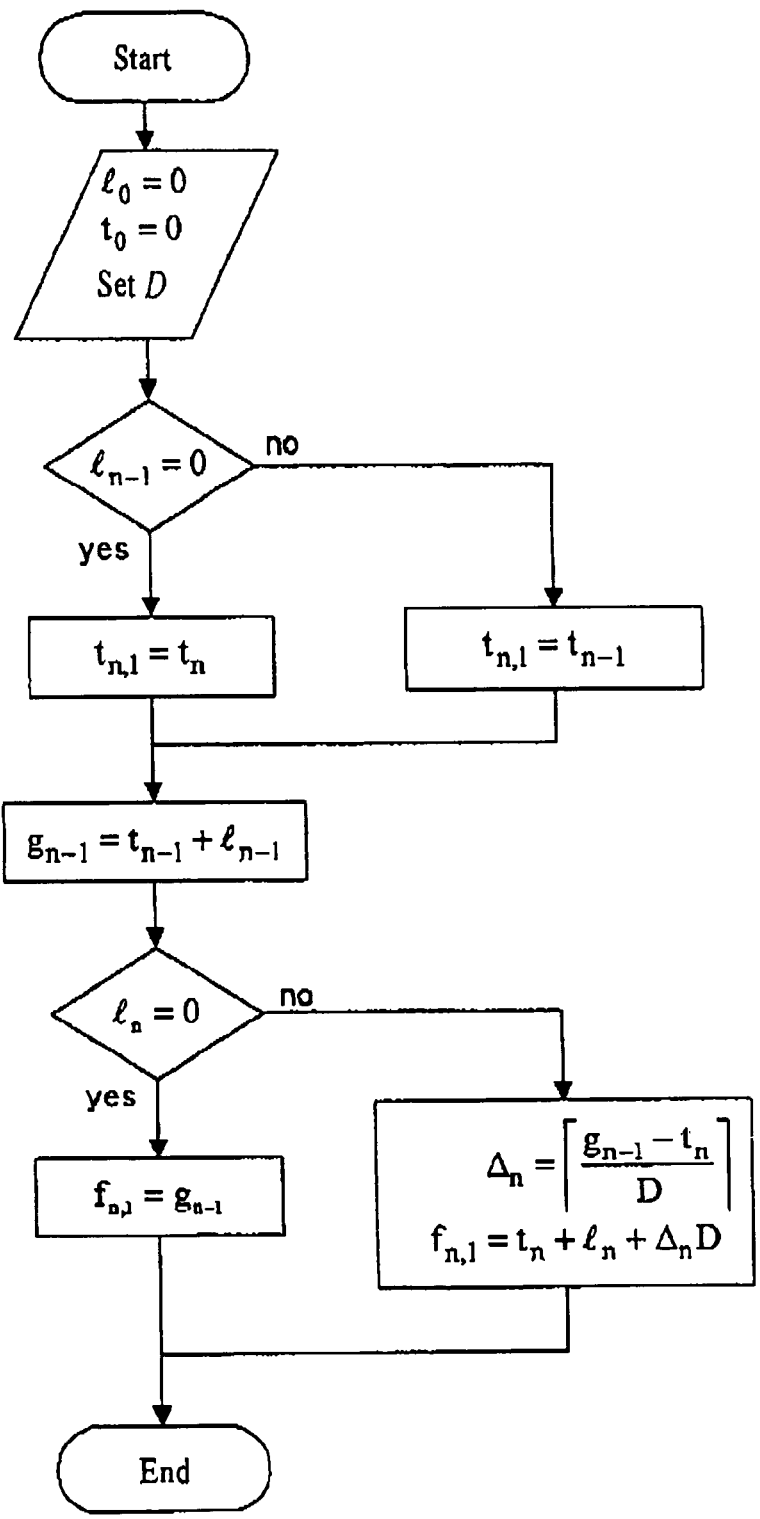
FIG. 15 is a flowchart of the processing of the first parallel processor.

The first-stage processors $P_{1n}$ perform processing according to the flowchart shown in FIG. 15. If this processing were written in the form of a program, it would be as follows.

[Table 2]

TABLE 2

First Stage ($P_{1n}$ : $1 \leq n \leq N$)
$l_n, l_{n-1}$ : packet length
$t_n, t_{n-1}$ : arrival gap time
$g_{n-1}$ ; temporary variable for queue length
$f_{n,1}, t_{n,1}$ : output
T : period
D : unit length of the delay element
B : number of the delay elements
for each processor n, in parallel (n = 1 to N)
begin
  if ($l_{n-1} = 0$) $t_{n,1} = t_n$;
  else $t_{n,1} = t_{n-1}$;
  $g_{n-1} = t_{n-1} + l_{n-1}$; : 直前のパケットの最後位置
  if ($l_n = 0$) $f_{n,1} = g_{n-1}$
  else begin
    $\Delta_n = \left\lceil \dfrac{g_{n-1} - t_n}{D} \right\rceil$;
    $f_{n,1} = t_n + l_n + \Delta_n D$;
  end
end In Table 2 above, the length of the optical packet is $l_n$ and the optical packet pre-period is $t_n$, for n=0, $l_n=t_n=0$, and the delay of the plurality of delay elements can be arranged as delays that increase by the delay time D. These first-stage processors are provided with N lightpaths on the input side, and perform the following processing on the integers n from 1 to N.

1) when $l_{n-1}=0$ is true, output $t_n$ as $t_{n,1}$, or
when $l_{n-1}=0$ is not true, output $t_{n-1}$ as $t_{n,1}$, 2) in addition, taking $g_{n,1}=l_{n-1}+t_{n-1}$, 3) when $l_n=0$ is true, output $g_{n-1}$ as $f_{n,1}$, or
when $l_n=0$ is not true, taking $\Delta_n$ to be the smallest integer no less than $(g_{n-1}-t_n)/D$ set $(t_n+l_n+\Delta_n D)$ to the output $f_{n,1}$.

Figure 16:
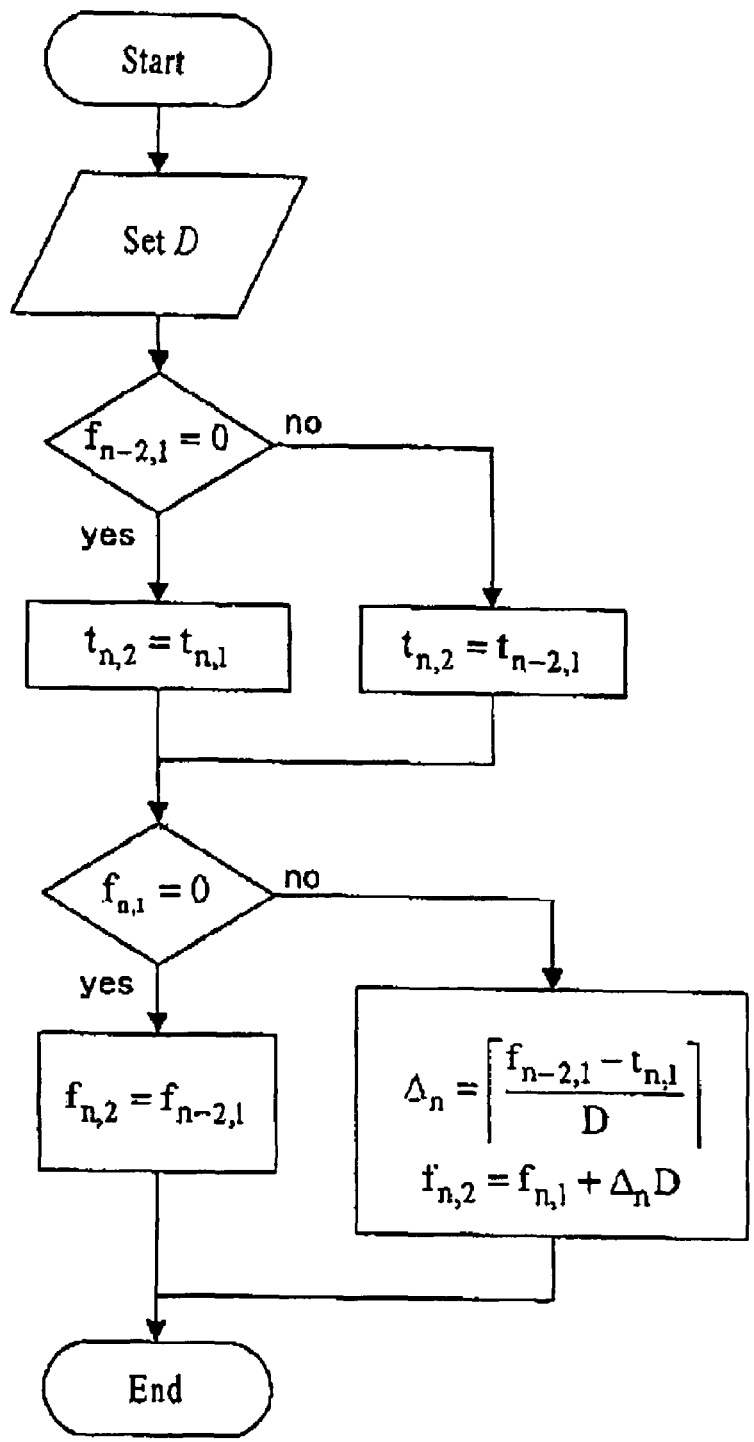
FIG. 16 is a flowchart of the processing of the second parallel processor.

The second-stage processors $P_{2n}$ perform processing according to the flowchart shown in FIG. 16. If this processing were written in the form of a program, it would be as follows.

[Table 3]

TABLE 3

Second Stage ($P_{2n}$ : $3 \leq n \leq N$)
fn,1 , fn-2,1 : last position of the combined packet
$t_{n,1}, t_{n-2,1}$ : arrival gap time
$g_{n-1}$ : temporary variable for queue length
$f_{n,2}, t_{n,2}$ : output
for each processor n, in parallel (n = 3 to N)

TABLE 3-continued

```
begin
    if (f_{n-2,1} = 0) t_{n,2} = t_{n,1};
    else t_{n,2} = t_{n-2,1};
    if (f_{n,1} = 0) f_{n,2} = f_{n-2,1};
    else begin
```
$$\Delta_n = \left\lceil \frac{f_{n-2,1} - t_{n,1}}{D} \right\rceil;$$

$$f_{n,2} = f_{n,1} + \Delta_n D;$$
```
    end ;
end
```

Table 3 above presents the buffering method of a device provided with the second-stage $(n-2)^{th}$ processor that, for the integers n from 3 to N, calculates the content of the nth register and the content of the $(n-2)^{th}$ register and gives the output of $(f_{n,2}, t_{n,2})$. Here, the following processing is performed.

On the integers n from 1 to N.

1) when $f_{n-2,1}=0$ is true, output $t_{n,1}$ as $t_{n,2}$, or
   when $f_{n-2,1}=0$ is not true, output $t_{n-2,1}$ as $t_{n,2}$, 2) in addition, when $f_{n,1}=0$ is true, output $f_{n-2,1}$ as $f_{n,2}$, or
   when $f_{n,1}=0$ is not true, 2-1) taking $\Delta_n$ to be the smallest integer no less than $(f_{n-2,1}-t_{n,1})/D$ set $(f_{n,1}+\Delta_n D)$ to the output $f_{n,2}$.

Figure 17:
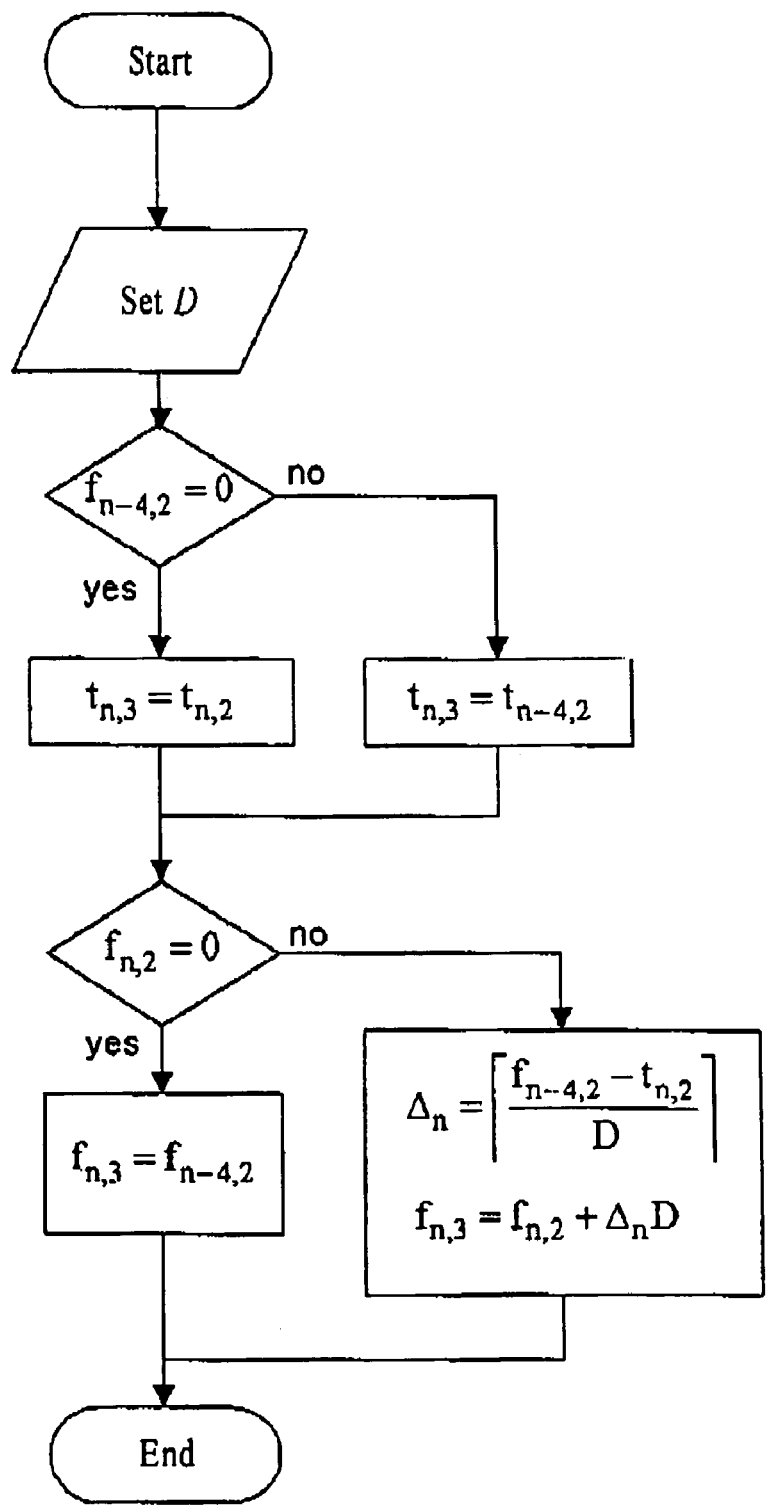
FIG. 17 is a flowchart of the processing of the third parallel processor.

The third-stage processors $P_{3n}$ perform processing according to the flowchart shown in FIG. 17. If this processing were written in the form of a program, it would be as follows.

[Table 4]

TABLE 4

```
Third Stage (P_{3n} : 5≦n≦N)
fn,2 , fn-1,2            : last position of the combined packet
t_{n,2}, t_{n-1,2}       : arrival gap time
f_{n,3}, t_{n,3}         : output
    for each processor n, in parallel (n = 5 to N)
    begin
        if (f_{n-4,2} = 0) t_{n,3} = t_{n,2};
        else t_{n,3} = t_{n-4,2};
        if (f_{n,2} = 0) f_{n,3} = f_{n-4,2};
        else begin
```
$$\Delta_n = \left\lceil \frac{f_{n-4,2} - t_{n,2}}{D} \right\rceil;$$

$$f_{n,3} = f_{n,2} + \Delta_n D;$$
```
        end ;
    end
```

Figure 18:
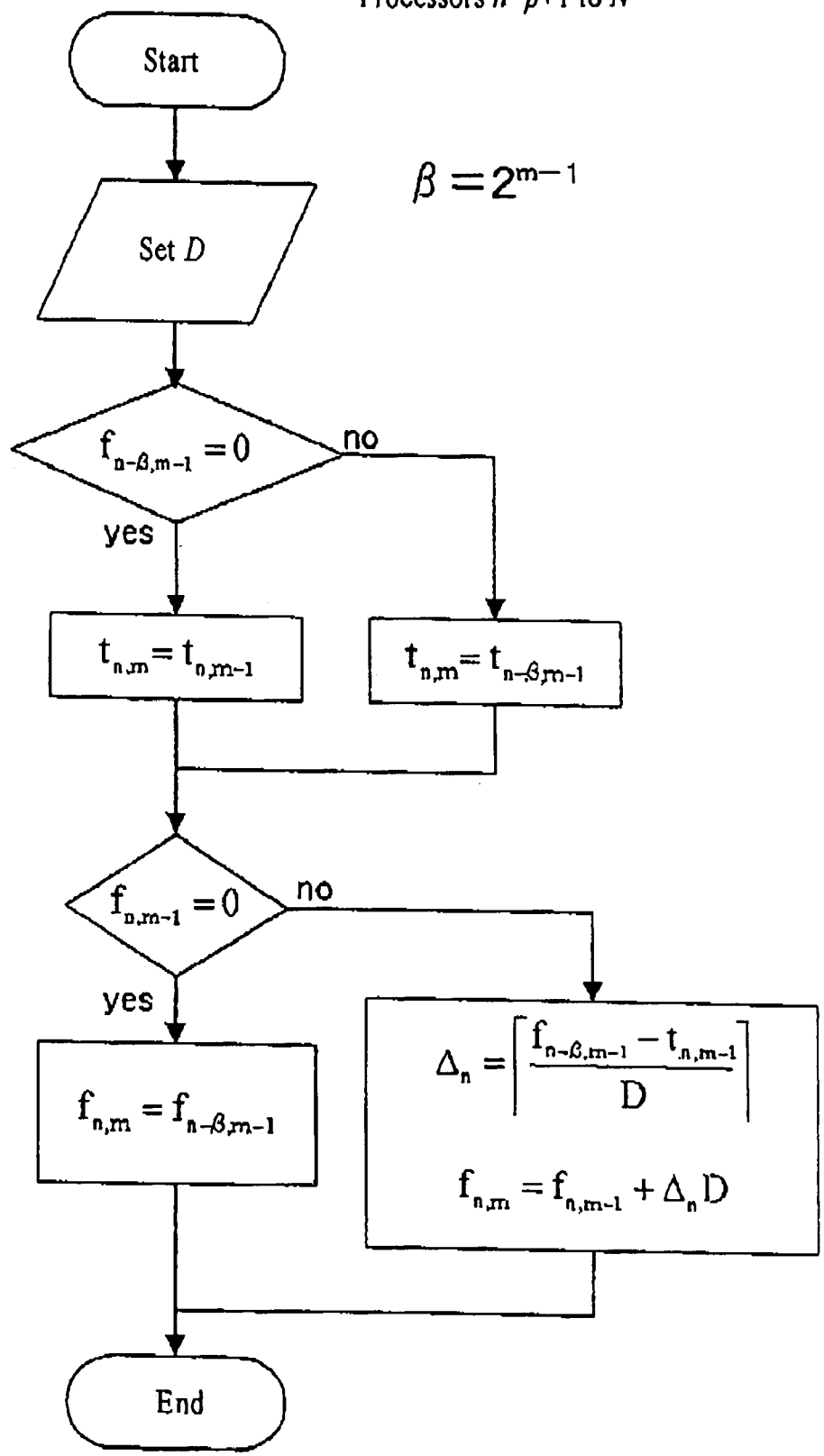
FIG. 18 is a flowchart of the processing of the $m^{th}$ parallel processor.

In general, the $m^{th}$-stage processors $P_{mn}$ perform processing according to the flowchart shown in FIG. 18. If this processing were written in the form of a program, it would be as follows.

[Table 5]

TABLE 5

```
m-th Stage (P_{mn} : 2^{m-1}+1≦n≦2^M=) : M=log_2 N
f_{n,m-1}, f_{n-2^{m-1},m-1}   : last position of the combined packet
t_{n,m-1}, t_{n-2^{m-1},m-1}   : arrival gap time
f_{n,m}, t_{n,m}               : output
    for each processor n, in parallel (n = 2^{m-1} + 1 to N)
    begin
        if (f_{n-2^{m-1},m-1} = 0) t_{n,m} = t_{n,m-1};
        else t_{n,m} = t_{n-2^{m-1},m-1};
        if (f_{n,m-1} = 0) f_{n,m} = f_{n-2^{m-1},m-1};
        else begin
```

TABLE 5-continued $$\Delta_n = \left\lceil \frac{f_{n-2^{k-1},k-1} - t_{n,k-1}}{D} \right\rceil;$$

$$f_{n,k} = f_{n,k-1} + \Delta_n D;$$
```
    end ;
end
```

Table 5 above presents the buffering method of a device that, when an $(m-1)^{th}$ processor is defined, is provided with the $m^{th}$-stage $(n-\beta)^{th}$ processor that, for the integers n from $\beta+1$ to N where $\beta=2^{m-1}$, calculates the content of the $n^{th}$ register and the content of the $(n-\beta)^{th}$ register and gives the output of $(f_{n,m}, t_{n,m})$. Here, the following processing is performed. Assuming that $2 \leq m \leq \log_2 N$.

1) when $f_{n-\beta,m-1}=0$ is true, output $t_{n,m-1}$ as $t_{n,m}$, or
   when $f_{n-\beta,m-1}=0$ is not true, output $t_{n-\beta,m-1}$ as $t_{n,m}$, 2) in addition, when $f_{n,m-1}=0$ is true, output $f_{n-\beta,m-1}$ as $f_{n,m}$, or
   when $f_{n,m-1}=0$ is not true, 2-1) taking $\Delta_n$ to be the smallest integer no less than $(f_{n-\beta,m-1}-t_{n,m-1})/D$ set $(f_{n,m-1}+\Delta_n D)$ to the output $f_{n,m}$.

Figure 19:
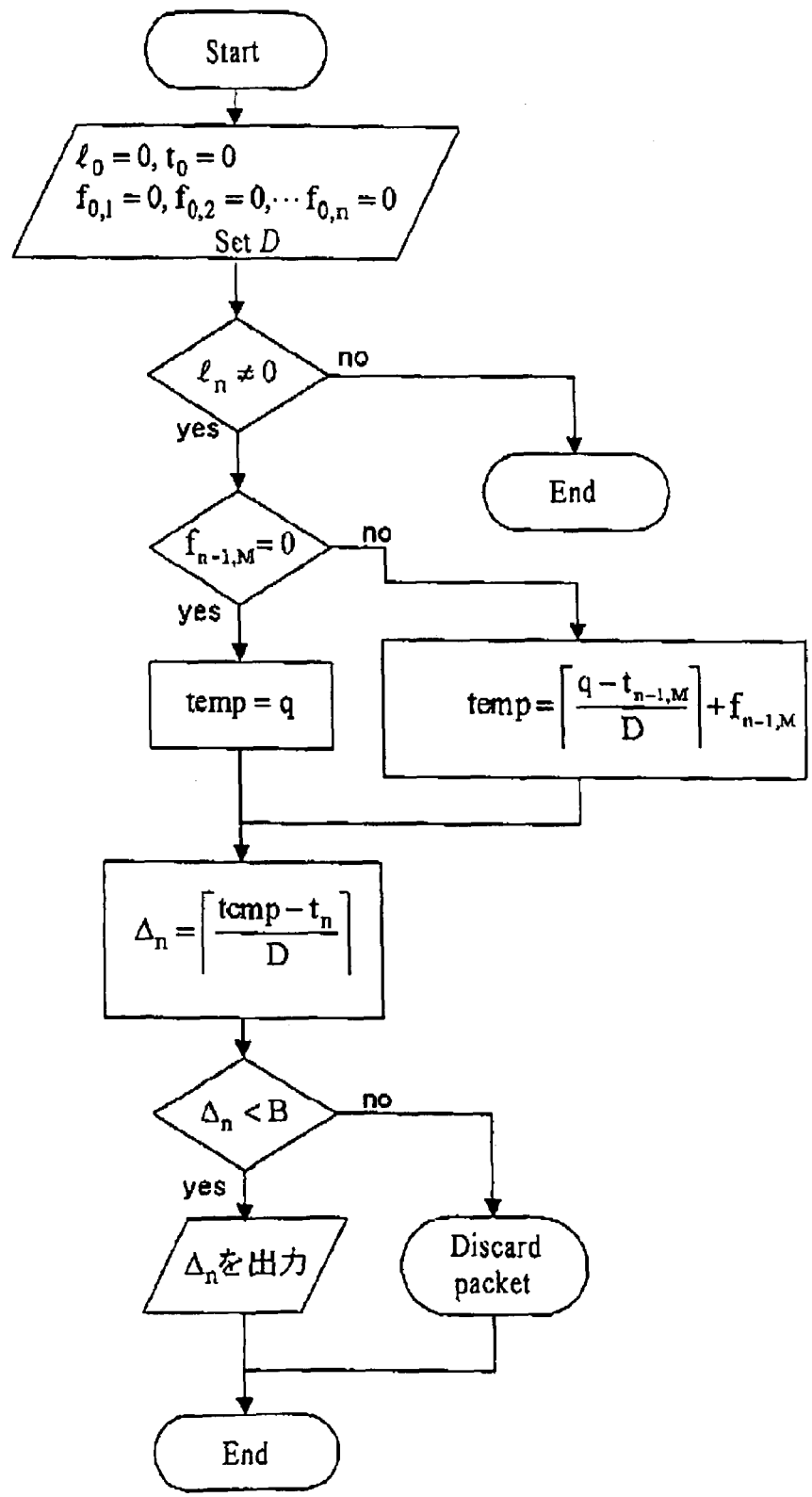
FIG. 19 is a flowchart of the processing of the parallel processor at the stage of output of the delay time.

As data for % electing delay elements that are arranged with equal differences between their delay times of 0, D, 2D, ..., (B-1)D, when the delay time of the $n^{th}$ lightpath is given as $\Delta_n D$, output this $\Delta_n$. To this end, the processing according to the flowchart shown in FIG. 19 is performed. If this processing were written in the form of a program, it would be as shown in Table 6. However, this is used in a device wherein each of the first-stage processors P(1,n) is provided with a register R(1,n) that temporarily stores its respective output $(f_{n,1}, t_{n,1})$, and that when an $(m-1)^{th}$ processor is defined for the integers m from 2 to $\log_2 N$, is provided with the $m^{th}$-stage $(n-\beta)^{th}$ processor P(m,n) that, for the integers n from $\beta+1$ to N where $\beta=2^{m-1}$ for the $m^{th}$ processor, calculates the content of the $n^{th}$ register R(m-1,n) and the content of the $(n-\beta)^{th}$ register R(m-1,n-$\beta$) and gives the output of $(f_{n,m}, t_{n,m})$.

[Table 6]

TABLE 6

```
(m+1)_{m-1}-th Stage ,Delay time, (P_{M+1,n} : 1≦n≦N) : M=log_2 N
f_{n-1,M_{m-1}}      : last position of the combined packet
l_n                  : packet length arrived M periods before
t_n                  : arrival gap time M periods before
t_{n-1,M}            : arrival gap time
q                    : queue length
Δ_n                  : delay
    for each processor n, in parallel (n = 1 to N)
    begin
        if (l_n = 0) exit;
        if (f_{n-1,M} = 0) temp = q;
```
$$\text{else temp} = \left\lceil \frac{q - t_{n-1,M}}{D} \right\rceil + f_{n-1,M};$$

$$\Delta_n = \left\lceil \frac{\text{temp} - t_n}{D} \right\rceil;$$
```
        If (Δ_n < B) Packet n is given delay Δ_n;
        else Packet n is discarded;
    end
```

Table 6 above presents the method of finding $\Delta_n$ for the integers n from 1 to N when the length of the queue is q, by performing the following processing. However, in the following, $M = \log_2 N$.

1) When $l_n \neq 0$ is not true, end processing, and
   when $l_n \neq 0$ is true, for $f_{n-1,M}$ in the register R(M,n-1), 2) when $f_{n-1,M}=0$ is true, provide a temporary value (temp), and set (temp)=q, when $f_{n-1,M}=0$ is not true, set the sum of $f_{n-1,M}$ and the smallest integer no less than $(q-t_{n,-1,M})/D$ to (temp), 3) taking $\Delta_n$ to be the smallest integer no less than $((temp)-t_n)/D$, output $\Delta_n$ when $\Delta_n$ is less than B, but if not less, discard the corresponding optical packet.

Figure 20:
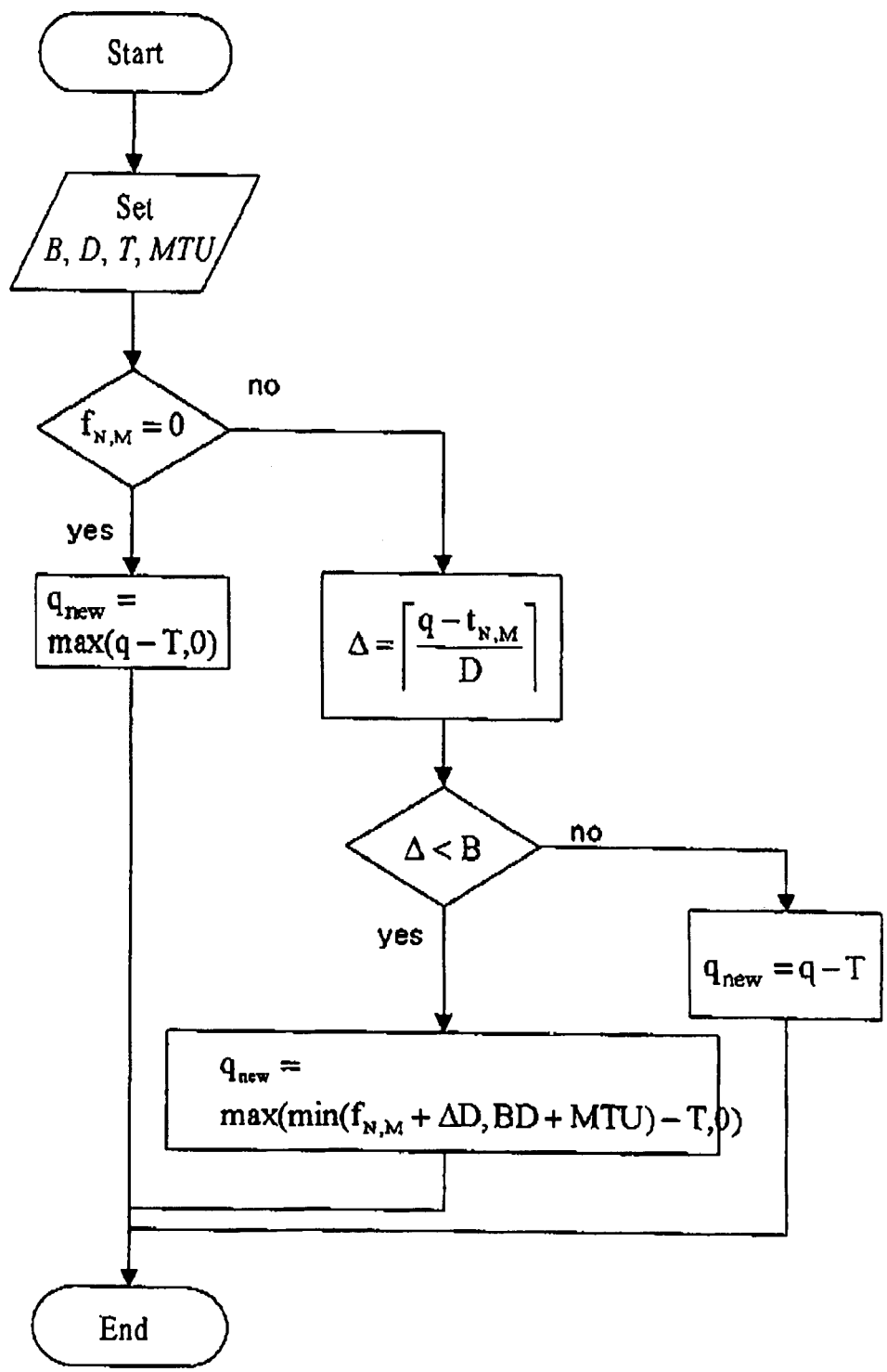
FIG. 20 is a flowchart of the processing of the parallel processor performing an update of the queue length.

In this manner, taking $M=\log_2 N$, at the same time that the $M^{th}$-stage processing results are obtained, the queue length (q) is updated by a separate processor. This processing is performed according to the flowchart shown in FIG. 20. If this processing were written in the form of a program, it would be as follows.

[Table 7]

TABLE 7

$(m+1)_{m-1}$-th Stage, Queue length, : $M=\log 2_N$
$f_{N,M}$ : last position of the combined packet
$t_{N,M_{m-1}}$ : arrival gap time
q : queue length
Δ : temporary variable
$q_{new}$ : output queue length
  if $(f_{N,M} = 0)$ $q_{new} = \max(q - T, 0)$;
  else begin
    $\Delta = \left\lceil \dfrac{q - t_{N,M}}{D} \right\rceil$;
    if $(\Delta < B)$
      $q_{new} = \max (\min(f_{N,M} + \Delta D, BD + MTU) - T, 0)$;
    else $q_{new} = q - T$;
  end Generally, in packet communications, the MTU (maximum transfer unit) is set. Table 7 above presents the procedure in the case that the MTU is set.

1) When $f_{N,M}=0$ is true for the $f_{N,M}$ stored in register R(M,N), the larger of (q−T) or 0 is stored as the new queue length ($q_{now}$) in the register Q, when $f_{N,M}=0$ is not true, Δ is set as the smallest integer no less than $(q-t_{N,M})/D$ and at this time, 2) when this Δ is smaller than B, store the value of the larger of 0 and the value found by subtracting T from the lesser of $(f_{N,M}+\Delta D)$ and (BD+MTU) in the register Q, when this Δ is not smaller than B, take (q−T) as the new queue length and store it in the register Q.

If the MTU (maximum transfer unit) is not set, or if the speed of processing is to be increased even if the MTU is present, the queue length can be set by the following method.

1) When $f_{N,M}=0$ is true for the $f_{N,M}$ stored in register R(M,N), the larger of (q−T) or 0 is stored as the new queue length ($q_{now}$) in the register Q, when $f_{N,M}=0$ is not true, Δ is set as the smallest integer no less than $(q-t_{N,M})/D$ and at this time, 2) when this Δ is smaller than B, store the value of the larger of $(f_{N,M}+\Delta D-T)$ and 0 and (BD+MTU) in the register Q as the new queue length, when this Δ is not smaller than B, take (q−T) as the new queue length and store it in the register Q.

Example 2

In order to perform the processing of the flowcharts above at high speed, it is preferably implemented in semiconductor circuits (hardware). However, in order to implement it in hardware, the processing procedure must be described in hardware description language (HDL) and converted to circuitry, but the function (max) that finds the maximum value is used in Table 6 above, yet this operate cannot be used in the current state. In addition, division is used in the above processing procedure and this may complicate the circuitry, or cause the processing to slow down, among other problems. These problems are solved by setting $T=2^pD$ (where p is an integer).

Figure 21:
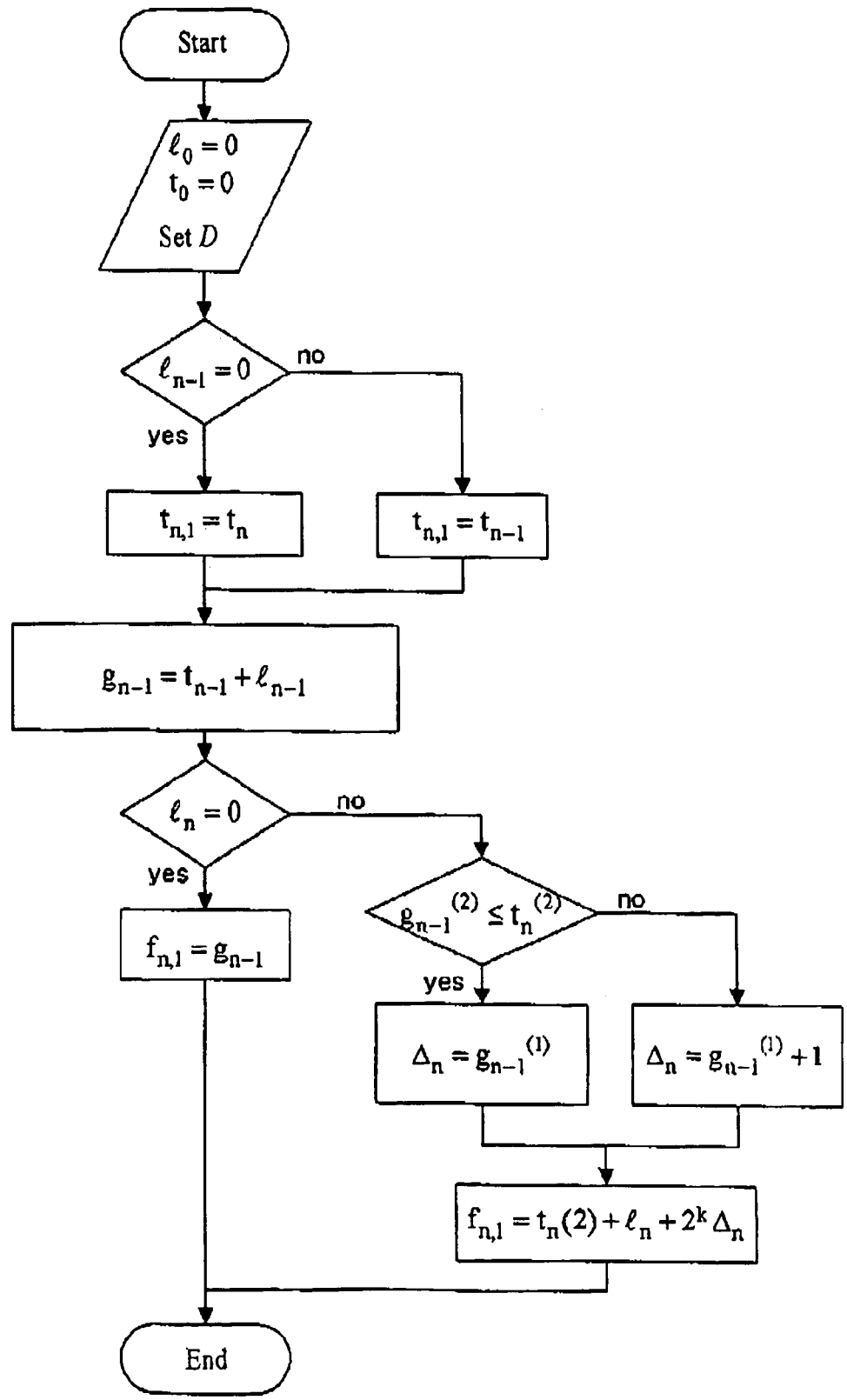
FIG. 21 is a flowchart of the processing of the first parallel processor.

In this case, the first-stage processors $P_{1n}$ perform processing according to the flowchart shown in FIG. 21. If this processing were written in the form of a program, it would be as follows.

TABLE 8

First Stage ($P_{1n}$: $1 \leq n \leq 8$)
$l_n, l_{n-1}$ : packet length
$t_n, t_{n-1}$ : arrival gap time
$g_{n-1}$ : temporary variable for queue length
$f_{n,1}, t_{n,1}$ : output
T : period
$D=2^k$ : unit length of the delay element
B : number of the delay elements
  for each processor n, in parallel (n = 1 to N)
  begin
    if $(l_{n-1} = 0)$ $t_{n,1} = t_n$;
    else $t_{n,1} = t_{n-1}$;
    $g_{n-1} = t_{n-1}^{(2)} + l_{n-1}$; 直前のパケットの最後位置トの最後位置
    if $(l_n = 0)$ $f_{n,1} = g_{n-1}$;
    else begin
      if $(g_{n-1}^{(2)} \leq t_n^{(2)})$ $\Delta_n = g_{n-1}^{(1)}$;
      else $\Delta_n = g_{n-1}^{(1)} + 1$;
      $f_{n,1} = t_n^{(2)} + l_n + 2^k\Delta_n$;
    end;
  end In Table 8 above, taking N to be the number of lightpaths, n to be the lightpath number, and the period T to be set as a power of 2 times an appropriately set time unit (τ), or namely $T=2^a\tau$ (where a is a nonnegative integer), while T is to be no greater than the minimum packet length represented as the length of an integral multiple of the time unit (τ), the above reading means performs reading at each period T, and for the optical packets of the $n^{th}$ lightpath that pass through this reading means at a specified time, the length of the optical packet is $l_n$ represented as a length which is an integral multiple of the time unit, the pre-period is expressed as an integral multiple of the time unit that is no greater than the pre-period, and for n=0, $l_n=t_n=0$, and the delay of the plurality of delay elements, in a constitution where the delays can be arranged such that they increase by the delay time D, D is given as $2^k$ (where k is a nonnegative integer), and, as the method of representation, the integer corresponding to the least significant bit k of the binary representation of the integer x is given as $x^{(2)}$, and the binary number consisting of the remaining most significant bits after removing the aforementioned least significant bit k is given as $x^{(1)}$, this processor is provided with N lightpaths on the input side, and performs the following processing on the integers n from 1 to N 1) When $l_{n-1}=0$ is true, output $t_n$, as $t_{n,1}$, or when $l_{n-1}=0$ is not true, output $t_{n-1}$ as $t_{n,1}$, 2) in addition, taking $g_{n,1}=l_{n-1}+t_{n-1}$, 3) when $l_n=0$ is true, output $g_{n-1}$ as $f_{n,1}$, or when $l_n=0$ is not true, when $g_{n-1}$ is less than $t_n$, set $g_{n-1}^{(1)}$ to $\Delta_n$, and when $g_{n-1}$ is not less than $t_n$, set $(g_{n-1}^{(1)}+1)$ to $\Delta_n$, and 4) set $(t_n^{(2)}+l_n+\Delta_n D)$ to the output $f_{n,1}$.

Figure 22:
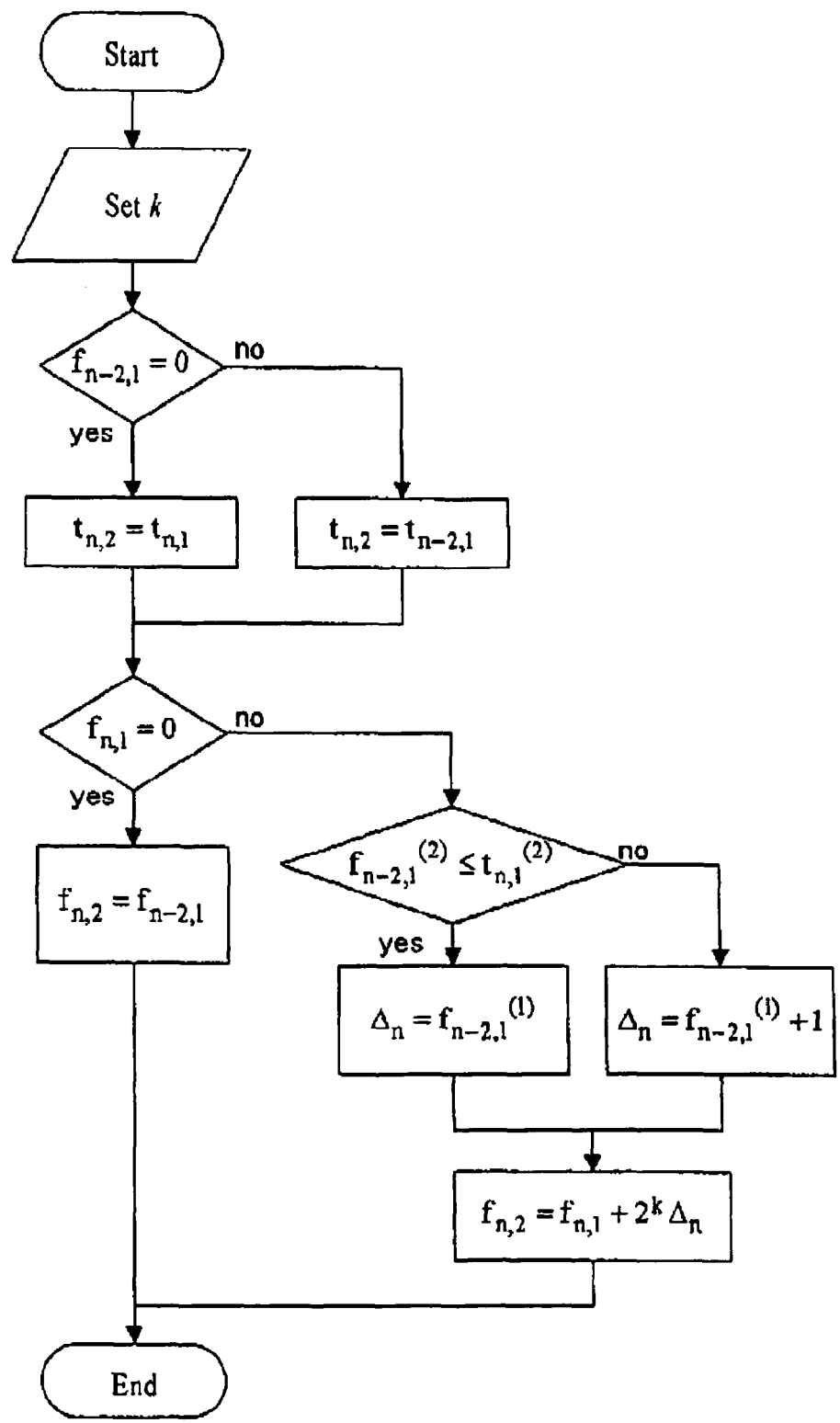
FIG. 22 is a flowchart of the processing of the second parallel processor.
Figure 23:
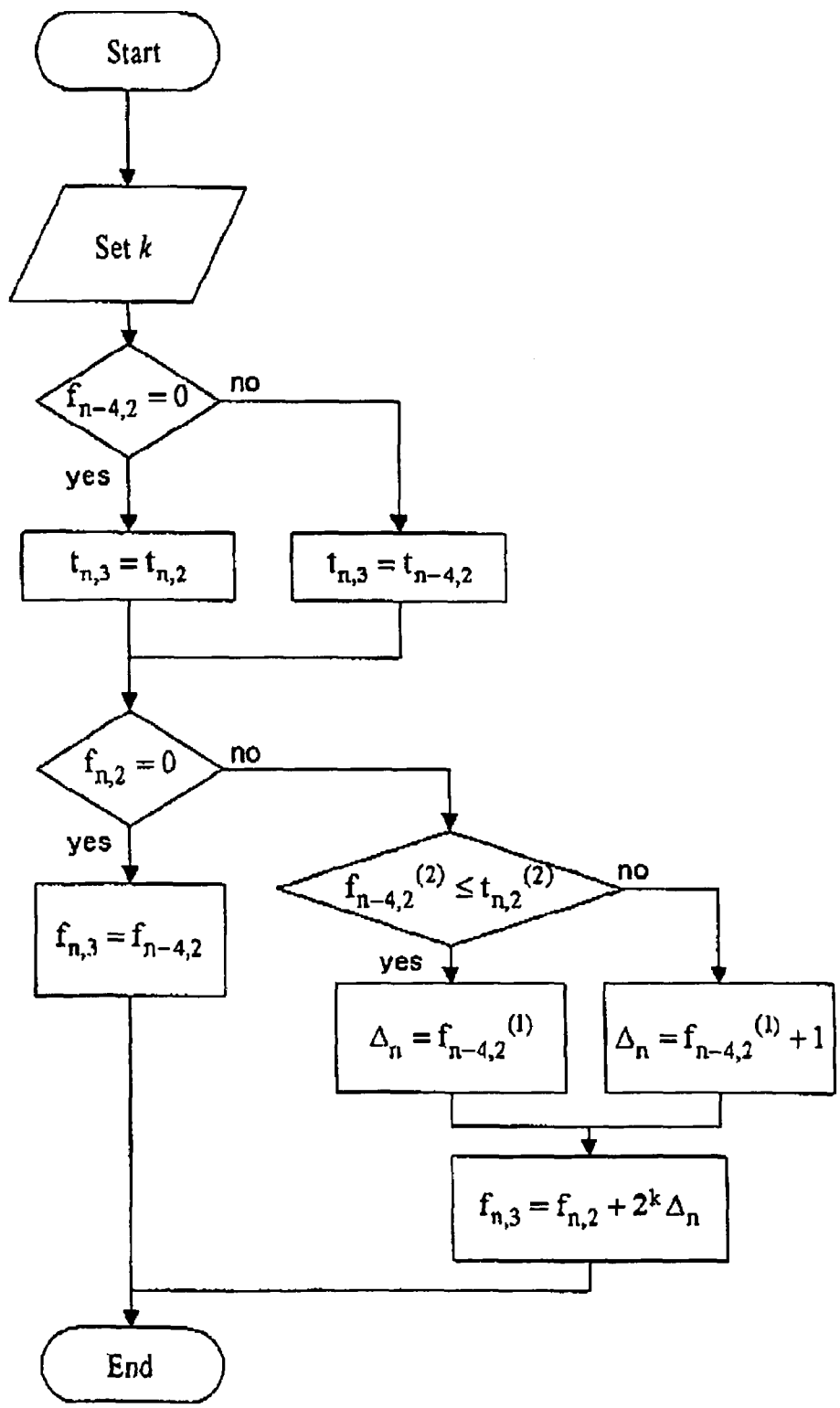
FIG. 23 is a flowchart of the processing of the third parallel processor.

The processing procedures for the second stage and third stage are shown in FIGS. 22 and 23, respectively. If this processing were written in the form of a program, it would be as shown in Tables 8 and 9, respectively.

TABLE 9

Second Stage ($P_{2n}$ : $3 \leq n \leq 8$)
$f_{n,1}$, $f_{n-2,1}$ : last position of the combined packet
$t_{n,1}$, $t_{n-2,1}$ : arrival gap time
$\Delta_n$ : temporary variable
$f_{n,2}$, $t_{n,2}$ : output
  for each processor n, in parallel (n = 3 to N)
  begin
    if ($f_{n-2,1} = 0$) $t_{n,2} = t_{n,1}$;
    else $t_{n,2} = t_{n-2,1}$;
    if $f_{n,1} = 0$ $f_{n,2} = f_{n-2,1}$;
    else begin
      if ($f_{n-2,1}^{(2)} \leq t_{n,1}^{(2)}$) $\Delta_n = f_{n-2,1}^{(1)}$;
      else $\Delta_n = f_{n-2,1}^{(1)} + 1$;
      $f_{n,2} = f^{n,1} + 2^k \Delta_n$;
    end;
  end

TABLE 10

Third Stage ($P_{3n}$ : $5 \leq n \leq 8$)
$f_{n,2}$, $f_{n-4,2}$ : last position of the combined packet
$t_{n,2}$, $t_{n-4,2}$ : arrival gap time
$\Delta_n$ : temporary variable
$f_{n,3}$, $t_{n,3}$ : output
  for each processor n, in parallel (n = 5 to N)
  begin
    if ($f_{n-4,2} = 0$) $t_{n,3} = t_{n,2}$;
    else $t_{n,3} = t_{n-4,2}$;
    if $f_{n,2} = 0$ $f_{n,3} = f_{n-4,2}$;
    else begin
      if ($f_{n-4,2}^{(2)} \leq t_{n,2}^{(2)}$) $\Delta_n = f_{n-4,2}^{(1)}$;
      else $\Delta_n = f_{n-4,2}^{(1)} + 1$;
      $f_{n,3} = f^{n,2} + 2^k \Delta_n$;
    end;
  end These procedures are generally performed as follows. Generally, in the buffering method of a device that is provided with the $m^{th}$-stage $(n-\beta)^{th}$ processor P(m,n) that, for the integers n from $\beta+1$ to N where $\beta=2^{m-1}$, calculates the content of the $n^{th}$ register R(m-1,n) connected to the previous-stage processors P(m-1,n) and the content of the $(n-\beta)^{th}$ register R(m-1,n-$\beta$) and gives the output of ($f_{n,m}$, $t_{n,m}$).

1) When $f_{n-\beta,m-1}=0$ is true, output $t_{n,m-1}$ as $t_{n,m}$, or
   when $f_{n-\beta,m-1}=0$ is not true, output $t_{n-\beta, m-1}$ as $t_{n,m}$,
2) in addition, when $f_{n,m-1}=0$ is true, output $f_{n-\beta,m-1}$ as $f_{n,m}$, or
   when $f_{n,m-1}=0$ is not true,
2-1) when $f_{n-\beta,m-1}^{(2)}$ is less than or equal to $t_{n,m-1}^{(2)}$, set $f_{n-\beta,m-1}^{(1)}$ to $\Delta_n$,
2-2) when $f_{n-\beta,m-1}^{(2)}$ is not less than or equal to $t_{n,m-1}^{(2)}$, set $(f_{n-\beta,m-1}^{(1)}+1)$ to $\Delta_n$,
3) set $(f_{n,m-1}+2^k\Delta_n)$ to the output $f_{n,m}$.

Figure 24:
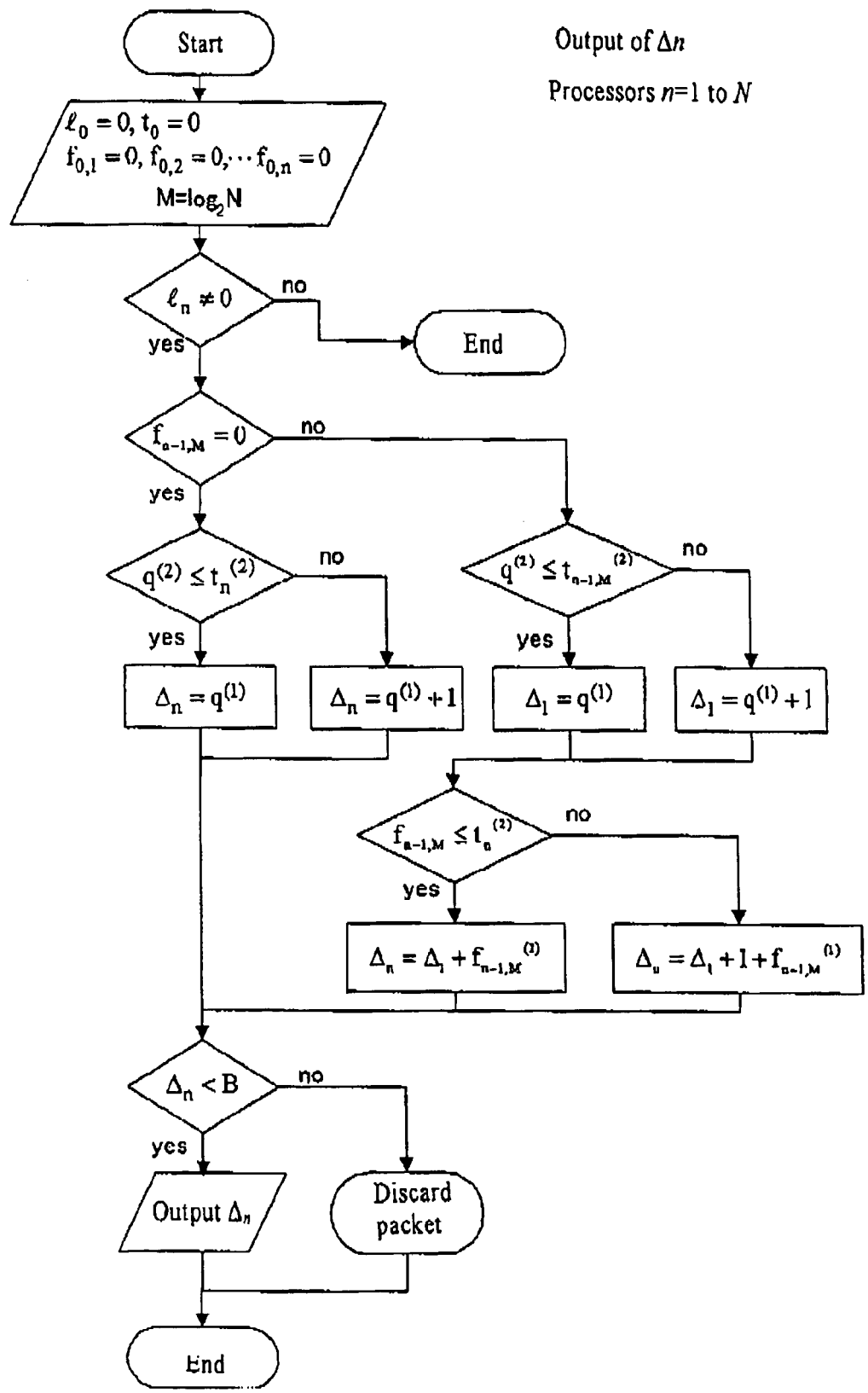
FIG. 24 is a flowchart of the processing of the parallel processor at the stage of output of the delay time.

At the stage of providing output of $\Delta_n$, the processing according to the flowchart shown in FIG. 24 is performed. If this were written in the form of a program, it would be as follows.

TABLE 11

$(m+1)_{m-1}$-th Stage, Delay time, $(P_{M+1,n} : 1 \leq n \leq N)$ : M=log2 N
$f_{n-1,M_{m-1}}$ : last position of the combined packet
$l_n$ : packet length arrived M periods before
$t_n$ : arrival gap time M periods before
$t_{n-1,M}$ : arrival gap time
$q$ : queue length
$\Delta_n$ : delay
  for each processor n, in parallel (n = 1 to N)
  begin
    if ($l_n = 0$) exit;
    if ($f_{n-1,M} = 0$)

TABLE 11-continued begin
      if ($q^{(2)} \leq t_n^{(2)}$) $\Delta_n = q^{(1)}$;
      else $\Delta_n = q^{(1)} + 1$;
    end
    else begin
      if ($q^{(2)} \leq t_{n-1,M}^{(2)}$) $\Delta_1 = q^{(1)}$;
      else $\Delta_1 = q^{(1)} + 1$;
      if ($f_{n-1,M}^{(2)} \leq t_n^{(2)}$) $\Delta_n = \Delta_1 + f_{n-1,M}^{(1)}$;
      else $\Delta_n = \Delta_1 + 1 + f_{n-1,M}^{(1)}$;
    end ;
    if ($\Delta_n < B$) Packet n is given delay $\Delta_n$;
    else Packet n is discarded;
  end Table 11 presents the following processing for the integers n from 1 to N when the length of the queue is q.

Assuming that $M=\log_2 N$, 1) when $l_n \neq 0$ is not true, end processing, 2) when $l_n \neq 0$ is true, 2-1) when $f_{n-1,M}=0$ is true and,
   when $q^{(2)}$ is less than or equal to $t_n^{(2)}$, set $q^{(1)}$ to $\Delta_n$,
   when $q^{(2)}$ is not less than or equal to $t_n^{(2)}$, set $(q^{(1)}+1)$ to $\Delta_n$, 2-2) when $f_{n-1,M}=0$ is not true and,
   when $q^{(2)}$ is less than or equal to $t_{n-1,M}^{(2)}$, set $q^{(1)}$ to $\Delta_1$,
   when $q^{(2)}$ is not less than or equal to $t_{n-1,m}^{(2)}$, set $(q^{(1)}+1)$ to $\Delta_1$, and moreover, 2-3-1) when $f_{n-1,M}$ is less than or equal to $t_n^{(2)}$, set $(\Delta_1+f_{n-1,M}^{(1)})$ to $\Delta_n$, 2-3-2) when $f_{n-1,M}$ is not less than or equal to $t_n^{(2)}$, set $(\Delta_1+1+f_{n-1,M}^{(1)})$ to $\Delta_n$, 3) output $\Delta_n$ when $\Delta_n$ is less than B,
   but if not less, discard the corresponding optical packet.

Figure 25:
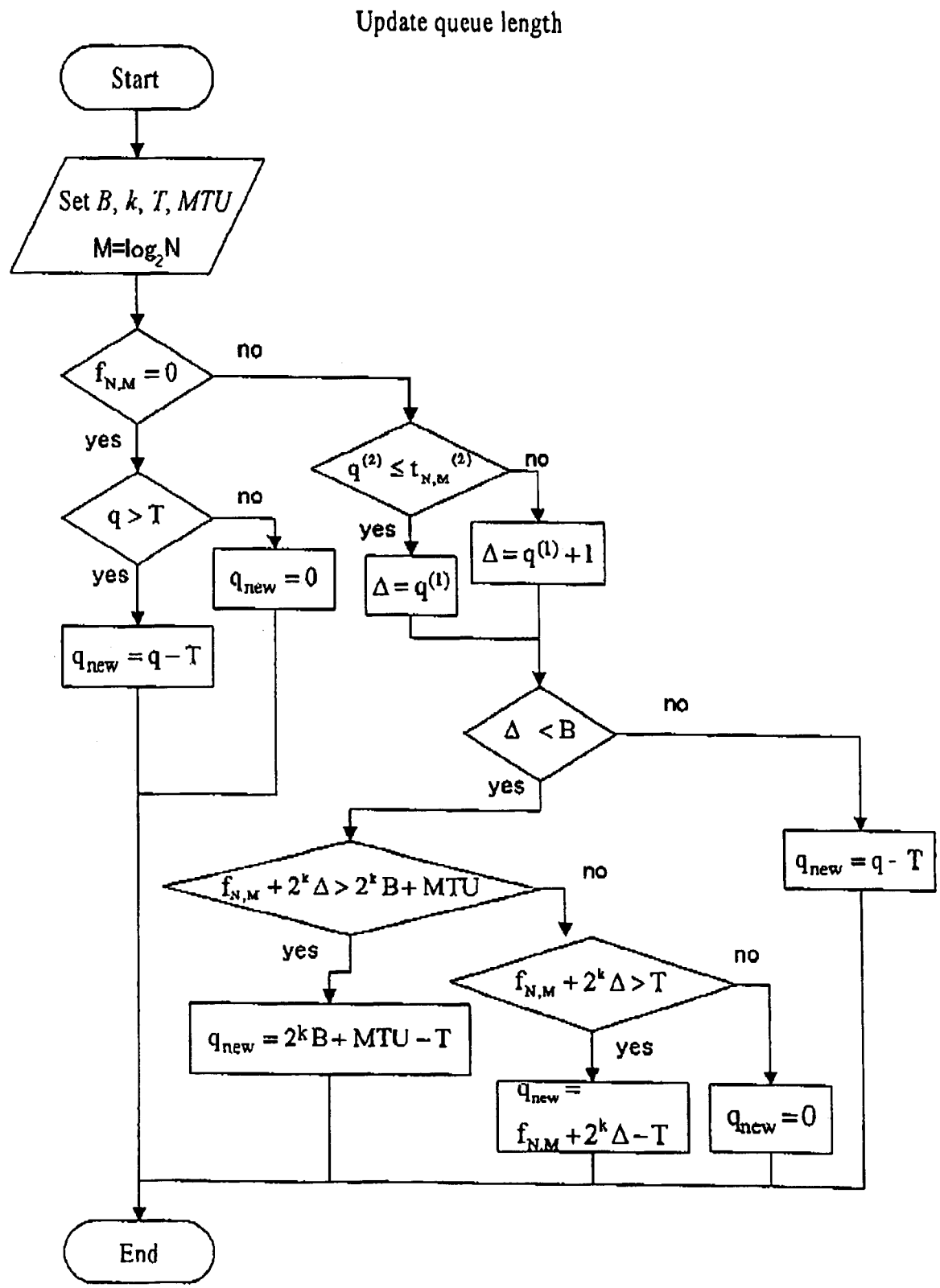
FIG. 25 is a flowchart of the processing of the parallel processor performing an update of the queue length.

In addition, at the stage of updating the queue length, processing is performed according to the flowchart shown in FIG. 25. If this were written in the form of a program, it would be as follows.

TABLE 12

(m+1)-th Stage, Queue length, : M=log2 $_N$
$f_{N,M}$ : last position of the combined packet
$t_{N,M}$ : arrival gap time
$q$ : queue length
$\Delta$ : temporary variable
$q_{new}$ : output queue length
  if ($f_{N,3} = 0$)
  begin
    if ($q > T$) $q_{new} = q - T$;
    else $q_{new} = 0$;
  end
  else begin
    if ($q^{(2)} \leq t_{N,M}^{(2)}$) $\Delta = q^{(1)}$;
    else $\Delta = q^{(1)} + 1$;
    if ($\Delta < B$)
    begin
      if ($f_{N,M} + 2^k\Delta > 2^kB + MTU$)
          $q_{new} = 2^kB + MTU - T$; (*)
      elsif ($f_{N,M} + 2^k\Delta > T$) $q_{new} = f_{N,M} + 2^k\Delta - T$;
      else $q_{new} = 0$;
    end
    else $q_{new} = q - T$;
  end In Table 12 above, the processing is performed by the following procedure. As described above, the MTU (maximum transfer unit) is generally set.

When M=log$_2$ N, 1) when f$_{N,M}$=0 is true, 1-1) when q is greater than T, (q−T) is set as the new queue length (q$_{now}$), 1-2) when q is not greater than T, q$_{new}$=0 is set, 2) when f$_{N,M}$=0 is not true, 2-1) when q$^{(2)}$ is less than or equal to t$_{N,M}^{(2)l,\ q^{(1)}}$ is set as Δ, when q$^{(2)}$ is not less than or equal to t$_{N,M}^{(2)}$, (q$^{(1)}$+1) is set as Δ, 3-1) when this Δ is smaller than B and, 3-1-1) when (f$_{N,M}$+2$^k$Δ) is greater than (2$^k$B+MTU), (2$^k$B+MTU−T) is set as q$_{new}$, 3-1-2) when (f$_{N,M}$+2$^k$Δ) is not greater than (2$^k$B+MTU) and, 3-1-2-1) when f$_{N,M}$+2$^k$Δ is greater than T, (f$_{N,M}$+2$^k$Δ−T) is set as q$_{new}$, 3-1-2-2) when f$_{N,M}$+2$^k$Δ is not greater than T, q$_{now}$=0 is set, 3-2) when this Δ is not smaller than B, (q−T) is set as q$_{new}$.

In each period, if the buffer is already overflowing with optical packets at the time that the queue length is updated, perform the process of discarding newly arriving packets in the same manner as in the conventional round-robin scheme. If not, perform the queue length update assuming that all arriving optical packets can be added to the queue. The computations for appropriately storing all arriving optical packets are to be performed with a plurality of processors.

Example 3

Figure 26:
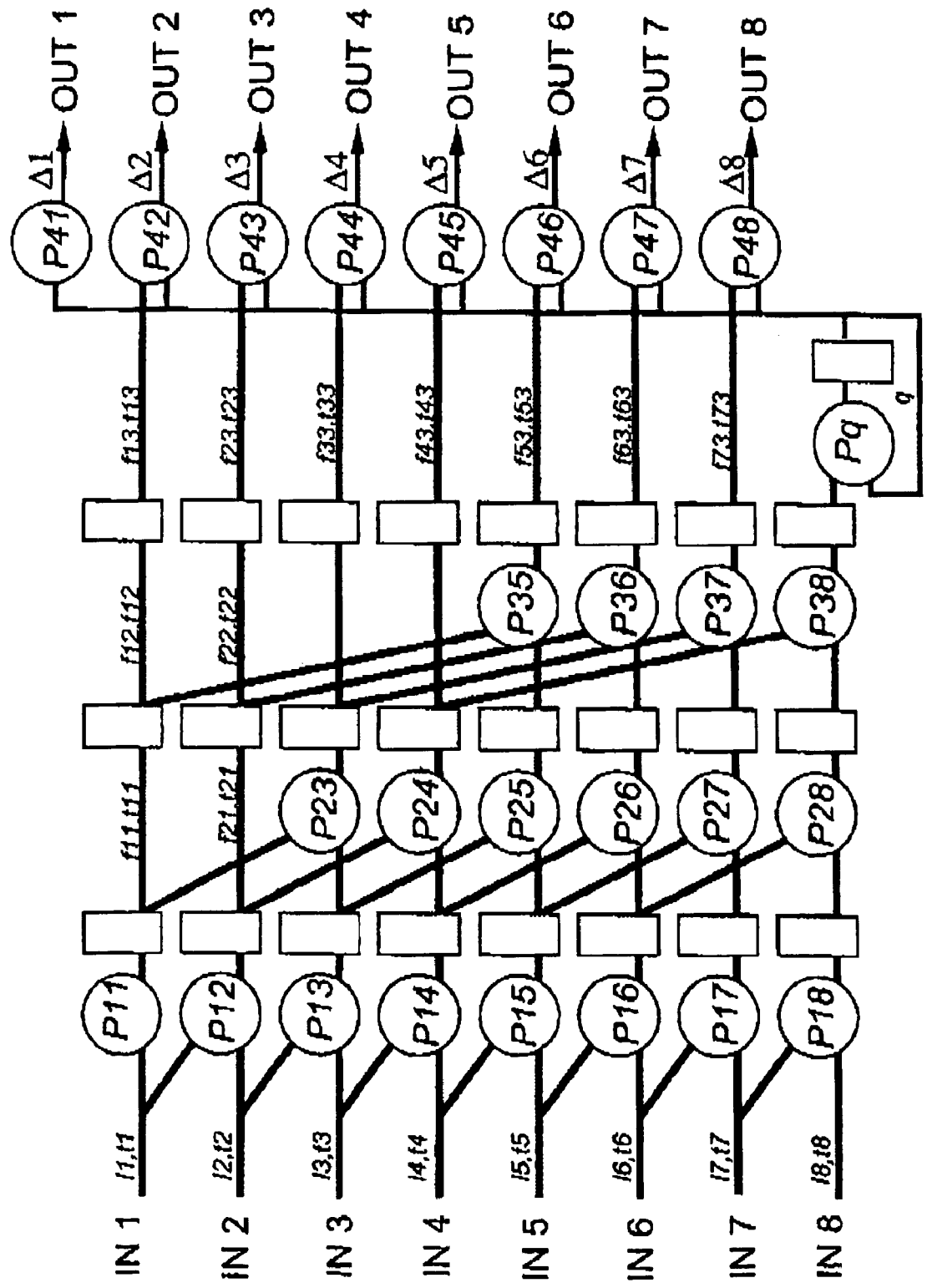
FIG. 26 is a block diagram of another parallel processing circuit used for asynchronous variable-length optical packets.
Figure 27:
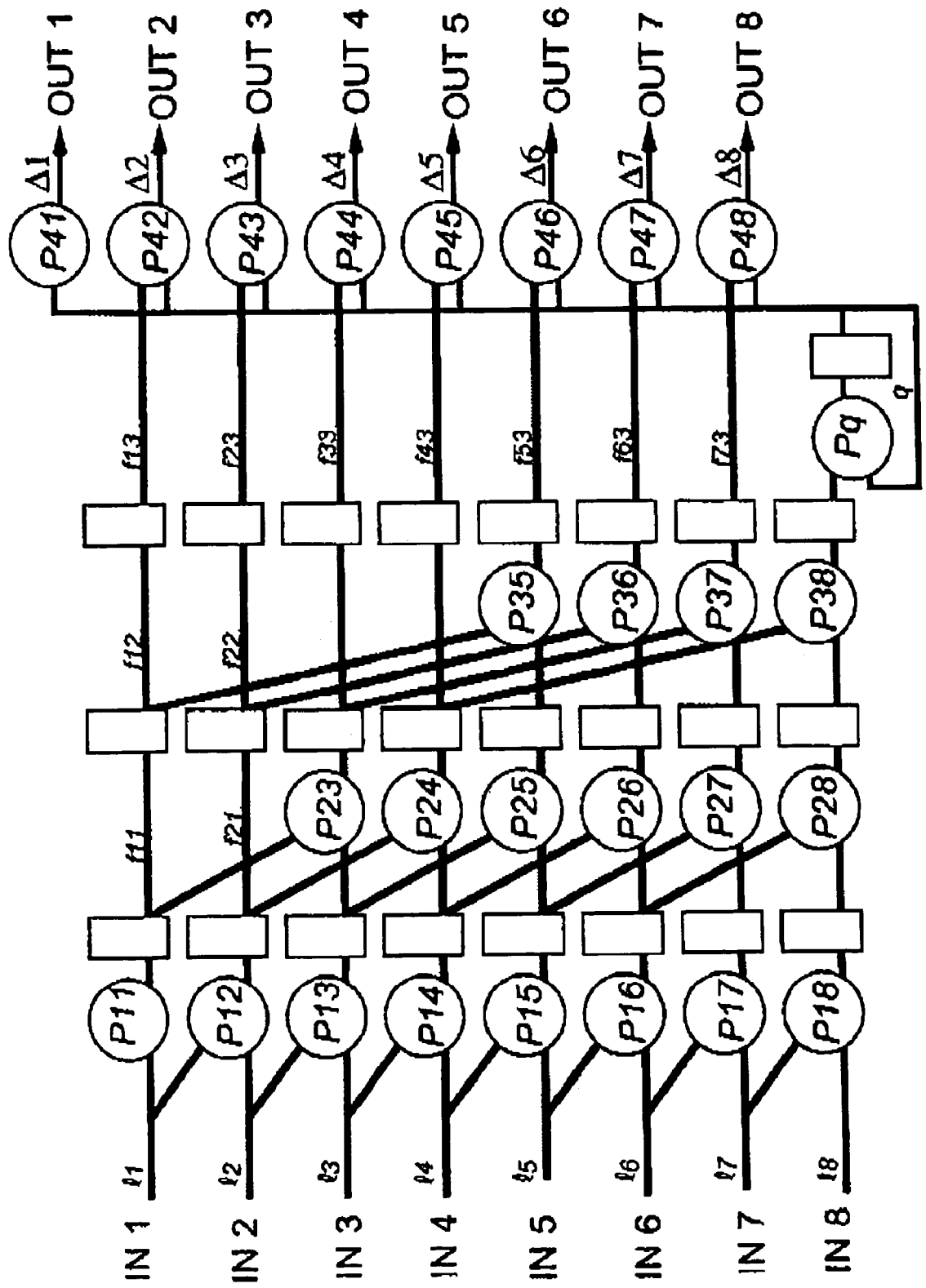
FIG. 27 is a block diagram of a parallel processing circuit used for synchronous fixed-length optical packets.
Figure 28:
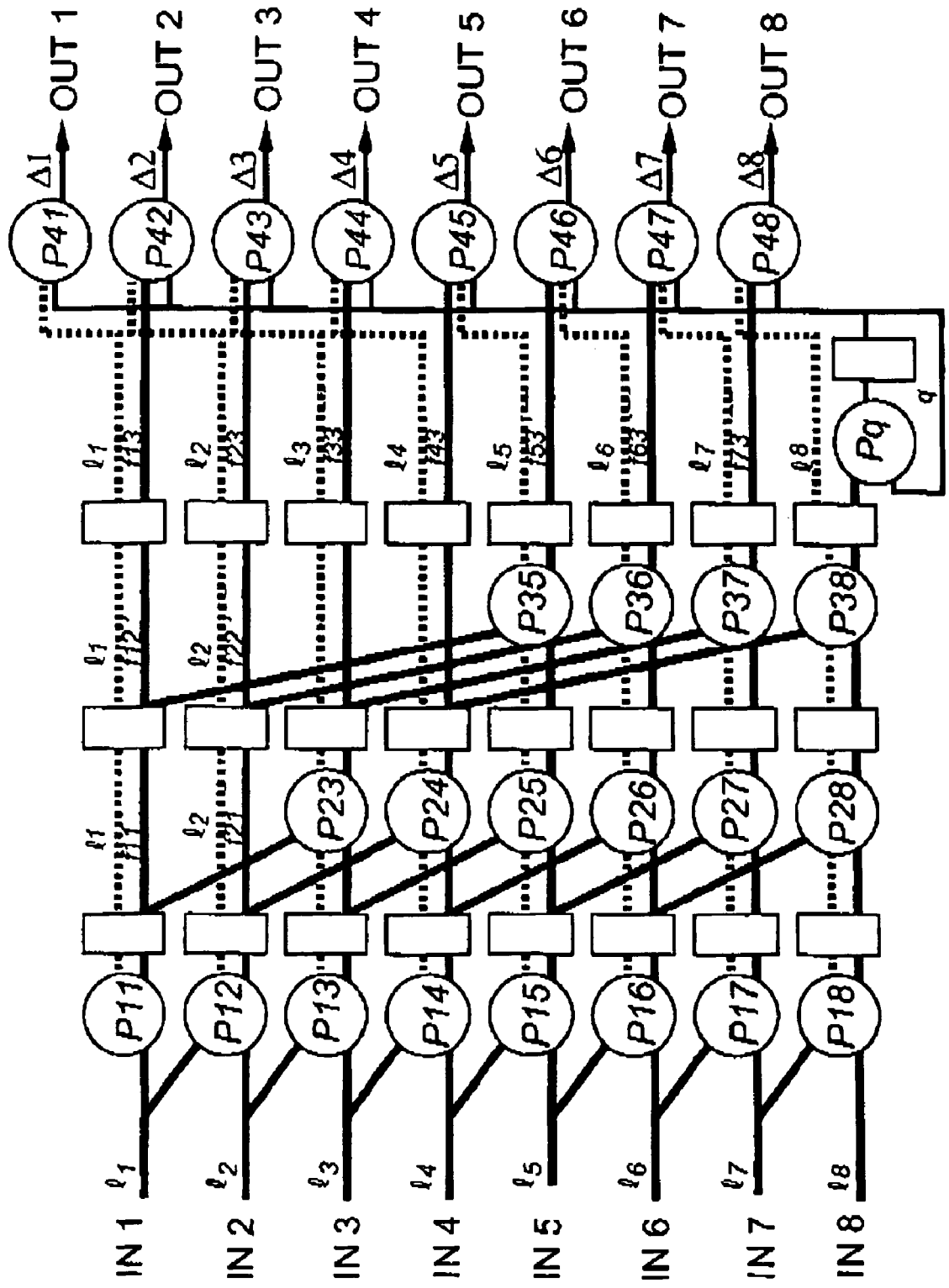
FIG. 28 is a block diagram of another parallel processing circuit used for synchronous fixed-length optical packets.

When the above buffering device in the optical packet switch for asynchronous variable-length optical packets is used for buffering in an optical packet switch for synchronous fixed-length optical packets, the parallel processing of FIG. 26 can be simplified to give the constitution of FIG. 27. Similarly, in the same manner as the constitution illustrated in FIG. 13, with the constitution using the dotted-line portion that sequentially sends data forward, the variables can be set to those of synchronous fixed-length to give the constitution of FIG. 28. In FIGS. 27 and 28, the number of variables used in processing is reduced. The number of variables can be reduced because all of the optical packet lengths become identical, so it is possible to use the number of optical packets instead of the optical packet length in the above process. In addition, the respective optical packets are synchronized, so the processing of the pre-period of optical packets can be omitted. The processing to this end is performed as follows.

A device that accepts input of synchronous fixed-length optical packets from a plurality of lightpaths, gives each of the optical packets one of B different delay times and outputs same to a single optical path, comprising:

reading means that reads the presence of optical packets on the respective lightpaths, a queue consisting of a plurality of delay elements that temporarily store the plurality of optical packets and give each optical packet one of B different delay times, an optical switch that directs the optical packet to one of the plurality of delay elements, an optical demultiplexer connected by lightpaths to the plurality of delay elements, and an output lightpath connected by a lightpath to the demultiplexer, and in order to prevent the optical packets from overlapping in the output lightpath, a controller that uses the delay times of the delay elements and the presence information for optical packets thus read to determine by computation the delay element used for temporary storage, and this controller is such that:

when the plurality of lightpaths are given sequential numbers n from 1 to N, and in the following, cases in which there is none corresponding to n can be neglected, for the number of optical packets in the respective lightpaths, as the arrangement of the first stage of processors and registers, processors P(1,n) that perform the calculation of the number of optical packets on the (n−1)$^{th}$ lightpath and the optical packet numbers of optical packets on the n$^{th}$ light path, and registers R(1,n) that store the results of calculation are disposed, as the arrangement of the m$^{th}$ (2≦m≦log$_2$A) stage, processors P(m,n) that perform the calculation of the registers R(m−1,n−2$^{m-1}$) or copies thereof and the registers R(m−1,n) or copies thereof, and registers R(1,n) that store the results of calculation are provided, for the integers M where 2$^M$=N, on the (M+1)$^{th}$ stage are provided a processor and a register Q that stores the information at the tail end of the queue length, moreover, the delay applied to the first synchronous fixed-length optical packet is determined from the optical packet presence information for the first lightpath or a copy thereof and the value of the register Q, and for values of n greater than 1, processors P(M+1,n) are used to determine the delay applied to the n$^{th}$ synchronous fixed-length optical n$^{th}$ packet, by calculation on the optical packet presence information for the nth lightpath or a copy thereof and the values of the register R(M,n−1) and the register Q, thereby coordinating the delay times given to the synchronous fixed-length optical packets of the respective lightpaths.

We shall first describe the first-stage processors P$_{1n}$ (P$_{1n}$: 2≦n≦N). Here, for the N processors P$_{1n}$ (where 2≦n≦N), the following processing is performed after the time of (log$_2$ N+1)T until after the time (log$_2$ N+2). Here, (log$_2$ N+1) is the number of steps in which the following process is performed as parallel processing and T is the time per 1 step. This process must not end before the optical packets reach the optical switch for directing them to the respective delay elements.

In the case of the first stage, the input to the variables l$_{n-1}$ and l$_n$ that indicate the presence of optical packets arriving at port (n−1) and port n is 1 when a packet has arrived and zero when no packet has arrived. The first-stage processors perform the following processing based on this information, and provides output of the presence information f$_n$ for optical packets arriving at the two ports.

Start l$_0$=0 for each processor n, in parallel (n:=1 to N)

f$_{n,1}$:=l$_{n-1}$+l$_n$;

End

In addition, the second stage (P$_{2n}$: 3≦n≦N) is processed as follows.

For the (N−2)$^{th}$ processor P$_{2a}$ (where 3≦n≦N), the optical packet presence information obtained from the first-stage processors is input as:

f$_{n,1}$ which represents the number of optical packets arriving at port (n−1) through port n, f$_{n-2,1}$ which represents the number of optical packets arriving at port max((n−3),1) through port (n−2).

In addition, the following process is used to output f$_{n,2}$, which is the number of optical packets arriving at port max (n−3,1) through port n.

Start for each processor n, in parallel (n:=3 to N)

$f_{n,2}:=f_{n-1}+f_{n-2,1}$;

End

In addition, the third stage ($P_n$: $5 \leq n \leq N$) is processed as follows.

For the $(N-4)^{th}$ processor $P_{0n}$ (where $5 \leq n \leq$), the optical packet presence information obtained from the second-stage processors is input as:

$f_{n,2}$ which represents the number of optical packets arriving at port (n−3) through port n, $f_{n-4,2}$ which represents the number of optical packets arriving at port max((n−7),1) through port (n−4).

In addition, the following process is used to find and output $f_{n,3}$, which is the number of optical packets arriving at port max(n−7,1) through port n.

Start for each processor n, in parallel (n:=5 to N)

$f_{n,3}:=f_{n-2}+f_{n-4,2}$;

End

In general, the $m^{th}$ stage ($P_{mn}$: $2^{m-1}+1 \leq n \leq N$) is processed as follows.

Taking $\beta=2^{m-1}$, for the $(N-2^{m-1})^{th}$ processor $P_{mn}$ (where $\beta+1 \leq n \leq N$), the optical packet presence information, obtained from the $(m-1)^{th}$-stage processors is input as:

$f_{n,m-1}$ which represents the number of optical packets arriving at port $(n-2^{m-1}+1)$ through port n, $f_{n-\beta,m-1}$ which represents the number of optical packets arriving at port max$((n-2^{m-1}+1),1)$ through port $(n-2^{m-1})$.

In addition, the following process is used to find and output $f_{n,m}$, which is the number of optical packets arriving at port max$((n-2^{m-1}+1),1)$ through port n.

Start for each processor n, in parallel (n:=$2^{m-1}+1$ to N)

$f_{n,m}:f_{n-m-1}+f_{n-\beta,m-1}$;

End

With the above processing, it is possible to use pipeline processing in a parallel configuration of m stages of processors to find the number of optical packets arriving at port 1 through port n, for n=1, 2, . . . , N.

Figure 29:
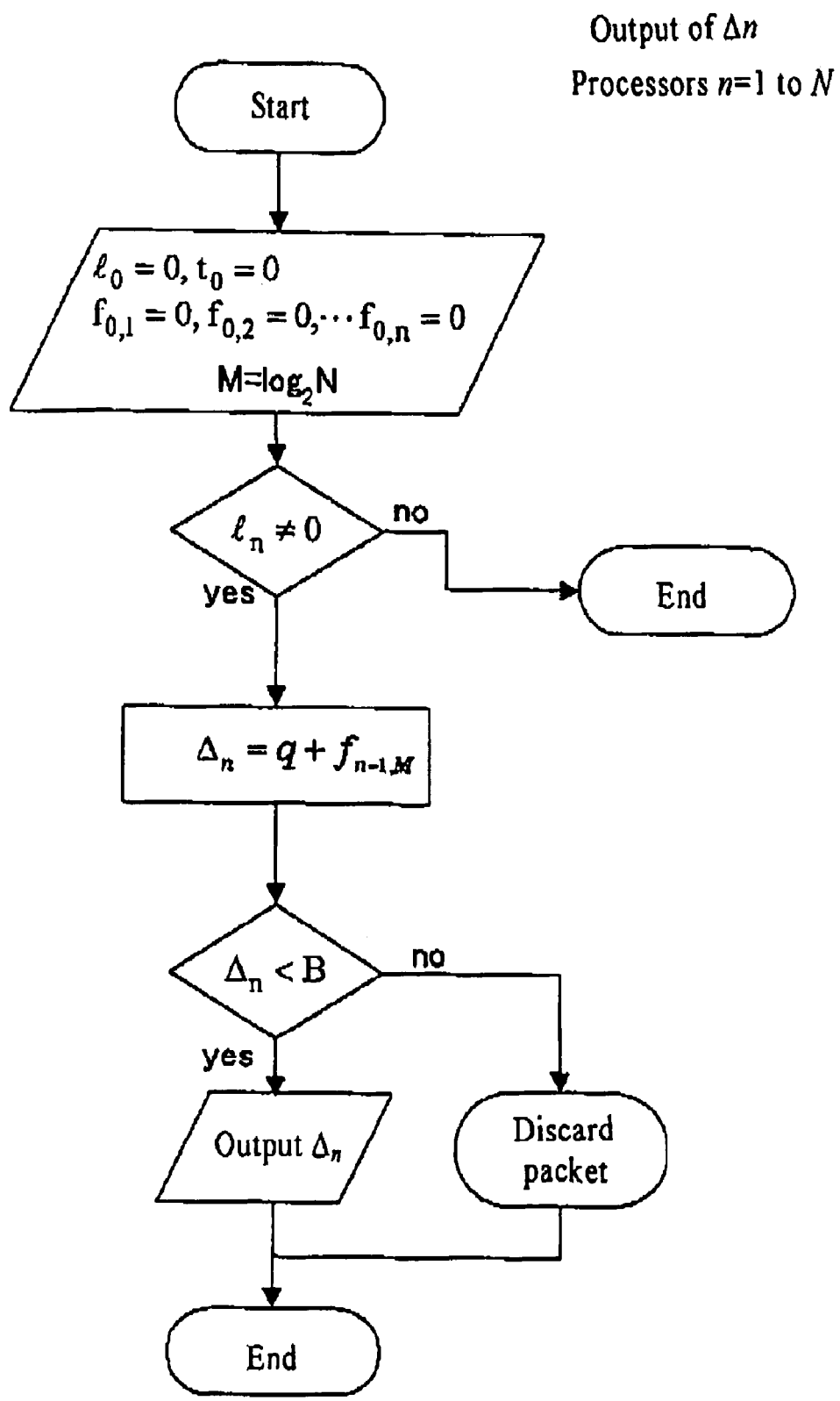
FIG. 29 is a flowchart for finding delay in the case of synchronous fixed-length optical packets.

In addition the delay is found for the $(M+1)^{th}$ stage. FIG. 29 presents a flowchart for this purpose. In addition, an example of a program corresponding to this flowchart is presented below.

For the processors $P_{M+1,n}$ (where $1 \leq n \leq N$), upon taking input of $f_{n-1,M}$ as the number of optical packets arriving from ports 1 to n−1, $l_n$ which indicates the presence of an optical packet arriving at port n, and the queue length q, the value of the delay $\Delta_n$ is output.

---

Start
for each processor n, in parallel (n:=1 to N)
begin
   if ($l_n$=0) exit;
   $\Delta_n:=q+f_{n-1,M}$;
   if ($\Delta_n$<B) Packet n is given delay $\Delta_n$;
   else Packet n is discarded;
end
End

---

At the same time as the derivation of the delay, separate processors $P_q$ perform an update of the stored buffer occupancy.

The input is $f_{N,M}$, the number of optical packets arriving at all ports.

The internal variables are $\Delta$ and the queue length q.

The output is the new queue length $q_{new}$.

$q_{new}:=\max((\min(f_{N,M}+q,\beta)-1,0)$;

When the above process is performed by the conventional round-robin type method, the following can be done.

---

Start
for n:=1 to N do
begin
   if ($l_n$=0)
   begin
     if f<B
     begin
       Packet n is given delay f× T,
       f:=f+ 1;
     end
     else Packet n is discarded;
   end
end
f:=max(f−1,0);
End

---

When round-robin type processing is performed in this manner by the conventional method, the loop must be traversed N times, so the processing time from start to end per processor becomes a much longer time than in the case of parallel processing according to the present invention as above. In other words, if the processing time of a processor according to the present invention is taken to be the time unit, the round-robin type processing requires N time units to process one packet per port.

The optical packets transmitted over various lightpaths are typically subject to shifting out of synchronization, but by using a previously reported optical synchronization device, it is possible to obtain synchronized optical packets. In addition, by setting the optical packet length of the largest transmitted optical packet to the respective optical packet length, they can be made fixed length. Thus, synchronized fixed-length optical packets can be used by this method.

In addition, the above method of preparing synchronized fixed-length optical packets can also be applied even to the case of asynchronous variable-length optical packets, so it is clear that after converting asynchronous variable-length optical packets to synchronous fixed-length packets, the buffering device can be applied to these synchronous fixed-length packets and thus the asynchronous variable-length optical packets can be buffered so that they do not overlap on output.

Table 13 presents the results of the method according to the present invention in comparison to the results when dendriform delay line buffer units are disposed and the method recited in Document 6 is used with a buffer managers placed in each, and the method recited in Document 5 for finding the delay by parallel processing, for each of the cases of N=8, 64, 256 and 1024.

TABLE 13

Number of processors, Np. processing delay, TD. and processing time, Tp. per processor when input N = 2k.

| | | conventional | | document 6 | | | document 5 | | | Present Invention | | |
|---|---|---|---|---|---|---|---|---|---|---|---|---|
| N | k | $N_P$ | $T_D$ | $N_P$ | $T_D$ | $T_P$ | $N_P$ | $T_D$ | $T_P$ | $N_P$ | $T_D$ | $T_P$ |
| | | 1 | O(N) | $O(N^{1/2})$ | $O(N^{1/2})$ | $O(N^{1/2})$ | O(N) | $O(\log_2 N)$ | | $O(N \log_2 N)$ | $O(\log_2 N)$ | O(1) |
| | | 1 | N | $N^{1/2}+1$ | $2N^{1/2}$ | $N^{1/2}$ | N | $\log_2 N + 1$ | $\log_2 N + 1$ | $N \log_2 N + 2$ | $\log_2 N + 1$ | 1 |
| 16 | 4 | 1 | 16 | 5 | 8 | 4 | 16 | 5 | 5 | 66 | 5 | 1 |
| 64 | 6 | 1 | 64 | 9 | 16 | 8 | 64 | 7 | 7 | 386 | 7 | 1 |
| 256 | 8 | 1 | 256 | 17 | 32 | 16 | 256 | 9 | 9 | 2,050 | 9 | 1 |
| 1,024 | 10 | 1 | 1,024 | 33 | 64 | 32 | 1,024 | 11 | 11 | 10,242 | 11 | 1 |

Here, $N=2^k$ is the number of inputs, $N_p$, $T_D$ and $T_P$ are the number of processors, processing delay and processing time per processor, respectively. As is evident from this Table 13, while the number of processors used is large in the present invention, the processing delay ($T_D$) and processing time per processor ($T_P$) can be made small. In addition, the characteristic of the present invention in that the processing time per processor does not change even if N (or k) that is the number of inputs increases is further superior in comparison to Document 5 above. In this manner, the characteristic of being able to reduce the processing delay ($T_D$) and processing time per processor is necessary in order to perform high-speed buffering. In particular, the latter characteristic of being able to reduce the processing delay per processor allows more processes to be performed per time unit. For example, when N=1024, where only one process per input could be performed during 111 time units according to Document 5 above, with the present invention, 11 processes can be performed per input during 11 time units. In this manner, one can see that it is possible to avoid rapid increases in the maximum processing time per processor even when the number of inputs increases. This meritorious effect is an object of the present invention, and the effect thereof becomes even more prominent as N increases further, Example 4

In the followings, we describe two prioritized buffer management methods in parallel and pipeline processing architecture. At first, we directly apply PBS (partial buffer sharing) to the multiprocessing architecture. We then point out its problem and design a new prioritized buffer management method, called PBFS (partial buffer fair sharing), which is an extended version of the PBS. PBFS is closer to the multiprocessing architecture rather than PBS from the viewpoint of buffer utilization. We describe the processing mechanism in the multiprocessing architecture.

In PBS method, threshold TH is predetermined. When the queue is shorter than the threshold (q<TH), every packet is allowed to enter the queue. When the queue length is equal to or longer than the threshold and is shorter than the buffer size (TH≦q<B), only high-priority class (class-1) packets are allowed to enter the queue while low-priority class (class-2) packets are discarded. The mechanism can be combined into the round robin scheduling, by replacing condition "if q<B" in the forth line in the following procedure;

0. Procedure round-robin
1. For n:=1 to N do
2. Begin
3.   If ($l_n$=1) then begin
4.     If q < B then begin
5.       Packet n is given delay qD;
6.       q:=q+1; End
7.     Else Packet n is discarded;
8.   End
9. End
10. q:= max(q−1, 0) , into condition "if ((q<B) and ($c_n$=HIGH) or (q<TH) and ($c_n$=LOW))", as follows;

0. Procedure PBS
1. For n:=1 to N do
2. Begin
3.   If ($l_n$=1) then begin
4.     if ((q<B) and ($c_n$= HIGH) or (q<TH) and ($c_n$= LOW)) then begin
5.       Packet n is given delay qD;
6.       q:=q+1; End
7.     Else Packet n is discarded;
8.   End
9. End
10. q:= max(q−1, 0); , where $c_n$ indicates the priority class of the packet arriving at port n.

Parallel PBS is a direct application of PBS. In the non priority case in Example 3, the number of arriving packets is calculated in the front $\log_2 N$ pipeline stages to be used for the delay calculation and the update of the queue length. Since PBS does not allow to enter class-2 packets when the queue reaches the threshold, calculating the number only of packets including class-2 packets results in overestimation of the queue length. We therefore introduce another prefix-sum, in which arrivals of class-1 packets are used as elements. In each processor in the pipeline stages, the number of class-1 packets as well as the number of packets (namely, sum of the number of class-1 packets and the number of class-2 packets) are calculated.

We first describe procedures in front $\log_2 N$ pipeline stages for parallel prefix operation. The first-stage processors perform the first operation of the parallel prefix. For processor $P_{1,n}$ (2≦n≦N), values $l_n$ and $l_{n-1}$ are inputted. Values $c_n$ and $c_{n-1}$ respectively indicating the priority class of the packet at ports n and n−1, are also inputted. The value is 1, if the packet belongs to class-1, and it is 0 otherwise. Processor $P_{1,n}$ performs the procedure in the following procedure to generate $f_{n,1}$ and $g_{n,1}$, which respectively represent the number of packets and the number of class-1 packets at the two ports.

```
0.    Procedure first stage of parallel PBS;
1.    For each processor P_{1,n}, in parallel (n:= 2 to N)
2.    Begin
3.        f_{n,1}:= l_n + l_{n-1};
4.        g_{n,1}:= c_n l_n + c_{n-1} l_{n-1};
5.    End,
```

The kth-stage processors are devoted to the kth operation of the parallel prefix. For processor $P_{k,n}$ ($2 \leq k \leq \log_2 N$, $2^{k-1}+1 \leq n \leq N$), the inputs are connected to the registers of the two (k−1)th-stage processors $P_{k-1,n}$ and $P_{k-1,2}^{k-1}$. Processor $P_{k,n}$ thus receives $f_{n,k-1}$, $g_{n,k-1}$, $f_{n-2^{k-1},k-1}$, and $g_{n-2^{k-1},k-1}$; it then performs the procedure in the following procedure to generate $f_{n,k}$ and $g_{n,k}$, which respectively represent the number of packets and the number of class-1 packets at ports max(n−$2^k$+1, 1) through n.

```
0.    Procedure k-th stage of Parallel-PBS;
1.    For each processor P_{k,n}, in parallel (n:= 2^{k-1} + 1 + 1 to N)
2.    Begin
3.        f_{n,k-1}:= f_{n,k-1} + f_{n-2^{k-1},k-1};
4.        g_{n,k-1}:= g_{n,k-1} + g_{n-2^{k-1},k-1};
5.    End,
```

By performing the above procedures at the front $\log_2 N$ stages, processors in the ($\log_2 N$)th stage generate a set of prefix sums. The prefix sums are the number of packets and the number of class-1 packets both arriving at ports 1 through n (n=1, ..., N).

N processors at the ($\log_2 N+1$)th stage are devoted to delay determination. For processor $P_{(\log_2 N+1),n}$ ($1 \leq n \leq N$), the inputs are connected to the register of the ($\log_2 N$)th stage processor, $P_{(\log_2 N+1),n-1}$. Processor $P_{(\log_2 N+1),n}$ thus receives $f_{n-1,\log_2 N}$ and $g_{n-1,\log_2 N}$. At the same time, the processor also receives the queue length at the beginning of the cycle ($q_{start}$) and the original information about packet arrival ($l_n$) and its priority class ($c_n$). The delay to a packet at port n is determined by sum of $q_{start}$ and the number of packets, or, the number of class-1 packets. Since PBS allows to enter class-2 packets only when the queue is smaller than the threshold, delay determination should depend on the current status of the queue length. Namely, When the queue length is equal to or greater than the threshold at the beginning of the cycle ($q_{start} \geq TH$), the queue length during the cycle is also equal to or greater than the threshold. Class-2 packets are not allowed to enter the queue. The delay to a class-1 packet is determined as the sum of $q_{start}$ and the number of class-1 packets, $\Delta_n = q_{start} + g_{n-1,\log_2 N}$.

When the queue is smaller than the threshold at the beginning ($q_{start} < TH$), the queue length may reach the threshold. However, Parallel PBS gives a packet the delay that is the sum of the queue length at the beginning of the cycle and the number of packets, $\Delta_n = q_{start} + f_{n-1,\log_2 N}$, regardless of the priority class of the packets.

If we strictly apply the PBS, other variables are needed in addition to $f_{*,*}$'s and $g_{*,*}$'s and delay determination becomes very complicated. The complication makes the speed of parallel and pipeline processing lose. We therefore make the delay determination simple. Finally, the class-1 packet at port n is given delay $\Delta_n$ if $\Delta_n < B$, and is discarded otherwise. The class-2 packet at port n is given delay $\Delta_n$ if $\Delta_n < TH$, and is discarded otherwise. The following procedure shows the pseudo-code for processor $P_{(\log_2 N+1),n}$.

```
0.    Procedure of (log_2 N + 1)th stage of Parallel PBS
1.    For each processor P_{(log2 N+1),n} in parallel (n:= 1 to N)
2.    Begin
3.        If (l_n = 1) then begin
4.            If (q_start < TH) then Δ_n = f_{n-1, log2 N}
5.            else Δ_n = q_start + g_{n-1, log2 N}
6.            if ((Δ_n < B) and (c_n = HIGH) or (Δ_n < TH) and (c_n = LOW))
7.                then Packet n is given delay Δ_n D;
8.            Else Packet n is discarded;
9.        End
10.   End,
```

At the last stage, the queue length is also updated at processor $P_q$. The input of the processor is connected to the register of processor $P_{\log_2 N,n}$. Processor $P_q$ thus receives $f_{n,\log_2 N}$ and $g_{n,\log_2 N}$. If queue is smaller than the threshold at the beginning of the cycle, the queue length is updated as follows;

$q := \max(\min(q_{start} + f_{N,\log_2 N}, B) - 1, 0)$

Otherwise that is, if the queue is equal to or larger than the threshold, the queue length is updated as follows.

$q := \max(\min(q_{start} + g_{N,\log_2 N}, B) - 1, 0)$

By using the above update procedure, the overestimation of the queue length is avoided.

Parallel PBS can increase throughput but the buffer is not utilized well. For example, consider a queue of which length is two ($q_{start}=2$), where one packet has been served and another is waiting. Assume that four packets (classes 1, 1, 2, and 1 in the scheduled order) designated to the same output port arrive at the packet switch in this cycle. Threshold TH is three. In this case, after the first class-1 packet is allowed to enter the queue and is given delay two, the queue reaches the threshold. The second class-1 packet is given delay three. The class-2 packet is discarded. Nevertheless, the last class-1 packet is given delay five because the delay is determined by means of the number of arriving packets. As a result, we have free space between the second class-1 packet and the last one.

We extend PBS in order to avoid the free space. The condition for packet buffering (the forth line in the Procedure round-robin) is replaced by "if ((q<B) and ($c_n$=HIGH) or ($q_{start}<TH$) and (q<B) and ($c_n$=LOW))". Namely, if queue length at the beginning of the cycle is smaller than the threshold, class-2 packets are allowed to enter the buffer. Since packets in the same cycle are fairly treated except for buffer overflow, we call this method partial buffer fair sharing (PBFS).

PBFS can also be introduced in the multiprocessing architecture. In the Parallel PBFS, the procedures in the front $\log_2 N$ stages and procedure in processor $P_q$ are identical to those in the Parallel PBS. Delay determination procedures in the last stage are different. The delay to a packet is temporally determined by the same method as that of Parallel PBS. The difference exists in the decision of packet buffering; the class 2 packet at port n is given delay $\Delta_n$ if $q_{start}<TH$ and if $\Delta_n<B$, and is discarded otherwise. The following procedure shows the pseudo code for processor $P_{(\log_2 N+1),n}$.

```
0. Procedure of (log_2 N + 1)th stage of Parallel PBFS
1. For each processor P_{(log2 N+1),n} in parallel (n:=1 to N)
2. Begin
3.     If (l_n=1) then begin
```

-continued 4. if ($q_{start}$ < TH) then $\Delta_n := q_{start} + f_{n-1,log2N}$
5. else $\Delta_n = q_{start} + g_{n-1\_log2\ N}$
6. if (($\Delta_n$<B) and ($c_n$= HIGH) or ($q_{start}$ <TH) and ($\Delta_n$<B) and ($c_n$= LOW))
7. then Packet n is given delay $\Delta_n$ D;
8. Else Packet n is discarded;
9. End
10. End, Parallel PBFS can use buffer more efficiently than Parallel PBS does because PBFS does not generate the free space, which is generated by Parallel PBS.

In order to demonstrate the hardware scale and the feasibility of high-speed management, we conducted a simulation of the buffer management hardware with partial buffer fair sharing (PBFS) priority control based on a multi-processor configuration. We simulated our configuration after performing a place-and-route operation on a 0.13-μm FPGA (Field Programmable Gate Array) wiring process, in which 79,040 logic elements are integrated and 830 I/O pins are prepared. The specifications of this configuration circuit are given in the table below.

TABLE 14

| Specifications | |
|---|---|
| Clock speed ($f_{max}$) | 156.4 MHz |
| Port speed (C) | 80.0 Gpbs |
| Number of inputs (N) | 8 |
| Packet length (L) | 64 bytes |
| Number of FDLs (B) | 15 |
| Unit length of FDLs (D) | 1.56 m (64 bytes) |

As indicated by the table above, this configuration circuit has a clock speed of 156.4 MHz. The circuit provides priority control for 8-input optical packet switch. The number of logic elements required to implement this circuit was 456. Note that from the equation below, the circuit speed at this clock speed becomes 80 Gbps.

$C=8L \times f_{max}$

Here, C, L and $f_{max}$ are the channel speed (Gbps), packet length (bytes) and the clock speed (MHz), respectively. The breakdown of the critical path in this imaging circuit was 44% cell delay and 56% wiring delay.

The maximum number of input ports can be estimated by using configuration-circuits with a smaller number of input ports. The upper limit for input ports is limited by the number of I/O pins and number of FPGA logic elements that can be used. In the configuration circuit, if N is the number of input ports, then (6N+19) X/O pins are required. The number of ports that can be obtained therefrom is 128.

On the other hand, FIG. 30 presents an estimate of the limit from the number of logic elements.

The scale of a multiprocessor circuit is on the order of $Nlog_2\ N$. In addition, the number of logic elements used in the reference function is $32Nlog_2\ N$. From FIG. 30, one can see that the value of the reference function at N=128 is smaller than the number of FPGA logic elements prepared, so it is possible to construct an configuration circuit expanded to 128 ports. While the channel (port) speed typically decreases as the number of ports increases, in the case of 128 ports, the channel speed is greater than half that in the case of 8 ports described above. Even when considering this decrease in channel speed, the overall throughput of packet switch, which is derived from product of the number of input ports and the channel speed per port, reaches 5120 Gbps.

What is claimed is:

1. An optical packet buffering device that accepts input of asynchronously-arriving variable-length optical packets transmitted via N light paths, wherein N denotes an integer of 2 or more, and outputs the asynchronously-arriving variable-length optical packets to a single light path, comprising:

means for reading optical packet lengths of the variable-length optical packets on the individual light paths;

means for reading an arrival gap time between a start time of a clock signal prepared in advance and an arrival time of the subsequent most recent variable-length optical packet;

a queue consisting of a plurality of delay elements that temporarily store said plurality of optical packets and give each of said optical packets one of B different delay times, wherein B denotes an integer of 2 or more;

an optical switch that allots said optical packets individually to one of said plurality of delay elements;

an optical multiplexer that is connected by light paths to said plurality of delay elements and enabled to multiplex the optical packet signals delayed by the delay elements;

an output light path connected to the multiplexer;

a controller which, by using the delay times of the delay elements and the lengths of the optical packets and the arrival gap time read by the means for reading the arrival gap time, selects the delay element used for temporary storage from said plurality of delay elements in order to prevent the accepted optical packets from overlapping in the output light path, wherein the controller gives sequential numbers n from 1 to N individually to said N light paths, and the means for reading the optical packet lengths of variable-length optical packets and the means for reading the arrival gap time respectively read with a period T, a length $l_n$ of an optical packet and the arrival gap time $t_n$, which is larger than or equal to 0, of the optical packets of an $n^{th}$ light path that passes through the means for reading the optical packet lengths at a specified time and, with respect to the optical packets that fail to reach the means for reading the optical packet lengths during an initial period T, set both $l_n$ and $t_n$ to be zero, and, with respect to n−1=0, assume $l_{n-1}=t_{n-1}=0$;

an arrangement of a first stage, which has disposed therein processors P(1,n) that calculate the optical packet length $l_{n-1}$ and the arrival gap time $t_{n-1}$ and the optical packet length $l_n$ and the arrival gap time $t_n$, and registers R(1,n) that store the results of calculation;

an arrangement of an $m^{th}$ ($2 \leq m \leq log_2 N$) stage, which has disposed therein processors P(m,n) that calculate the contents of the registers R(m−1,n−$2^{m-1}$) or copies of the registers R(m−1,n−$2^{m-1}$) and the registers R(m−1,n) or copies of the registers R(m−1,n), and registers R(m,n) that store the results of the calculation; and an arrangement of a $(log_2 N+1)^{th}$ stage, which is provided with a register Q that stores the information at a tail end of a queue length which is updated when the processors perform operations of adding all arriving optical packets to the queue, also, a processor P($log_2 N+1,1$) that determines the delay applied to the first variable-length optical packet by performing calculation on the basis of the optical packet length and arrival gap time for the first light path or a copy of the arrival gap time for the first light path and a value of the register Q, and processors P($log_2 N+1,n$) that determine the delay applied to the $n^{th}$ variable-length optical packet by performing calculation on the basis of the optical packet length $l_n$ and arrival gap time $t_n$ for the $n^{th}$ light path or a copy of the arrival gap time $t_n$ for the $n^{th}$ light path and the values of the registers $R(\log_2 N, n-1)$ and the register Q, wherein in the arrangement of the $(\log_2 N+1)^{th}$ stage, the delay times applied to the variable-length optical packets of the individual light paths are adjusted based on the output of the processor $P(\log_2 N+1, 1)$ or the processors $P(\log_2 N+1, n)$.

2. The optical packet buffering device according to claim 1, wherein the means for reading the optical packet length of variable-length optical packets performs reading of the length $l_n$ at each period T and the means for reading the arrival gap time performs reading the arrival gap time $t_n$, which is larger than or equal to 0, of the optical packets of the $n^{th}$ light path that pass through the means for reading the optical packet lengths at a specified time and both $l_n$ and $t_n$ are set to zero when the optical packets of the nth light path do not arrive at the means for reading the optical packet lengths during an initial period T, and with respect to $n-1=0$, assume $l_{n-1}=t_{n-1}=0$, the plurality of said delay elements give each of the optical packets delays that respectively increase by a delay time $D>0$;

each of said processors is provided on one of the respective N light paths on the input side, and perform the following processing on the integers n from 1 to N:

1) when $l_{n-1}=0$ is true, output $t_n$ as $t_{n,1}$, or
   when $l_{n-1}=0$ is not true, output $t_{n-1}$ as $t_{n,1}$,
2) and take $g_{n,1}=l_{n-1}+t_{n-1}$,
   when $l_n=0$ is true, and output $g_{n-1}$ as last position $f_{n-1}$ of the optical packets of the $n^{th}$ light path, or
   when $l_n=0$ is not true, taking $\Delta_n$ to be the smallest integer no less than $(g_{n-1}-t_n)/D$ set $(t_n+l_n+\Delta_n D)$ to the output $f_{n,1}$ of the last position of the optical packets of the $n^{th}$ light path.

3. The optical packet buffering device according to claim 2, wherein under a condition that N is an integer of 3 or more, each of the processors $P(1,n)$ in the arrangement of the first stage is respectively provided with a register $R(1,n)$ that temporarily stores its respective output of $(f_{n,1}, t_{n,1})$, and the processors $P(2, n)$ in the arrangement of the second stage, for the integers n from 3 to N, calculate the content of the $n^{th}$ register and the content of the $(n-2)^{th}$ register and gives the output of $(f_{n,2}, t_{n,2})$, where 1) when $f_{n-2,1}=0$ is true, output $t_{n,1}$ as $t_{n,2}$, or
   when $f_{n-2,1}=0$ is not true, output $t_{n-2,1}$ as $t_{n,2}$,
2) in addition, when $f_{n,1}=0$ is true, output $f_{n-2,1}$ as $f_{n,2}$, or
   when $f_{n,1}=0$ is not true,
2-1) taking $\Delta_n$ to be the smallest integer no less than $(f_{n-2,1}-t_{n,1})/D$ set $(f_{n,1}+\Delta_n D)$ to the output $f_{n,2}$.

4. The optical packet buffering device according to claim 2, wherein each of the processors $P(1,n)$ in the arrangement of the first stage is respectively provided with a register $R(1,n)$ that temporarily stores its respective output of $(f_{n,1}, t_{n,1})$, and the processors $P(m, n)$ in the arrangement of the $(m-1)^{th}$ stage, for the integers m from 2 to $\log_2 N$, are provided, for the $m^{th}$ stage processors, and for the integers n from $\beta+1$ to N where $\beta=2^{m-1}$, the $(n-\beta)^{th}$ processors $P(m,n)$ in the arrangement of the $m^{th}$ stage calculate the content of said $n^{th}$ register $R(m-1,n)$ connected to the previous-stage processors $P(m-1,n)$ and the content of the $(n-\beta)^{th}$ register $R(m-1,n-\beta)$ and gives the output of $(f_{n,m}, t_{n,m})$, where
1) when $f_{n-\beta,m-1}=0$ is true, output $t_{n,m-1}$ as $t_{n,m}$, or
   when $f_{n-\beta,m-1}=0$ is not true, output $t_{n-\beta,m-1}$ as $t_{n,m}$,
2) in addition, when $f_{n,m-1}=0$ is true, output $f_{n-\beta,m-1}$ as $f_{n,m}$, or
   when $f_{n,m-1}=0$ is not true,
2-1) taking $\Delta_n$ to be the smallest integer no less than $(f_{n-\beta,m-1}-t_{n,m-1})/D$ set $(f_{n,m-1}+\Delta_n D)$ to the output $f_{n,m}$.

5. The optical packet buffering device according to claim 4, wherein $M=\log_2 N$ and the length of the queue is defined as q, for the integers n from 1 to N, 1) when no optical packet exists, or $l_n=0$ is true, end processing, and
   when no optical packet exists, for $f_{n-1,M}$ in the register $R(M,n-1)$,
2) when $f_{n-1,M}=0$ is true, provide a temporary value (temp), and set (temp)=q,
   when $f_{n-1,M}=0$ is not true, set the sum of $f_{n-1,M}$ and the smallest integer no less than $(q-t_{n,-1,M})/D$ to (temp),
3) taking $\Delta_n$ to be the smallest integer no less than $((temp)-t_n)/D$, when $\Delta_n$ is less than B, output $\Delta_n$ as information that specifies a delay element, but if not less, discard the corresponding optical packet.

6. The optical packet buffering device according to claim 5, wherein 1) when $f_{N,M}=0$ is true for the $f_{N,M}$ stored in register $R(M, N)$, the larger of $(q-T)$ or 0 is stored as the new queue length $(q_{new})$ in the register Q,
   when $f_{N,M}=0$ is not true, $\Delta$ is set as the smallest integer no less than $(q-t_{N,M})/D$ and at this time,
2) when this $\Delta$ is smaller than B, store the value of the larger of $(f_{N,M}+\Delta D-T)$ and 0 in the register Q as the new queue length,
   when this $\Delta$ is not smaller than B, take $(q-T)$ as the new queue length and store it in the register Q.

7. The optical packet buffering device according to claim 5, wherein an MTU (maximum transfer unit) is set in optical packet communications, 1) when $f_{N,M}=0$ is true for the $f_{N,M}$ stored in register $R(M,N)$, the larger of $(q-T)$ or 0 is stored as the new queue length $(q_{new})$ in the register Q,
   when $f_{N,M}=0$ is not true, $\Delta$ is set as the smallest integer no less than $(q-t_{N,M})/D$ and at this time,
2) when this $\Delta$ is smaller than said B, store the value of the larger of 0 and the value found by subtracting T from the lesser of $(f_{N,M}+\Delta D)$ and $(BD+MTU)$ in the register Q,
   when this $\Delta$ is not smaller than B, take $(q-T)$ as the new queue length and store it in the register Q.

8. The buffering device for asynchronously-arriving optical packets according to claim 1, wherein and the period T is set as a power of 2 times a set time unit ($\tau$) set in advance, or namely $T=2^a \tau$ (where a is a non-negative integer), while T is to be no greater than the minimum packet length represented as the length of an integral multiple of the time unit ($\tau$), the means for reading the optical packet length of variable-length optical packets, read with a period T, perform reading of the length $l_n$ and the means for reading the arrival gap time, read with a period T, perform reading the arrival gap time $t_n$ of the optical packet in the $n^{th}$ light path that pass through the means for reading the optical packet lengths at a specified time, the length $l_n$ is represented as a length which is an integral multiple of the time unit ($\tau$) that is not less than the length of the optical packet in the $n^{th}$ light path, the arrival gap time $t_n$ is a length which is an integer multiple of the time unit ($\tau$) that is not more than the arrival gap time of the optical packet in the n' light path, and for n−1=0, $l_{n-1}=t_{n-1}=0$, the plurality of said delay elements give each of the optical packets delays that respectively increase by the delay time D which is given as $2^k\tau$ (where k is a non-negative integer), and, the integer corresponding to the k least significant bits of a binary representation of an integer x is represented as $x^{(2)}$, and a binary number consisting of the remaining most significant bits after removing the aforementioned k least significant bits is represented as $x^{(1)}$, each of said processors is provided on one of respective N light paths on the input side, and performs the following processing for the integers n from 1 to N:

1) when $l_{n-1}=0$ is true, output $t_n$ as $t_{n,1}$, or
   when $l_{n-1}$32 0 is not true, output $t_{n-1}$ as $t_{n,1}$,
2) and take $g_{n,1}=l_{n-1}+t_{n,1}$,
   when $l_n=0$ is true, output $g_{n-1}$ as $f_{n,1}$, or
   when $l_n=0$ is not true,
   i) when $g_{n-1}$ is less than $t_n$, set $g_{n-1}^{(1)}$ to $\Delta_n$,
   ii) when $g_{n-1}$ is not less than $t_n$, set $(g_{n-1}^{(1)}+1)$ to $\Delta_n$, and
3) set $(t_n^{(2)}+l_n+\Delta_n D)$ to the output $f_{n,1}$.

9. The optical packet buffering device according to claim 8, wherein each of the processors P(1,n) in the arrangement of the first stage is respectively provided with a register R(1,n) that temporarily stores its respective output of $(f_{n,1}, t_{n,1})$;

processors are provided, for the integers m from 2 to $\log_2 N$, in the arrangement of the $(m-1)^{th}$ stage;

for the $m^{th}$-stage processors, and for the integers n from $\beta+1$ to N where $\beta=2^{m-1}$, the $(n-\beta)^{th}$ processors P(m, n) in the arrangement of the $m^{th}$-stage calculate the content of said $n^{th}$ register R(m−1,n) connected to the previous-stage processors P(m−1,n) and the content of the $(n-\beta)^{th}$ register R(m−1,n−$\beta$) and gives the output of $(f_{n,m}, t_{n,m})$, where 1) when $f_{n-\beta,m-1}=0$ is true, output $t_{n,m-1}$ as $t_{n,m}$, or
   when $f_{n-\beta,m-1}=0$ is not true, output $t_{n-\beta,m-1}$ as $t_{n,m}$,
2) in addition, when $f_{n,m-1}=0$ is true, output $f_{n-\beta,m-1}$ as $f_{n,m}$, or
   when $f_{n,m-1}=0$ is not true,
   2-1) when $f_{n-\beta,m-1}^{(2)}$ is less than or equal to $t_{n,m-1}^{(2)}$, set $f_{n-\beta,m-1}^{(1)}$ to $\Delta_n$,
   2-2) when $f_{n-\beta,m-1}^{(2)}$ is not less than or equal to $t_{n,m-1}^{(2)}$, set $(f_{n-\beta,m-1}^{(1)}+1)$ to $\Delta_n$,
3) set $(f_{n,m-1}+2^k\Delta_n)$ to the output $f_{n,m}$.

10. The optical packet buffering device according to claim 8, wherein $M=\log_2 N$ and the length of the queue is defined as $q^{(n)}$, for the integers n from 1 to N, and, the integer corresponding to the k least significant bits of the binary representation of the integer x is represented as $x^{(2)}$, and the binary number consisting of the remaining most significant bits after removing the aforementioned k least significant bits is represented as $x^{(1)}$ 1) when no optical packet exists, or $l_n=0$, end processing,
2) when an optical packet exists,
   2-1) when $f_{n-1,M}=0$ is true and,
      when $q^{(2)}$ is less than or equal to $t_n^{(2)}$, set $q^{(1)}$ to $\Delta_n$,
      when $q^{(2)}$ is not less than or equal to $t_n^{(2)}$, set $(q^{(1)}+1)$ to $\Delta_n$,
   2-2) when $f_{n-1,M}=0$ is not true and,
      when $q^{(2)}$ is less than or equal to $t_{n-1,M}^{(2)}$, set $q^{(1)}$ to $\Delta_1$,
      when $q^{(2)}$ is not less than or equal to $t_{n-1,M}^{(2)}$, set $(q^{(1)}+1)$ to $\Delta_1$, and moreover,
   2-3-1) when $f_{n-1,M}^{(2)}$ is less than or equal to $t_n^{(2)}$, set $(\Delta_1+f_{n-1,M}^{(1)})$ to $\Delta_n$,
   2-3-2) when $f_{n-1,M}^{(2)}$ is not less than or equal to $t_n^{(2)}$, set $(\Delta_1+1+f_{n-1,M}^{(1)})$ to $\Delta_n$,
3) when $\Delta_n$ is less than B, output $\Delta_n$ as information that specifies a delay element,
   but if not less, discard the corresponding optical packet.

11. The optical packet buffering device according to claim 9, wherein $M=\log_2 N$ and the length of the queue is defined said $q^{(n)}$, for the integers n from 1 to N, and, the integer corresponding to the k least significant bits of the binary representation of the integer x is represented as $x^{(2)}$, and the binary number consisting of the remaining most significant bits after removing the aforementioned k least significant bits is represented as $x^{(1)}$ 1) when $f_{N,M}=0$ is true,
   1-1) when q is greater than T, (q−T) is set as the new queue length ($q_{new}$),
   1-2) when q is not greater than T, $q_{new}=0$ is set,
2) when $f_{N,M}=0$ is not true,
   2-1) when $q^{(2)}$ is less than or equal to $t_{N,M}^{(2)}$, $q^{(1)}$ is set as $\Delta$, when $q^{(2)}$ is not less than or equal to $t_{N,M}^{(2)}$, $(q^{(1)}+1)$ is set as $\Delta$,
   3-1) when this $\Delta$ is smaller than B and,
      3-1-1) when $f_{N,M}+2^k\Delta$ is greater than T, $(f_{N,M}+2^k\Delta-T)$ is set as $q_{new}$,
      3-1-2) when $f_{N,M}+2^k\Delta$ is not greater than T, $q_{new}=0$ is set,
   3-2) when this $\Delta$ is not smaller than B, (q−T) is set as $q_{new}$.

12. The optical packet buffering device according to claim 9, wherein an MTU (maximum transfer unit) is set-in optical packet communications;

$M=\log_2 N$ and the length of the queue is defined as said $q^{(n)}$, for the integers n from 1 to N;

and, the integer corresponding to the k least significant bits of the binary representation of the integer x is represented as $x^{(2)}$, and the binary number consisting of the remaining most significant bits after removing the aforementioned k least significant bits is represented as $x^{(1)}$ 1) when $f_{N,M}=0$ is true,
   1-1) when q is greater than T, (q−T) is set as the new queue length ($q_{new}$),
   1-2) when q is not greater than T, $q_{new}=0$ is set,
2) when $f_{N,M}=0$ is not true,
   2-1) when $q^{(2)}$ is less than or equal to $t_{N,M}^{(2)}$, $q^{(1)}$ is set as $\Delta$,
      when $q^{(2)}$ is not less than or equal to $t_{N,M}^{(2)}$, $(q^{(1)}+1)$ is set as $\Delta$,
   3-1) when this $\Delta$ is smaller than B and,
      3-1-1) when $(f_{N,M}+2^k\Delta)$ is greater than $(2^kB+MTU)$, $(2^kB+MTU-T)$ is set as $q_{new}$;
      3-1-2) when $(f_{N,M}+2^k\Delta)$ is not greater than $(2^kB+MTU)$ and,
         3-1-2-1) when $f_{N,M}+2^k\Delta$ is greater than $(f_{N,M}+2^k\Delta-T)$ is set as $q_{new}$,
         3-1-2-2) when $f_{N,M}+2^k\Delta$ is not greater than T, $q_{new}=0$ is set,
   3-2) when this $\Delta$ is not smaller than B, (q−T) is set as $q_{new}$.

13. An optical packet buffering device that accepts input of synchronous fixed-length optical packets from N light paths, wherein N denotes an integer of 2 or more, and gives each of the optical packets one of B different delay times, wherein B denotes an integer of 1 or more, and outputs the synchronous fixed-length optical packets from N light paths to a single light path, comprising:

means for reading a presence of optical packets on the respective light paths;

a queue consisting of a plurality of delay elements that temporarily store said plurality of optical packets and give each optical packet one of the B different delay times;

an optical switch that directs each of the optical packets to one of said plurality of delay elements;

an optical multiplexer connected by light paths to said plurality of delay elements;

an output light path connected to the multiplexer;

a controller which uses the delay times of the delay elements and the length of the optical packets and the presence information for optical packets read by the means for reading to select the delay elements used for temporary storage from said plurality of delay elements in order to prevent the accepted optical packets from overlapping in the output light path and gives respectively sequential numbers n from 1 to N to said N light paths, wherein, in said controller, a length $l_n$ and an arrival gap time $t_n$, larger than or equal to 0, of the optical packets of the nth light path that pass through the means for reading at a specified time are respectively read at each period T, both $l_n$ and $t_n$ are set to be zero when the optical packets of the $n^{th}$ light path do not arrive at the means for reading during an initial period T, and, with respect to n−1=0, assume $l_{n-1}=t_{n-1}=0$;

an arrangement of a first stage, in which processors P(1,n) that each perform a calculation using the optical packet presence information on the light path of the optical packet length $l_{n-1}$ and the arrival gap time $t_{n-1}$ and the optical packet presence information on the light path of the optical packet length $l_n$ and the arrival gap $t_n$, and registers R(1,n) store the results of calculation;

an arrangement of an $m^{th}$ ($2 \leq m \leq \log_2 N$) stage, which has processors P(m,n) that calculate the contents of the registers $R(m-1,n-2^{m-1})$ or copies of the registers $R(m-1, n2^{m-1})$ and the registers R(m−1,n) or copies of the registers R(m−1,n), and registers R(m,n) that store the results of the calculation;

a register Q that stores information at a tail end of a queue length which is updated when the processors perform operations of adding all arriving optical packets to the queue;

a processor P($\log_2$ N+1,1) that determines the delay applied to the first synchronous fixed-length optical packet by performing calculation on the basis of the optical packet presence information on the first light path or a copy of the optical packet presence information on the first light path and the value of the register Q;

processors P($\log_2$ N+1,n), for values of n greater than 1, that determine the delay applied to the $n^{th}$ synchronous fixed-length optical packet by performing calculation on the basis of the optical packet presence information on the $n^{th}$ light path or a copy of the optical packet presence information on the $n^{th}$ light path and the values of the registers R($\log_2$ N,n−1 and the register Q and;

an arrangement of a ($\log_2$ N+1)$^{th}$ stage, in which delay times applied to the synchronous fixed-length optical packets of the respective light paths are coordinated based on the output of the processor P($\log_2$ N+1,1) or the processors P($\log_2$ N+1,n).

14. The buffering device for optical packets according to claim 13, wherein said means for reading, for each period T, reads the presence of optical packets on the respective light paths;

the respective processors of the arrangement of the first stage input variables $l_{n-1}$ and $l_n$ according to the presence of optical packets arriving at a port (n−1) corresponding to the $(n-1)^{th}$ light path and a port n corresponding to the $n^{th}$ light path, wherein each variable is 1 when a packet has arrived and 0 when no packet has arrived, and perform the following processing:

$l_0=0$ for each processor n, in parallel (n=1 to N) $f_{n,1}=l_{n-1}+l_n$;

and provide output of $f_{n,1}$ as the number of packets arriving at the two ports.

15. The buffering device for optical packets according to claim 14, wherein, each of the respective processors P(1,n) of the arrangement of the first stage is provided with a register R(1,n) that temporarily stores output ($f_{n,i}$) of the respective processors P(1,n), and each of the respective processors of the arrangement of the $(m-1)^{th}$ stage are provided for the integers m from 2 to $\log_2 N$;

the processor P(m,n) in the arrangement of the $m^{th}$-stage, for the integers n from to β+1 to N where $\beta=2^{m-1}$ uses the value of the $n^{th}$ register R(m−1,n) connected to the processor P(m−1,n) in the arrangement of the respective previous-stage and the value of the $(n-\beta)^{th}$ register R(m−1,n−β) connected to processor P(m−1,n−β) and performs the processing:

$f_{n,m}=f_{n-m-1}+f_{n-\beta,m-1}$ and provides output of $f_{n,m}$.

16. The buffering device for optical packets according to claim 15, wherein, M=$\log_2$ N and the processors P(M+1,n) (where $1 \leq n \leq N$ in the arrangement of the the $(m+1)^{th}$-stage use $f_{n-1,M}$ as the number of optical packets arriving from ports 1 to n−1, $l_n$ which indicates the presence of an optical packet arriving at port n, and the queue length q;

perform the following processing respectively for the integers n from 1 to N:

if no optical packet exists, or $l_n$=0, end processing;

else $\Delta_n=q+f_{n-1,M}$;

but if $\Delta_n<$B Packet n is given delay $\Delta_n$;

and if not $\Delta_n<$B Packet n is discarded;

and output the value of the delay $\Delta_n$ as information that specifies the delay element.

17. The buffering device for optical packets according to claim 16, wherein, for the $f_{N,M}$ stored in register R(M,N), the larger value between (min(q+$f_{n,M}$,B)−1) and 0 is stored as the new queue length ($q_{new}$) in register Q.

18. An optical packet buffering device that accepts input of synchronous fixed-length optical packets from N light paths, wherein N denotes an integer of 2 or more, and gives each of the optical packets one of B different delay times, wherein B denotes an integer of 1 or more, and outputs the packets to a single light path, comprising:

means for reading a presence of optical packets and priority-class information of said optical packets on the respective light paths;

a queue consisting of a plurality of delay elements that temporarily store said plurality of optical packets and give each optical packet one of the B different delay times;

an optical switch that directs each of the optical packets to one of said plurality of delay elements;

an optical multiplexer connected by light paths to said plurality of delay elements;

a controller which uses the delay times of the delay elements, the presence information of the optical packets and the priority-class information of said optical packets read by the means for reading to select the delay element used for temporary storage from said plurality of delay elements in order to prevent the accepted optical packets from overlapping in an output light path and gives respectively sequential numbers n from 1 to N to said N light paths, wherein in said controller, a length $l_n$ and an arrival gap time $t_n$, which is larger than or equal to 0, of the optical packets of the $n^{th}$ light path that pass through the means for reading at a specified time are respectively read at each period T, both $l_n$ and $t_n$ are set to be zero when the optical packets of the $n^{th}$ light path do not arrive at the means for reading during an initial period T, and, with respect to n−1=0, assume $l_{n-1}=t_{n-1}=0$;

an arrangement of a first stage, in which processors P(1,n) each perform a calculation using the optical packet presence information and priority-class information on the light path of the length $l_{n-1}$ and the arrival gap time $t_{n-1}$ and the optical packet presence information and priority-class information on the light path of the length $l_n$ and the arrival gap time $t_n$, and registers R(1,n) store the results of calculation;

an arrangement of an $m^{th}$ ($2 \leq m \leq \log_2 N$) stage, which has processors P(m,n) that calculate the contents of the registers R(m−1,n−$2^{m-1}$) or copies of the registers R(m−1, n−$2^{m-1}$) and the registers R(m−1,n) or copies of the registers R(m−1,n), and registers R(m,n) that store the results of the calculation;

a register Q that stores information at the tail end of the queue length which is updated when the processors perform operations of adding all arriving optical packets to the queue;

a processor P($\log_2$ N+1,1) that determines the delay applied to the first synchronous fixed-length optical packet by performing calculation on the basis of the optical packet presence information and the optical packet priority-class information on the first light path or a copy of the optical packet priority-class information on the first light path and the value of the register Q;

processors P($\log_2$ N+1,n), for values of n greater than 1, that determine the delay applied to the $n^{th}$ synchronous fixed-length optical packet by performing calculation on the basis of the optical packet presence information and optical packet priority-class information on the $n^{th}$ light path or a copy of the optical packet priority-class information on the $n^{th}$ light path and the values of the registers R($\log_2$ N,n−1) and the register Q; and an arrangement of a ($\log_2$ N+1)$^{th}$ stage, in which delay times applied to the synchronous fixed-length optical packets of the respective light paths are adjusted based on the output of the processor P($\log_2$ N+1,1) or the processors P($\log_2$ N+1,n).

19. The buffering device for optical packets according to claim 18, wherein the respective processors of the arrangement of the first stage input variables $l_{n-1}$ and $l_n$ that indicate the presence of optical packets arriving at a port (n−1) corresponding to the (n−1)$^{th}$ light path and port n corresponding to the $n^{th}$ light path, wherein each variable is 1 when a packet has arrived and 0 when no packet has arrived and;

input variables $c_{n-1}$ and $c_n$ that indicate the priority-class of optical packets arriving at port (n−1) and port n, are each 1 when a packet belongs to high-priority class and 0 when a packet belongs low-priority-class, and perform the following processing:

$l_0=0, c_0=0$;

for each processor n, in parallel (n=1 to N)

$f_{n,1}=l_{n-1}+l_n$;

$g_{n,1}=c_{n-1}l_{n-1}+c_n l_n$;

and provide output of $f_{n,1}$ as the number of packets arriving at the two ports and output of $g_{n,1}$ as a number of high-priority-class packets arriving at the two ports.

20. The buffering device for optical packets according to claim 19, wherein each of the respective processors P(1,n) of the arrangement of the first stage is provided with a register R(1,n) that temporarily stores output ($f_{n,1}$, $g_{n,1}$) of the respective processors P(1,n), and each of the respective processors of the arrangement of the (m−1)$^{th}$ stage are provided for the integers m from 2 to $\log_2$ N;

the processor P(m, n) in the arrangement of the $m^{th}$-stage, for the integers n from $\beta$+1 to N where $\beta=2^{m-1}$ uses the value of the $n^{th}$ register R(m−1,n) connected to the processor P(m−1,n) in the arrangement of the respective previous-stage and the value of the (n−$\beta$)$^{th}$ register R(m−1,n−$\beta$) connected to processor P(m−1,n−$\beta$) and performs the processing $f_{n,m}=f_{n-m-1}+f_{n-\beta,m-1}$ $g_{n,m}=g_{n-m}+g_{n-\beta,m-1}$ and provides outputs of $f_{n,m}$ and $g_{n,m}$.

21. The buffering device for optical packets according to claim 20, wherein, M=$\log_2$ N and the processors P(M+1, n) (where $1 \leq n \leq N$) in the arrangement of the (m+1)$^{th}$-stage use $f_{n-1,M}$ as the number of optical packets arriving from ports 1 to n−1, $g_{n-1,M}$ as the number of high-priority-class optical packets arriving from ports 1 to n−1, $l_n$ which indicates the presence of an optical packet arriving at port n, $c_n$ which indicates the priority-class information of an optical packet arriving at port n, and when $l_n=1$, perform the following processing 1) when q is less than a predetermined threshold TH, set $\Delta_n=q+f_{n-1,M}$;

when q is not less than TH, set $\Delta_n=q+g_{n-1,M}$;

2) when $\Delta_n$ is less than B and when $c_n$ shows a high-priority, or, when q is less than TH and when $\Delta_n$ is less than B and when $c_n$ shows a low-priority, the optical packet arriving at port n is given delay $\Delta_n$;

and when $\Delta_n$ is not less than B or when $c_n$ shows a low-priority and when $\Delta_n$ is not less than TH, the optical packet arriving at port n is discarded;

and outputs the value of the delay $\Delta_n$ as information that specifies the delay element.

22. The buffering device for optical packets according to claim 21, wherein, for the $f_{N,M}$ and $g_{N,M}$ stored in register R(M,N) and for q stored in register Q, when q is less than said threshold TH, the larger value between $(\min(q+f_{n,M},B)-1)$ and 0 is stored as the new queue length ($q_{new}$) in register Q, and when q is not less than said threshold TH, the larger value between $(\min(q+g_{n,M},B)-1)$ and 0 is stored as the new queue length ($q_{new}$) in register Q.

* * * * *